US012080049B1

(12) United States Patent
Marland et al.

(10) Patent No.: US 12,080,049 B1
(45) Date of Patent: Sep. 3, 2024

(54) SYSTEMS AND METHODS FOR GENERATING HABITAT CONDITION ASSESSMENTS

(71) Applicant: AIDash Inc., San Jose, CA (US)

(72) Inventors: Stephen A. Marland, Warwickshire (GB); Mohamed Musthafa, Tamil Nadu (IN); Aayush Bajaj, Merta (IN); Pritesh Jain, Karnataka (IN); Chris Talbot, Moreton-in-Marsh (GB); Lauren Weller, Okehampton (GB); Justin Byrne, Newcastle Upon Tyne (GB)

(73) Assignee: AIDash Inc., San Jose, CA (US)

( * ) Notice: Subject to any disclaimer, the term of this patent is extended or adjusted under 35 U.S.C. 154(b) by 0 days.

(21) Appl. No.: 18/585,036

(22) Filed: Feb. 22, 2024

Related U.S. Application Data

(60) Provisional application No. 63/616,396, filed on Dec. 29, 2023.

(51) Int. Cl.
  *G06V 10/764* (2022.01)
  *G06V 10/774* (2022.01)
  *G06V 10/776* (2022.01)
  *G06V 20/13* (2022.01)

(52) U.S. Cl.
  CPC .......... *G06V 10/764* (2022.01); *G06V 10/774* (2022.01); *G06V 10/776* (2022.01); *G06V 20/13* (2022.01)

(58) Field of Classification Search
  CPC .. G06V 10/764; G06V 10/774; G06V 10/776; G06V 20/13

USPC .......................................................... 382/155
See application file for complete search history.

(56) References Cited

U.S. PATENT DOCUMENTS

| | | | |
|---|---|---|---|
| 11,074,447 B1* | 7/2021 | Fox | G08G 5/0013 |
| 11,120,692 B2 | 9/2021 | Aljuaid et al. | |
| 11,126,170 B2 | 9/2021 | Wilhelm et al. | |
| 11,132,102 B2 | 9/2021 | Kornmann et al. | |
| 11,132,377 B2 | 9/2021 | Hong | |
| 11,842,537 B1 | 12/2023 | Jain | |

(Continued)

OTHER PUBLICATIONS

Abdi, "Land cover and land use classification performance of machine learning algorithms in a boreal landscape using Sentinel-2 data," GIScience & Remote Sensing, vol. 57, Aug. 22, 2019, DOI: 10.1080/15481603.2019.1650447.

(Continued)

*Primary Examiner* — Juan A Torres
(74) *Attorney, Agent, or Firm* — Ahmann Kloke LLP

(57) ABSTRACT

Generating and providing a condition assessment for a habitat is described. A geographic area having one or more geographic sub-areas is received. For each geographic sub-area, image data is received, a set of features is generated using the image data, a habitat for the geographic sub-area is received, and one or more condition assessment criteria are identified based on the habitat. For each condition assessment criterion, a subset of features is determined, and a trained model is applied to the subset of features to obtain a response to the condition assessment criterion. For each geographic sub-area, a condition assessment for the habitat is generated based on one or more responses to the one or more condition assessment criteria, and the condition assessment is provided.

20 Claims, 39 Drawing Sheets

(56) References Cited

U.S. PATENT DOCUMENTS

| | | | |
|---|---|---|---|
| 2007/0291994 | A1 | 12/2007 | Kelle et al. |
| 2010/0040260 | A1 | 2/2010 | Kelle et al. |
| 2010/0250199 | A1* | 9/2010 | Breedlove ............... A01K 1/00 703/1 |
| 2011/0122138 | A1 | 5/2011 | Schmidt et al. |
| 2015/0294154 | A1* | 10/2015 | Sant .................... G06V 20/182 382/110 |
| 2018/0330435 | A1 | 11/2018 | Garg |
| 2020/0117959 | A1 | 4/2020 | Sargent et al. |
| 2020/0242754 | A1 | 7/2020 | Peters |
| 2022/0405870 | A1* | 12/2022 | Conway ............... G06V 10/267 |

OTHER PUBLICATIONS

International Application No. PCT/US2023/086112, International Search Report and the Written Opinion, Mar. 1, 2024, 10 pages.

Pratomoatmojo, "LanduseSim Resources Centre", Sep. 2017,http://www.landusesim.com/resources/.

Sikder, "Geospatial Web Services in environmental planning," 2008 11th International Conference on Computer and Information Technology, pp. 424-429, Dec. 2008.

Talukdar et al., "Land-Use Land-Cover Classification by Machine Learning Classifiers for Satellite Observations: A Review," Remote Sensing, Apr. 2, 2020. DOI: 10.3390/rsl2071135.

UK Patent application No. 2311213.9, Search and Examination Report dated Feb. 1, 2024, 9 pages.

Wang, Junye, et al., "Machine learning in modelling land-use and land cover-change (LULCC): Current status, challenges and prospects," Science of The Total Environment, vol. 822, May 20, 2022. DOI: 0.1016/j.scitotenv.2022.153559.

Forsmoo, J., Anderson, K., Macleod, C. J. A. Wilkinson, M. E., and Brazier, R., Nov. 2018, en"Drone-based structure-from-motion photogrammetry captures grassland sward height variability," Journal of Applied Ecology 55, 2587-2599. (2018).

Karila, K., Alves Oliveira, R., Ek, J., Kaivosoja, J., Koivumäki, N., Korhonen, P., Niemeläinen, O., Nyholm, L., Näsi, R., Polonen, I., and Honkavaara, E., Jun. 2022., en" Estimating Grass Sward Quality and Quantity Parameters Using Drone Remote Sensing with Deep Neural Networks," Remote Sensing 14, 2692. (2022).

Nguyen, C. T., Chidthaisong, A., Kieu Diem, P., and Huo, L .- Z., Feb. 2021., en"A Modi- fied Bare Soil Index to dentify Bare Land Features during Agricultural Fallow-Period in Southeast Asia Using Landsat 8," Land 10, 231. (2021).

Nickmilder, C., Tedde, A., Dufrasne, I., Lessire, F., Tychon, B., Curnel, Y., Bindelle, J., and Soyeurt, H., Jan. 2021., en"Development of Machine Learning Models to Predict Compressed Sward Height in Walloon Pastures Based on Sentinel-1, Sentinel-2 and Meteorological Data Using Multiple Data Transformations," Remote Sensing 13, 408. (2021).

Oliveira, R. A., Näsi, R., Niemeläinen, O., Nyholm, L., Alhonoja, K., Kaivosoja, J., Jauhi- Ainen, L., Viljanen, N., Nezami, S., Markelin, L., Hakala, T., and Honkavaara, E., Sep. 2020., en"Machine learning estimators for the quantity and quality of grass swards used for silage production using drone-based imaging spectrometry and photogrammetry," Remote Sensing of Environment 246, 111830. (2020).

Padalia, H., and Musthafa, M., Feb. 2017., en"Characterization and classification of fresh- water marshy wetland using synthetic aperture radar polarimetry: a case study from Loktak wetland, Northeast India," Journal of Applied Remote Sensing 11, 016029. (2017).

Stewart, K., Bourn, N., and Thomas, J., Oct. 2001., en"An evaluation of three quick meth- ods commonly used to assess sward height in ecology: Sward height measurement," Journal of Applied Ecology 38, 1148-1154. (2001).

* cited by examiner

| Condition Assessment Criteria | | Criterion passed (Yes or No) |
|---|---|---|
| C1 | There are 6-8 vascular plant species per $m^2$ present, including at least 2 forbs (these may include those listed in Footnote 1). Note - this criterion is essential for achieving Moderate or Good condition. | |
| C2 | Sward height is varied (at least 20% of the sward is less than 7 cm and at least 20% is more than 7 cm) creating microclimates which provide opportunities for vertebrates and invertebrates to live and breed. | |
| C3 | Any scrub present accounts for less than 20% of the total grassland area. (Some scattered scrub such as bramble *Rubus fruticosus* agg. may be present). | |
| C4 | Physical damage is evident in less than 5% of total grassland area. Examples of physical damage include excessive poaching, damage from machinery use or storage, erosion caused by high levels of access, or any other damaging management activities. | |
| C5 | Cover of bare ground is between 1% and 10%, including localised areas (for example, a concentration of rabbit warrens)$^2$. | |
| C6 | Cover of bracken *Pteridium aquilinum* is less than 20%. | |
| C7 | There is an absence of invasive non-native plant species$^3$ (as listed on Schedule 9 of WCA$^4$). | |
| | Essential criterion achieved (Yes or No) | |
| | Number of criteria passed | |
| Condition Assessment Result | Condition Assessment Score | Score Achieved x/✓ |
| Passes 6 or 7 criteria including passing essential criterion A | Good (3) | |
| Passes 4 or 5 criteria including passing essential criterion A | Moderate (2) | |
| Passes 3 or fewer criteria; OR Passes 4 - 6 criteria (excluding criterion A) | Poor (1) | |

Start Survey — Uploaded Image | Criteria A | Criteria B | Criteria C | Criteria D

The scrub has a well-developed edge with scattered scrub and tall grassland and or forbs present between the scrub and adjacent habitat. — 1002

No / Yes — 1004

Comment 1006

No scrub or grassland features were observed between this habitat and adjoining habitats. — 1008

Next — 1010

Start Survey — Location Details | Upload Image | Criteria A | Criteria B

The habitat parcel contains different plant species that are beneficial for wildlife, for example flowering species providing nectar sources for a range of invertebrates at different times of year. — 1002

Yes / No — 1004

Comment 1006

Multiple plant species including flowering plants were observable. — 1008

Next — 1010

1000

| | Metric | Biodiversity ▼  1104 | | | | 1102 | | | Habitat Type View ⚪ Polygon View  1108 1110 | |
|---|---|---|---|---|---|---|---|---|---|---|
| Habitat | Habitat Area (ha) | Length (km) | Distinctiveness | Condition | Strategic Significance | Watercourse Encroachment | Riparian Encroachment | Biodiversity | Biodiversity (NVP) (£) |
| ⊙ Mixed Scrub | 0.21 | -- | Medium | Poor | Low | -- | -- | 0.83 | 16.61K |
| ⊙ Mixed Scrub | 0.08 | -- | Medium | Poor | Low | -- | -- | 0.31 | 6.15K |
| ⊙ Mixed Scrub | 0.01 | -- | Medium | Good | Low | -- | -- | 0.07 | 1.31K |
| ⊙ Mixed Scrub | 0.01 | -- | Medium | Poor | Low | -- | -- | 0.05 | 900.41 |
| Other ⊙ Neutral Grassland | 0.01 | -- | Medium | Moderate | Low | -- | -- | 0.12 | 2.32K |
| Other ⊙ Neutral Grassland | 0.01 | -- | Medium | Moderate | Low | -- | -- | 0.02 | 327.47 |
| Other ⊙ Woodland; Broadleaved | 0.02 | -- | Medium | Moderate | Low | -- | -- | 0.16 | 3.19K |
| Floodplain ⊙ Wetland Mosaic And Cfgm | 0.02 | -- | High | Poor | Low | -- | -- | 0.11 | 2.26K |
| ⊙ Lowland Heathland | 0.02 | -- | High | Moderate | Low | -- | -- | 0.23 | 4.56K |
| ⊙ Developed Land Sealed Surface | 0.02 | -- | Very Low | Good | Low | -- | -- | 0.00 | 0.00 |

1100

Dashboard
Site Management
Site Plans
Users
Logout

FIG. 11

```
class FeatureCalculator:
    def __init__(self):
        pass def reorder_columns(self, df):
        columns = df.columns.values.tolist()
        columns.remove("geometry")
        columns.append("geometry")
        df = df[columns]
        return df def calculate(self, df, raster_file, output_dir, column, features=[], feature_groups
        shp_path = os.path.join(output_dir, "tmp_process.shp")
        df.to_file(shp_path)

features_dict = {"features":features, "feature_groups": feature_groups}
        fe = Feature_Extractor(raster_path=raster_file, shapefile_path=shp_path, feature
                               dsm_path=None, dtm_path=None)

values = fe.extract()
        values = values.values.tolist()
        l = []
        df[column] = [round(x[0], 3) for x in values]
        df = self.reorder_columns(df)
        return df
```

FIG. 12A

```
from sklearn import metrics
from sklearn.metrics import r2_score from sklearn.ensemble import RandomForestClassifier
creating a RF classifier
rf = RandomForestClassifier(n_estimators = 10)

# Training the model on the training dataset
# fit function is used to train the model using the training sets as parameters
model = rf.fit(X_train, y_train)

# performing predictions on the test dataset
y_pred = rf.predict(X_test)

# metrics are used to find accuracy or error
# using metrics module for accuracy calculation
print("ACCURACY OF THE MODEL: ", metrics.accuracy_score(y_test, y_pred))

# Model Precision: what percentage of positive tuples are labeled as such?
print("Precision:",metrics.precision_score(y_test, y_pred))

# Model Recall: what percentage of positive tuples are labelled as such?
print("Recall:",metrics.recall_score(y_test, y_pred))

print("R2:", r2_score(y_test,y_pred))
```

FIG. 12B

| Low Distinctive Grassland Condition Assessment | | |
|---|---|---|
| Criterion | Method | Features |
| C1- Number of species present between 6 to 8 | Generic AI model | Median – NIR, Mean – DVI, MSAVI2 |
| C2 - Sward height > 7 cm for 20% and sward height < 7 cm for 20% land parcel | Unique model | Drone based – DSM, DTM |
| C3- Scattered Scrub < 20% | Generic AI model | Mean – NDVI, LAI, EVI, SAVI, MSAVI2, NDBI, CVI, Brightness, Gray, GNDVI, GCI, NDSI, DVI, AVI, NG, BNDVI, CIG, GI, PBI, VI, PGR, WRDVI, VARI, VARI-G, SOCI, Contrast, Dissimilarity, Homogeneity, Energy, Correlation, ASM, Red, Green, Blue, NIR, Contrast-45, Dissimilarity-45, Homogeneity-45, Energy-45, Correlation-45, ASM-45, Median – Red, Green, Blue, NIR |
| C4 - Evident physical damage < 5 % | Generic AI model | Mean – NDVI, LAI, Brightness, Gray, CIG, PGR, VARI, VARIG, SOCI, Contrast, Dissimilarity, Energy0, NIR, Homogeneity, Median – Red, NIR |
| C5 - Bare ground surface < 10 % | Unique model | mBSI |

| Medium/High/Very High Distinctive Grassland Condition Assessment | | |
|---|---|---|
| Criterion | Method | Features |
| C1 - Grassland - match UKHab description. Subjective query | AI-LULC | Red, Green, and Blue |
| C2 - Sward height > 7 cm for 20% and sward height < 7 cm for 20% land parcel | Unique model | Drone based - DSM, DTM |
| C3 - Bare ground surface < 10 % | Unique model | mBSI |
| C4 - Bracken cover < 20 % | Generic AI model | Mean – NDVI, LAI, EVI, SAVI, MSAVI2, NDBI, CVI, Brightness, Gray, GNDVI, GCI, NDSI, DVI, AVI, NG, BNDVI, CIG, GI, PBI, VI, PGR, WRDVI, VARI, VARI-G, SOCI, Contrast, Dissimilarity, Homogeneity, Energy, Correlation, ASM, Red, Green, Blue, NIR, Contrast-45, Dissimilarity-45, Homogeneity-45, Energy- 45, Correlation-45, ASM-45, Median – Red, Green, Blue, NIR |
| C5 - Evident physical damage < 5 %, And no non-native species present | Generic AI model | Mean – NDVI, LAI, Brightness, Gray, CIG, PGR, VARI, VARIG, SOCI, Contrast, Dissimilarity, Energy0, NIR, Homogeneity, Median – Red, NIR |

| Metric \| Biodiversity ▾ | | | | | |
|---|---|---|---|---|---|
| Site Name | Area (ha) | ← Biodiversity unit | Biodiversity/Area | Opportunity Score | Change vs Baseline |
| Site 1001 Dev | 16.92 | 184.25 | 2.14 | 0 | 15% View |
| Site 1002 | 29.01 | 116.018 | 4.00 | 0 | 4% View |
| Site 10018 | 28.57 | 106.59 | 18.59 | 0 | 5% View |
| Site 1004 | 19.55 | 149.72 | 7.66 | 0 | 18% View |
| Site 1005 | 14.81 | 26.418 | 1.78 | 0 | 19% View |
| Site 1006 | 19.58 | 81.72 | 4.09 | 0 | 6% View |
| Site 1007 | 1817.44 | 1119.81 | 18.518 | 0 | 0% View |

| All Business Unit ▾ | Search by plan name | | | | | | | | |
|---|---|---|---|---|---|---|---|---|---|
| Area Under Planning (ha) 107.63 | Pre-intervention biodiversity 1229.66 Units | Post-intervention biodiversity 2022.64 Units | Change in biodiversity +64.49% +792.98 Units | Total Cost £34,500 | | | | | |

| Plan Name | Created At | Approved At | Est. Start Date | Est. End Date | Budget | Author | Site Name | Status |
|---|---|---|---|---|---|---|---|---|
| Arable reversal | 2022-03-23 | 2022-03-23 | 2027-03-23 | 2027-03-23 | £5,000 | Chris | Site 110 | Approved |
| Demo plan One | 2022-02-18 | NA | 2022-02-18 | 2022-02-18 | £1,000 | Admin | Site 106 | Rejected |
| Fen - Wetland restoration and arable conversion | 2022-03-23 | 2022-03-23 | 2022-03-23 | 2022-03-23 | £6,000 | Chris | Site 147 | Approved |
| plan test Two | 2022-03-10 | NA | 2022-03-10 | 2022-03-10 | £100,000 | Chris | Site 101 | Rejected |
| Site 103 arable modification scrub and grassland creation | 2022-03-23 | 2022-03-24 | 2022-03-23 | 2022-03-23 | £10,000 | Chris | Site 130 | Approved |
| Site 109 - Management plan improve exiting habitats | 2022-04-28 | NA | 2022-04-28 | 2022-04-28 | £3,750 | Chris | Site 109 | Pending Approval |
| Site 109 - Modified grassland - neutral grassland restoration | 2022-03-22 | NA | 2022-03-22 | 2022-03-22 | £2,500 | Chris | Site 119 | Draft |
| Site 106 - planned changes | 2022-03-23 | NA | 2022-03-23 | 2022-03-23 | £5,000 | Chris | Site 146 | Pending Approval |

FIG. 17H

SYSTEMS AND METHODS FOR GENERATING HABITAT CONDITION ASSESSMENTS

CROSS-REFERENCE TO RELATED APPLICATIONS

This application claims priority to and seeks the benefit of U.S. Provisional Patent Application No. 63/616,396, filed on Dec. 29, 2023, and entitled "SYSTEMS AND METHODS FOR GENERATING HABITAT CONDITION ASSESSMENTS," which is incorporated in its entirety herein by reference. This application is also related to U.S. patent application Ser. No. 18/149,036, filed on Dec. 30, 2022, and entitled "DEVICES, METHODS, AND GRAPHICAL USER INTERFACES FOR ANALYZING, LABELING, AND MANAGING LAND IN A GEOSPATIAL PLATFORM", now issued as U.S. Pat. No. 11,842,537, which is incorporated in its entirety herein by reference.

FIELD OF THE INVENTION(S)

Embodiments of the present invention(s) are generally related to generating condition assessments for habitats, and in particular to generating condition assessments based on artificial intelligence- and/or machine learning-model(s) and/or other software model responses to condition assessment criteria.

BACKGROUND

Geographic regions, or land, throughout the world may need to be analyzed and monitored for a variety of reasons. For instance, a site (or parcel of land) may be analyzed to determine land use, which may indicate how the site is being used. As another example, a site may be analyzed to determine land cover, which may identify various habitats represented in the site. Such analyses may be helpful for land use planning and development. Often, sites may also need to be monitored over time, for example, to measure changes to an environment, evaluate environmental changes resulting from land conversions, or demonstrate regulatory compliance.

Furthermore, the condition of a site may need to be assessed to comply with governmental regulations. For example, a site's condition may need to be assessed before a permit may be issued to develop the site so as to, for example, analyze the environmental impact of the development.

SUMMARY

In some aspects, the techniques described herein relate to a non-transitory computer-readable medium including executable instructions, the executable instructions being executable by one or more processors to perform a method, the method including: receiving a geographic area, the geographic area having one or more geographic sub-areas, and for each geographic sub-area of the one or more geographic sub-areas: receiving image data for the geographic sub-area, generating a set of features using the image data, receiving a habitat for the geographic sub-area, identifying one or more condition assessment criteria based on the habitat, for each condition assessment criterion of the one or more condition assessment criteria: determining a subset of features of the set of features, and applying a trained model to the subset of features to obtain a response to the condition assessment criterion, generating a condition assessment for the habitat based on one or more responses to the one or more condition assessment criteria, and providing the condition assessment for the habitat.

In some aspects, the techniques described herein relate to a non-transitory computer-readable medium, the method further including for each geographic sub-area of the one or more geographic sub-areas: generating a biodiversity metric for the habitat based on the condition assessment for the habitat, and providing the biodiversity metric for the habitat.

In some aspects, the techniques described herein relate to a non-transitory computer-readable medium wherein the trained model includes a set of decision trees trained using a random forest classifier.

In some aspects, the techniques described herein relate to a non-transitory computer-readable medium wherein the one or more geographic sub-areas are one or more first geographic sub-areas, the image data is first image data, the set of features is a first set of features, the habitat is a first habitat, the one or more condition assessment criteria are one or more first condition assessment criteria, the response is a first response, and the method further including: receiving multiple second geographic sub-areas, and for each second geographic sub-area of the multiple second geographic sub-areas: receiving second image data for the second geographic sub-area, generating a second set of features using the second image data, receiving a second habitat for the second geographic sub-area, identifying one or more second condition assessment criteria based on the second habitat, and for each second condition assessment criterion of the one or more second condition assessment criteria: determining a second subset of features of the second set of features, receiving a second response to the second condition assessment criterion, the second response obtained from an inspection of the second geographic sub-area, training a model on the second subset of features and the second response, and storing the trained model in association with the second condition assessment criterion.

In some aspects, the techniques described herein relate to a non-transitory computer-readable medium wherein the image data includes at least one of optical image data, hyperspectral image data, and synthetic aperture radar image data. In some embodiments, the image data may include a digital surface model (DSM) and/or a digital terrain model (DTM).

In some aspects, the techniques described herein relate to a non-transitory computer-readable medium wherein the image data includes satellite image data.

In some aspects, the techniques described herein relate to a non-transitory computer-readable medium wherein the response is a first response, and the method further including for each geographic sub-area of the one or more geographic sub-areas: for each condition assessment criterion of the one or more condition assessment criteria, receiving a second response to the condition assessment criterion, the second response obtained from an inspection of the geographic sub-area, generating an updated condition assessment for the habitat based on one or more second responses to the one or more condition assessment criteria, and providing the updated condition assessment for the habitat.

In some aspects, the techniques described herein relate to a non-transitory computer-readable medium, the method further including for each geographic sub-area of the one or more geographic sub-areas: for each condition assessment criterion of the one or more condition assessment criteria, obtaining a confidence score from applying the trained model to the subset of features, generating a confidence indication for the habitat based on one or more confidence scores for the one or more condition assessment criteria, and providing the confidence indication for the habitat.

In some aspects, the techniques described herein relate to a non-transitory computer-readable medium, the method further including for each geographic sub-area of the one or more geographic sub-areas, receiving one or more of digital terrain model data, digital surface model data, and canopy height model data for the geographic sub-area, wherein generating the set of features using the image data includes generating the set of features using the image data and one or more of the digital terrain model data, the digital surface model data, and the canopy height model data.

In some aspects, the techniques described herein relate to a method including: receiving a geographic area, receiving image data for the geographic area, generating a set of features using the image data, receiving a habitat for the geographic area, identifying a set of condition assessment criteria based on the habitat, for each condition assessment criterion in the set of condition assessment criteria: determining a subset of features of the set of features, and applying a trained model to the subset of features to obtain a response to the condition assessment criterion, generating a condition assessment for the habitat based on the response to each condition assessment criterion in the set of condition assessment criteria, and providing the condition assessment for the habitat.

In some aspects, the techniques described herein relate to a method, further including: generating a biodiversity metric for the habitat based on the condition assessment for the habitat, and providing the biodiversity metric for the habitat.

In some aspects, the techniques described herein relate to a method wherein the trained model includes a set of decision trees trained using a random forest classifier.

In some aspects, the techniques described herein relate to a method wherein the geographic area is a first geographic area, the image data is first image data, the set of features is a first set of features, the habitat is a first habitat, the set of condition assessment criteria is a first set of condition assessment criteria, the response is a first response, and the method further including: receiving multiple second geographic areas, and for each second geographic area of the multiple second geographic areas: receiving second image data for the second geographic area, generating a second set of features using the second image data, receiving a second habitat for the second geographic area, identifying a second set of condition assessment criteria based on the second habitat, and for each second condition assessment criterion of the second set of condition assessment criteria: determining a second subset of features of the second set of features, receiving a second response to the second condition assessment criterion, the second response obtained from an inspection of the second geographic area, training a model on the second subset of features and the second response, and storing the trained model in association with the second condition assessment criterion.

In some aspects, the techniques described herein relate to a method wherein the image data includes at least one of optical image data, hyperspectral image data, synthetic aperture radar image data, digital surface model (DSM), and/or a digital terrain model (DTM).

In some aspects, the techniques described herein relate to a method wherein the image data includes satellite image data.

In some aspects, the techniques described herein relate to a method wherein the response is a first response, and the method further including: for each condition assessment criterion of the set of condition assessment criteria, receiving a second response to the condition assessment criterion, the second response obtained from an inspection of the geographic area, generating an updated condition assessment for the habitat based on the second response to each condition assessment criterion of the set of condition assessment criteria, and providing the updated condition assessment for the habitat.

In some aspects, the techniques described herein relate to a method, the method further including: for each condition assessment criterion of the set of condition assessment criteria, obtaining a confidence score from applying the trained model to the subset of features, generating a confidence indication for the habitat based on the confidence score for each condition assessment criterion of the set of condition assessment criteria, and providing the confidence indication for the habitat.

In some aspects, the techniques described herein relate to a method, the method further including receiving one or more of digital terrain model data, digital surface model data, and canopy height model data for the geographic area, wherein generating the set of features using the image data includes generating the set of features using the image data and one or more of the digital terrain model data, the digital surface model data, and the canopy height model data.

In some aspects, the techniques described herein relate to a system including at least one processor and memory containing executable instructions, the executable instructions being executable by the at least one processor to: receive a geographic area, receive image data for the geographic area, generate a set of features using the image data, receive a habitat for the geographic area, determine one or more condition assessment criteria based on the habitat, apply one or more trained models to one or more subsets of the set of features to obtain one or more responses to the one or more condition assessment criteria, generate a condition assessment for the habitat based on the one or more responses, and provide the condition assessment for the habitat.

In some aspects, the techniques described herein relate to a system, the executable instructions being further executable by the at least one processor to generate a biodiversity metric for the habitat based on the condition assessment for the habitat and provide the biodiversity metric for the habitat.

BRIEF DESCRIPTION OF THE DRAWINGS

FIG. 8 depicts condition assessment criteria for a habitat in some embodiments.

FIGS. 10A-D depict an example user interface for receiving responses to condition assessment criteria in some embodiments.

FIG. 11 depicts an example user interface for displaying condition assessments and biodiversity metrics for habitats in some embodiments.

FIG. 12A depicts example code that the habitat condition assessment system may utilize to generate a set of features.

FIG. 12B depicts example code that the habitat condition assessment system may utilize to train a model and to apply the trained model.

FIG. 13A and FIG. 13B depict tables of example subsets of features that the habitat condition assessment system may determine for several criteria for two different habitats.

FIGS. 17A-17I illustrate example interfaces according to some embodiments.

Throughout the drawings, like reference numerals will be understood to refer to like parts, components, and structures.

DETAILED DESCRIPTION

Figure 1A:
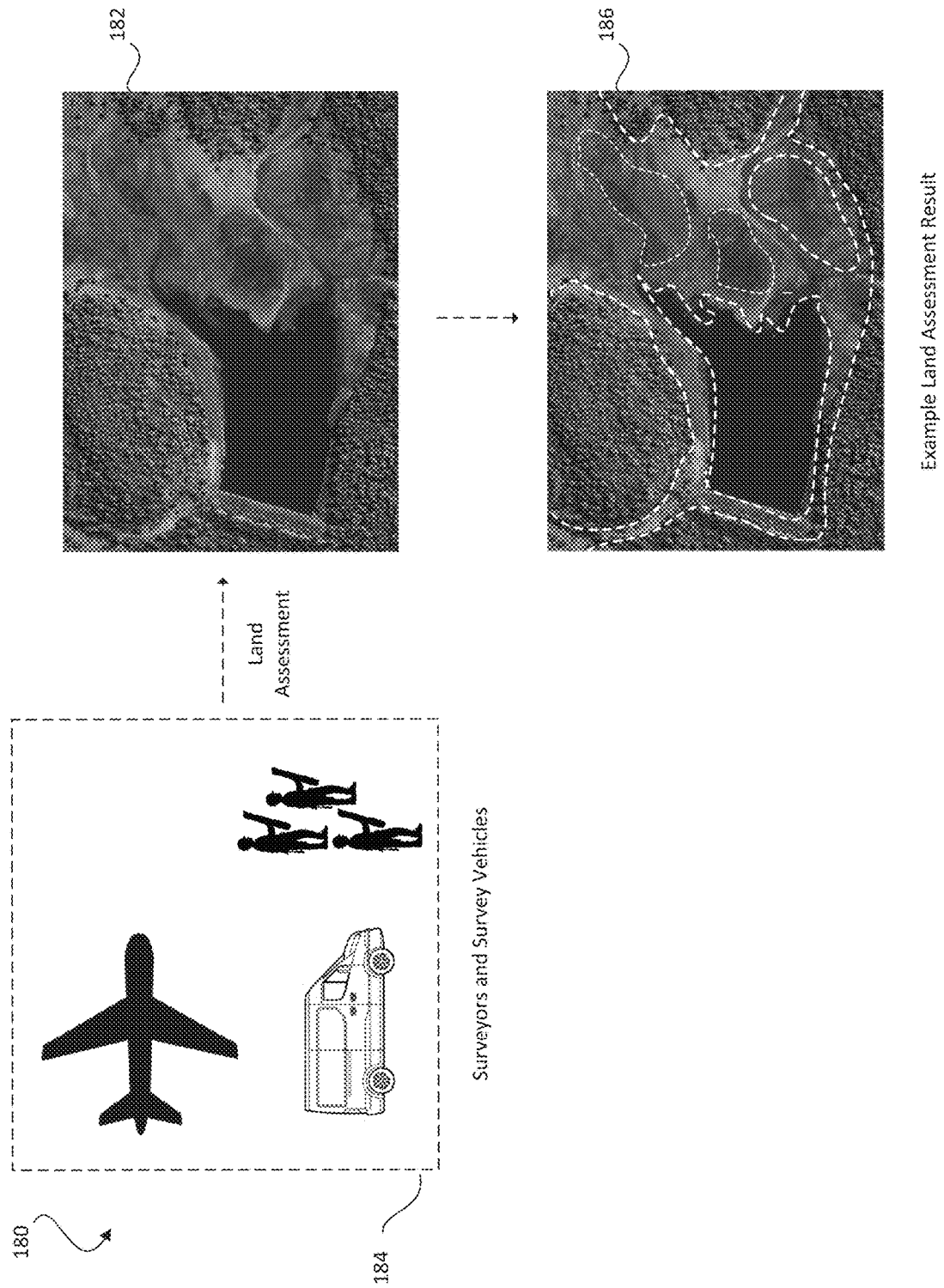
FIG. 1A depicts a conventional process for assessing a parcel of land.

Geographic regions, or land, throughout the world may need to be analyzed and monitored for a variety of reasons. For example, a survey may be conducted to determine topographical features associated with a parcel of land. The survey may result in a written document or drawing that provides various dimensions (e.g., shape, boundaries, or the like) of the parcel and its physical features, including natural and manufactured features. The parcel of land may include numerous habitats, and the written document or drawing(s) may include, for each habitat, the area of the habitat and a classification of that habitat according to a classification system. For example, in the United Kingdom (UK), there are hundreds of different habitats. The Defra Statutory BNG Metric uses a classification system designed for classifying terrestrial and freshwater habitats in the UK for the purposes of assessing Biodiversity Net Gain (BNG). Systems and methods discussed herein may utilize any number of different classification systems (e.g., other jurisdictions outside the UK may have other classification systems, such as EUNIS, Phase 1, NVC, etc., that may be used in conjunction with some systems and methods described herein).

Furthermore, the conditions of habitats in a geographic area may need to be assessed for various reasons, such as to comply with governmental regulations. For example, in the UK, in order to develop certain geographic areas (for example, parcels that may contain more than 0.5 Hectares), the habitats of the geographic areas need to be determined (for example, woodland, grassland low distinctiveness, or the like), and the conditions of the habitats must also be assessed. A habitat has a series of questions or criteria associated with it, and an assessor, such as an ecologist, must survey the site and determine responses to the questions or criteria. The condition of a habitat is based on the responses to the questions or criteria. In some embodiments, a habitat in the UK may have a condition assessment score (e.g., "Good," "Moderate," or "Poor") depending on the responses to the questions or criteria.

In another example, a development survey may be conducted before altering a parcel of land, for example, as part of a new development project planned for the parcel. The survey may involve environmental considerations, such as impact assessments, to study environmental consequences that may result from the proposed development. For example, a parcel of land may be subject to a land conversion project that replaces a forest habitat with grassland. In this example, an environmental assessment may attempt to measure the impact of the land conversion project, for example, in terms of ecological impact, such as loss of biodiversity or impact on protected species. The environmental assessment may also attempt to measure the impact of the land conversion project in terms of impact on air quality or carbon footprint or other such natural capital or environmental metrics. The environmental assessment may also result in a biodiversity assessment. The biodiversity assessment may be expressed as a biodiversity score, biodiversity unit, or other quantifiable value that indicates the biodiversity of the parcel of land.

The condition assessment score and the biodiversity score may be used to calculate a biodiversity metric for the parcel of land. In the UK, for example, a condition assessment score of "Good" has a value of three (3), a condition assessment score of "Moderate" has a value of two (2), and a condition assessment score of "Poor" has a value of one (1). The condition assessment score is used as a multiplier of the biodiversity score to determine a biodiversity metric. The biodiversity metric may be reported to regulatory authorities, who may utilize the biodiversity metric to monitor the biodiversity of the parcel of land and/or for other purposes.

FIG. 1A illustrates an example process 180 for assessing a parcel of land 182. The parcel of land 182 may be assessed by various land surveyors and/or survey vehicles 184. For instance, the parcel of land 182 may be assessed by human surveyors that may physically traverse the parcel of land 182 to determine, for example, land shape, boundaries, topography, and the ecological condition for each separate habitat in the parcel of land 182. The survey may also involve vehicles with specialized equipment to conduct the survey.

When assessing the parcel of land 182, surveyors may need to evaluate additional sources of information, such as aerial imagery of the parcel of land 182 or pre-existing land resources, such as topographic maps. The assessment process may span weeks or even months, as surveyors study their observations and reconcile their findings with the additional sources of information.

Once the assessment is complete, the surveyors may provide a written document or drawing that maps the parcel of land 182 and its related features. For example, in FIG. 1B, an example drawing 186 of the parcel of land 182 is determined. The drawing 186 and/or the written document provided by the surveyor(s) may provide various classifications of environmental features present in the parcel of land 182, such as water bodies, habitats, roads, boundaries, land, site boundaries, or areas protected or designated as protected by regulations or some other form of designation, The area segregated into habitats and such names of those habitats maybe defined for each using a classification approach, the condition of each separate habitat, the criteria used to define the condition status from field observations, and any supplementary evidence such as photographs, and/or field notes. In some embodiments, target notes are often included as examples within an appendix to the written document or drawing.

Such conventional approaches to land assessment may not be practical, especially when assessing remote or large parcels of land. For example, when assessing a large site, multiple surveyors and related resources may be needed to accurately map and classify the site. Large geographic areas, such as those in the size of hundreds or thousands of acres, may take significant amounts of time to assess. For example, a geographic area that is approximately 800 hectares (approximately 2000 acres) may take three (3) ecologists four (4) weeks or more to assess.

Furthermore, this survey may provide a point-in-time representation of the site, which may become stale over time as environmental features and conditions present during the initial assessment change. For example, the site may change over time due to naturally occurring phenomena. As an example, the site may experience significant growth in vegetation that drastically alters measurements that were previously determined for the site by the surveyors. As another example, the site may experience a significant loss in vegetation due to wildfires, which may result in deviations from measurements previously determined for the site by the surveyors.

In some instances, geographic locations may be subject to monitoring and observation, for example, due to environmental regulatory requirements or land use compliance requirements. For example, as part of a government grant, a parcel of land used for farming may be in the process of being converted as a wildlife haven. In this example, multiple assessments of the parcel of land would need to be conducted over time to measure conversion progress. Further assessments may need to be conducted to gain additional insights relating to the parcel. As examples, additional surveys may need to be conducted to measure biodiversity within the wildlife haven, detect any changes in condition, changes in sub-set condition criteria valuation and evidence of planned interventions, etc.

Given the limitations associated with conventional approaches to land assessment, there exists a need for solutions that can be used to analyze, plan, and monitor geographic regions without having to continually deploy significant resources to re-assess the geographic regions and measure resulting changes.

Various embodiments described herein provide solutions rooted in computer technology that solve problems arising in the realm of computer technology. In various embodiments, systems and methods discussed herein provide a geospatial platform that applies artificial intelligence and/or machine learning techniques to land assessment, planning, and monitoring, thereby improving land assessment accuracy and efficiency.

Figure 1B:
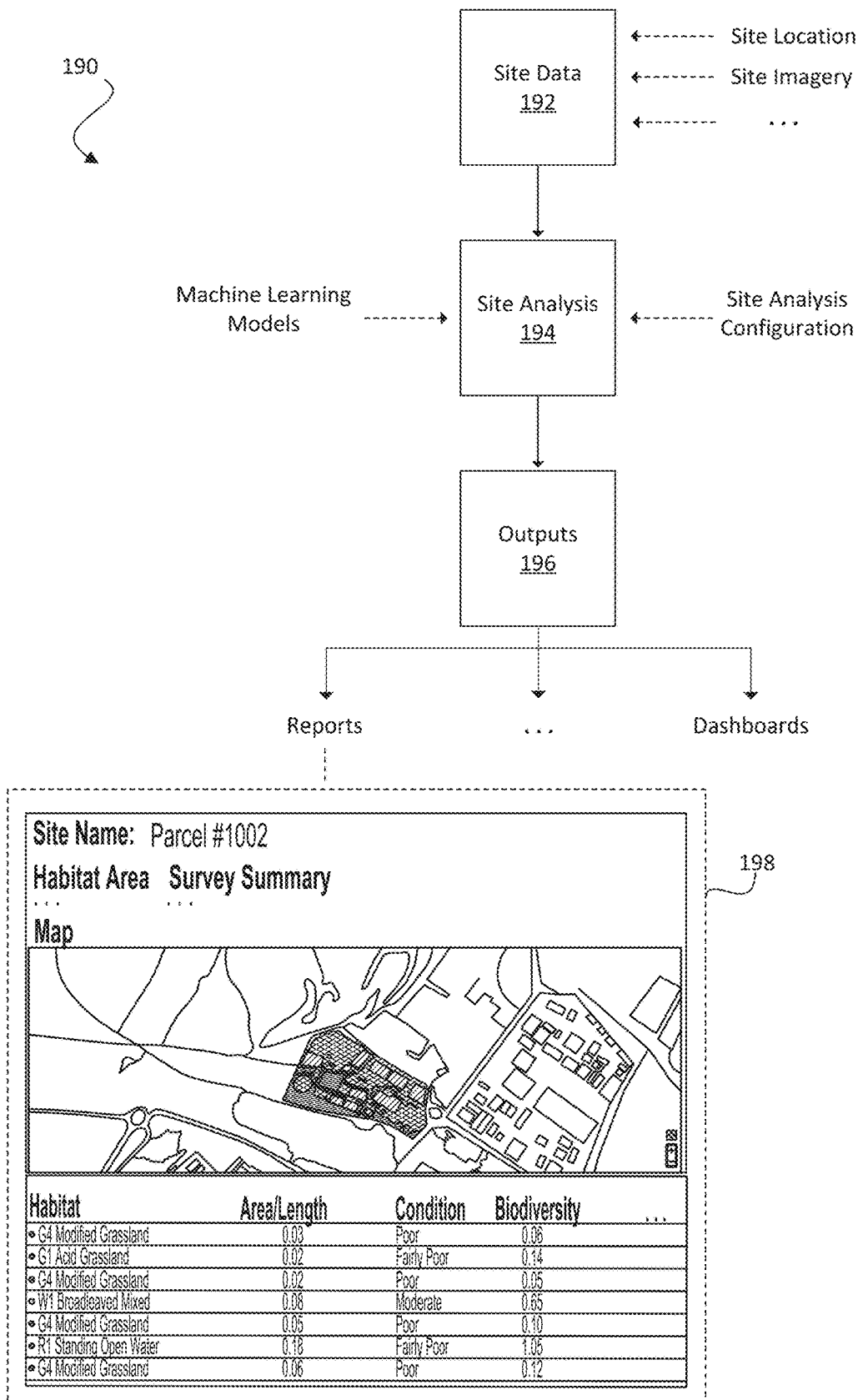
FIG. 1B depicts an example process for analyzing a parcel of land according to some embodiments.

For example, FIG. 1B depicts an example process 190 for analyzing a parcel of land, according to some embodiments. In step 192, site data for a parcel of land may be obtained. The site data may include geographical information describing a location of the parcel of land and data points (e.g., information or features related to the parcel of land). The data points may be non-image data and/or image data (e.g., aerial images from unmanned aerial vehicles (UAVs, commonly referred to as drones), aerial images from aircraft, satellite images, digital surface model images, images from mobile devices such as handheld cameras, or the like) of the parcel of land. In various embodiments, other sources of information, such as existing survey data and maps may also be used as site data.

In step 194, the parcel of land may be analyzed. For example, the parcel of land may be segmented into different sub-parcels and each sub-parcel may be assigned a habitat classification or habitat type. The area of each sub-parcel may also be determined. The biodiversity of the habitat may be determined for each habitat based on various factors. A condition of the habitat may also be determined. The biodiversity and the condition may be used to determine a biodiversity metric for the sub-parcel. The biodiversity metrics for each sub-parcel in the parcel of land may be aggregated to determine an overall biodiversity metric for the parcel of land.

Once a parcel of land has been analyzed, in step 196, information describing the parcel of land may be provided, for example, in a graphical user interface (GUI). The graphical user interface may provide access to various dashboards and reports 198 that provide information describing the parcel of land, including results of any analyses conducted with respect to the parcel of land. The graphical user interface may also provide access to tools that facilitate site planning and monitoring. Many other outputs and variations are possible.

A geospatial management engine as described herein may obtain image data, such as image data obtained from satellites, aircraft, UAV-drones, mobile devices such as handheld cameras, or other means, and use such image data and non-image data to perform the segmenting of the parcel of land, the determination of the area of the sub-parcel, the assignment of a habitat to a sub-parcel, and the determination of the biodiversity unit for the habitat. A habitat condition assessment system as described herein may utilize the image data and the non-image data to generate condition assessments based on artificial intelligence, and/or software derived analytics, and/or machine learning-modelled responses to condition assessment criteria. For example, the habitat condition assessment system may apply artificial intelligence and/or machine learning models to features obtained from the image data and the non-image data to generate responses to condition assessment criteria for habitats. The habitat condition assessment system may then generate condition assessments of habitats based on the responses.

The habitat condition assessment system may provide the condition assessments of the habitats to ecologists. The ecologists may access the condition assessments and the underlying responses while surveying a geographic area. The ecologists may modify and/or confirm the responses based on the site surveys. The habitat condition assessment system may obtain the modified or confirmed responses from the ecologists and use them to update the responses to condition assessment criteria as well as condition assessments of habitats. The habitat condition assessment system may then provide reports, dashboards, and other information to various parties, such as landowners, developers, and/or regulatory agencies.

Figure 1C:
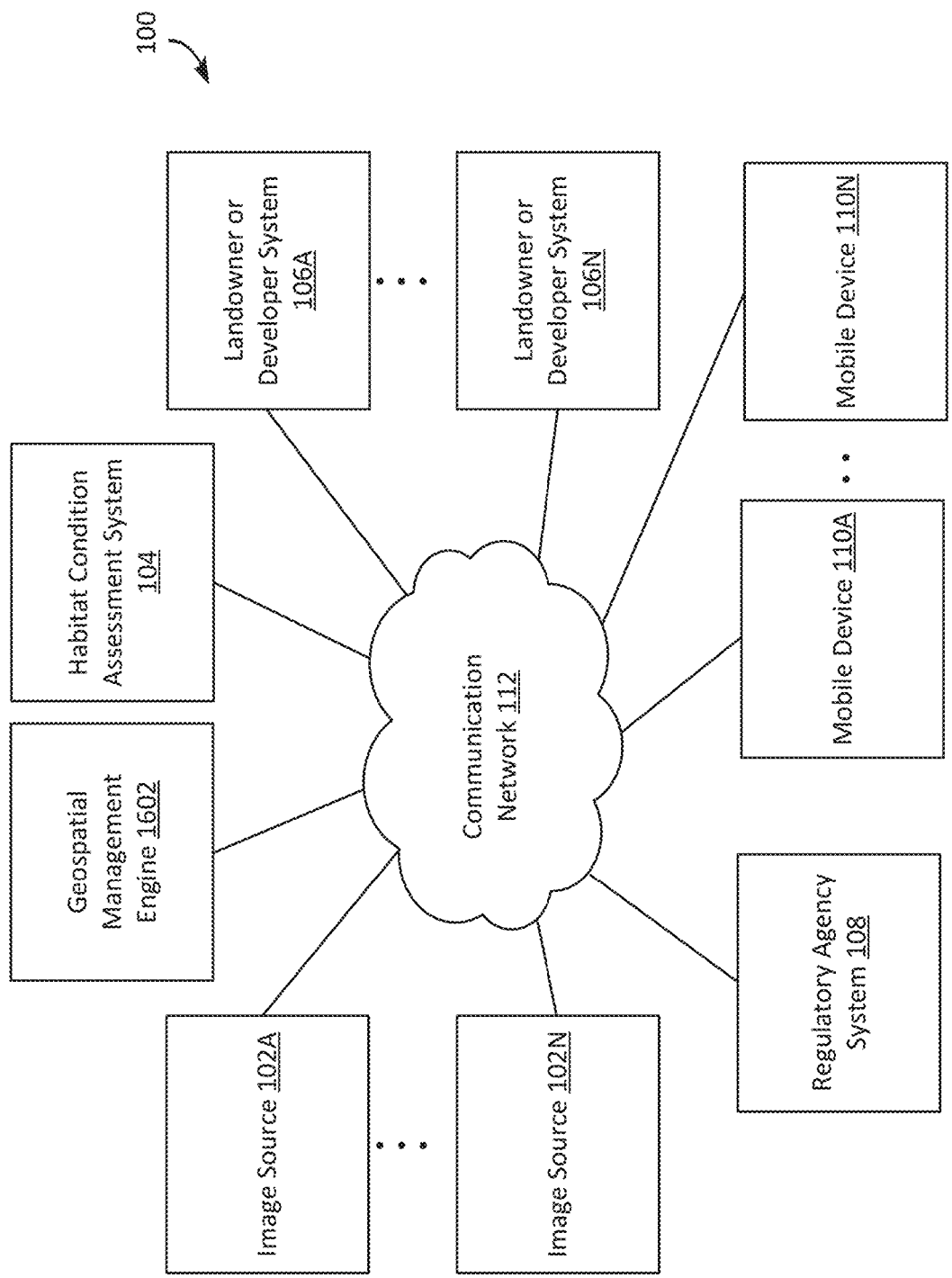
FIG. 1C is a block diagram depicting an example environment in which a habitat condition assessment system may operate in some embodiments.

FIG. 1C is a block diagram depicting an example environment 100 in which a habitat condition assessment system may operate in some embodiments. The environment 100 includes multiple image sources 102A through 102N (referred to as an image source 102 or as image sources 102), multiple landowner or developer systems 106A through 106N (referred to as a landowner or developer system 106 or as landowner or developer systems 106), a habitat condition assessment system 104, a regulatory agency system 108, multiple mobile devices 110A through 110N (referred to as a mobile device 110 or as mobile devices 110), the geospatial management engine 1602, and a communication network 112. Each of the image sources 102, the habitat condition assessment system 104, the landowner or developer system 106, the regulatory agency system 108, the mobile device 110, and the geospatial management engine 1602 may be or include any number of digital devices. A digital device is any device with at least one processor and memory. Digital devices are discussed further herein, for example, with reference to FIG. 20.

Image sources 102 may each be a third-party system configured to provide images or access to images. Different third parties may periodically capture images of geographic regions. For example, some third parties at regular intervals or on-demand may obtain images of geographic regions from satellites, airplanes, helicopters, and/or drones for a variety of purposes. Different third parties may obtain images from different sources (for example, different satellites, airplanes, helicopters, drones, or the like) for the same and/or different geographic regions. An example of a third-party that captures, collects, and/or provides images covering geographic regions is Airbus Aerial. The third parties may provide images and/or license access to the images to other businesses for a variety of purposes (e.g., via one or more image sources 102).

In some embodiments, any number of the image sources 102 may obtain images of the same geographic area (e.g., from satellites, aircraft, and/or drones) and save them over time. As such, an image source 102 may obtain and store images of the same geographic site taken on different days, months, or years. For example, an image source 102 may provide images at a first duration of time (for example, taken at a particular time and date). The image source 102 may also provide images at a second duration of time of the same geographic areas (for example, taken at a different particular time or date such as one or more years before or after the first duration).

Any number of the image sources 102 may provide application programming interfaces (APIs) to enable another system (for example, the habitat condition assessment system 104) to request images for a particular geographic area. The request may be a request for current images and/or for images of the same geographic areas taken at different times. In various embodiments, the other business may request information on what geographic area images are available and at what time frames. A geographic area may be any portion of the earth. A geographic area may have one or more geographic sub-areas.

The habitat condition assessment system 104 may receive image data from the image sources 102 for a geographic area and generate a set of features using the image data. The habitat condition assessment system 104 may receive a habitat from the geospatial management engine 1602 and identify one or more condition assessment criteria based on the habitat. For each condition assessment criterion of the one or more condition assessment criteria, the habitat condition assessment system 104 may determine a subset of features of the set of features and apply a trained model to the subset of features to obtain a response to the condition assessment criterion. The habitat condition assessment system 104 may generate a condition assessment for the habitat based on one or more responses to the one or more condition assessment criteria and provide the condition assessment for the habitat to, for example, the landowner or developer system 106 and/or the regulatory agency system 108. The habitat condition assessment system 104 may also generate a biodiversity metric for the habitat based on the condition assessment for the habitat and provide the biodiversity metric for the habitat to, for example, the landowner or developer system 106 and/or the regulatory agency system 108.

The landowner or developer system 106 may be operated by a first entity such as a landowner or developer. The regulatory agency system 108 may be operated by a second entity that is a governmental entity, such as a local planning authority, from which a landowner or developer must obtain a license or permit before planning a development on a geographic area or developing a geographic area. The mobile device 110 may be operated by third entities such as engineering firms or ecological consultancy firms. Such engineering firms or ecological consultancy firms may employ ecologists who utilize the mobile devices 110 as part of their duties in surveying geographic areas.

Although the environment 100 depicts only a single habitat condition assessment system 104 and a single regulatory agency system 108, there may be any number of habitat condition assessment system 104 and any number of regulatory agency system 108 in the environment 100.

In some embodiments, the communication network 112 may represent one or more computer networks (for example, LAN, WAN, and/or the like). The communication network 112 may provide communication between any of the image sources 102, the habitat condition assessment system 104, the landowner or developer system 106, the regulatory agency system 108, the mobile device 110, and the geospatial management engine 1602. In some implementations, the communication network 112 comprises computer devices, routers, cables, and/or other network topologies. In some embodiments, the communication network 112 may be wired and/or wireless. In various embodiments, the communication network 112 may comprise the Internet, one or more networks that may be public, private, IP-based, non-IP based, and so forth.

Figure 1D:
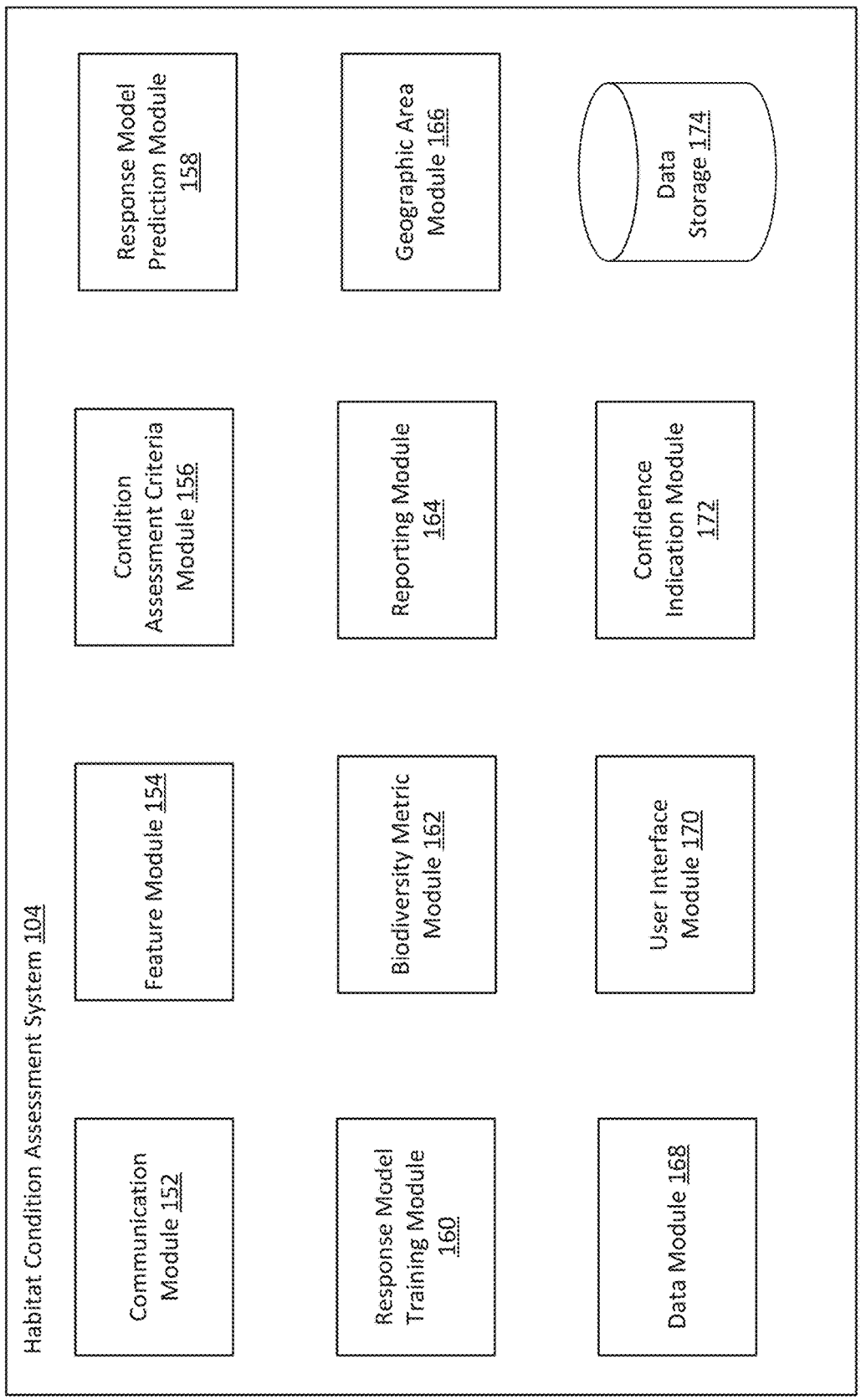
FIG. 1D is a block diagram depicting components of a habitat condition assessment system in some embodiments.

FIG. 1D is a block diagram depicting components of the habitat condition assessment system 104 in some embodiments. The habitat condition assessment system 104 may include a communication module 152, a feature module 154, a condition assessment criteria module 156, a response model prediction module 158, a response model training module 160, a biodiversity metric module 162, a reporting module 164, a geographic area module 166, a data module 168, a user interface module 170, a confidence indication module 172, and a data storage 174.

The communication module 152 may send requests and/or data between the habitat condition assessment system 104 and any of the image sources 102, the landowner or developer systems 106, the regulatory agency system 108, the mobile devices 110, and the geospatial management engine 1602. The communication module 152 may also receive requests and/or data from any of the habitat condition assessment system 104 and any of the image sources 102, the landowner or developer systems 106, the regulatory agency system 108, the mobile devices 110, and the geospatial management engine 1602.

The geographic area module 166 may receive a geographic area having multiple geographic sub-areas. The geographic area module 166 may also receive multiple geographic sub-areas. The data module 168 may receive image data and/or non-image data for a geographic area and/or a geographic sub-area. The image data may include at least one of optical image data, hyperspectral image data, and synthetic aperture radar image data. The non-image data may include digital terrain model data, digital surface model data, and/or canopy height model data.

The feature module 154 may generate a set of features using image data and/or non-image data. The feature module 154 may also determine a subset of features of the set of features for each condition assessment criterion of one or more condition assessment criteria. The condition assessment criteria module 156 may identify one or more condition assessment criteria based on a habitat and generate a condition assessment for the habitat based on one or more responses to the one or more condition assessment criteria.

The response model training module 160 may train a model on the subset of features and the response and store the trained model in association with the condition assessment criterion. The response model prediction module 158 may apply the trained model to the subset of features to obtain a response to a condition assessment criterion. The response model prediction module 158 may also obtain a confidence score from applying the trained model to the subset of features. The confidence indication module 172 may generate a confidence indication for a habitat based on one or more confidence scores for the one or more condition assessment criteria.

The biodiversity metric module 162 may generate a biodiversity metric for the habitat based on the classification of the habitat and the condition assessment for the habitat. The reporting module 164 may provide a condition assessment, a biodiversity metric, and a confidence indication for the habitat. The user interface module 170 may provide user interfaces that are used to provide data to and/or receive data from users.

The data storage 174 may include data stored, accessed, and/or modified by any of the modules of the habitat condition assessment system 104. The data storage 174 may include any number of data storage structures such as tables, databases, lists, and/or the like. The data storage 174 may include data that is stored in memory (for example, random access memory (RAM)), on disk, or some combination of in-memory and on-disk.

A module of the habitat condition assessment system 104 may be hardware, software, firmware, or any combination. For example, each module may include functions performed by dedicated hardware (for example, an Application-Specific Integrated Circuit (ASIC), a Field Programmable Gate Array (FPGA), or the like), software, instructions maintained in ROM, and/or any combination. Software may be executed by one or more processors. Although a limited number of modules are depicted in FIG. 1D, there may be any number of modules. Further, individual modules may perform any number of functions, including functions of multiple modules as described herein.

Figure 2:
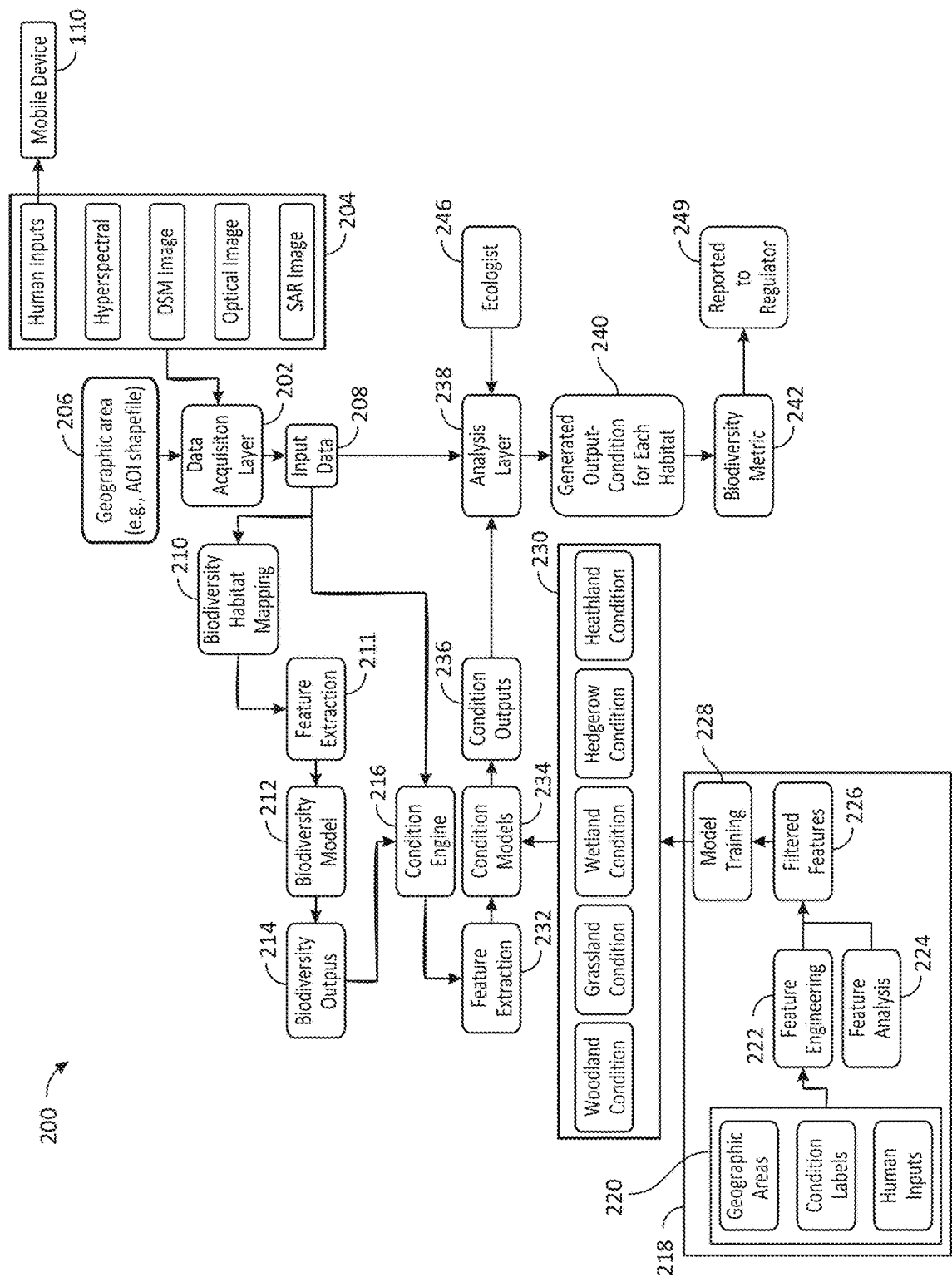
FIG. 2 is a diagram depicting systems and methods for generating condition assessments for habitats in some embodiments.

FIG. 2 is a diagram depicting systems and methods 200 for generating condition assessments for habitats in some embodiments. The systems and methods 200 include a data acquisition layer 202 receiving a geographic area 206, which may be an area of interest (AOI) defined by, for example, a shapefile. The data acquisition layer 202 also receives data 204 from, for example, image sources 102. The data 204 may include optical image data, hyperspectral image data, synthetic aperture radar image data. The data 204 may also include digital terrain model data, digital surface model data, and/or canopy height model data. The data may also include data obtained from devices operated by human persons, such as mobile devices 110.

The data acquisition layer 202 receives may be modified, such as by performing ETL (extract, transform and load) functions on the data, so as to generate input data 208. The geospatial management engine 1602 may perform biodiversity habitat mapping 210 and feature extraction 211 to generate a biodiversity model 212 and biodiversity outputs 214, which are provided to a condition engine 216.

The habitat condition assessment system 104 may train models 218 using, for example, ground truth data 220. The ground truth data 220 may include geographic areas (for example, in polygon form), image data and other data for the geographic areas, the habitats of the geographic areas, responses to condition assessment criteria obtained by inspections of habitats by, for example, human persons such as ecologists, and condition assessments that are determined based on the responses to the condition assessment criteria.

Feature engineering 222 may be performed on sets of features obtained from image data and other data for the geographic areas. Feature analysis 224 may be performed to determine subsets of features of the sets of features to utilize for training models for generating condition assessments for habitats. The feature analysis 224 may result in multiple subsets of features of the sets of features, which may be referred to as filtered features 226. The habitat condition assessment system 104 may train 228 one or more artificial intelligence (AI) and/or machine learning (ML) models using the filtered features 226 and the ground truth data 220 to generate multiple trained models 230.

In some embodiments, the habitat condition assessment system 104 may train multiple models for each habitat. The habitat condition assessment system 104 may train one model for each criterion used in determining a condition assessment for the habitat. In some embodiments, the habitat condition assessment system 104 may train a single model for a particular habitat. In some embodiments, the habitat condition assessment system may train individual models for each criteria using a common architecture or modeling pipeline while using respective data for each criterion. In some embodiments, the model may include a set of decision trees, and the habitat condition assessment system 104 may train the set of decision trees using a random forest classifier. In various embodiments, the habitat condition assessment system 104 may generate any number of models. The same architecture may generate models based on different inputs and/or configurations. In other embodiments, one or more different architectures (e.g., one or more different habitat condition assessment systems 104) may each generate any number of models.

A habitat for a geographic area may have multiple condition assessment criteria whose responses are used to determine the condition of the habitat. For the habitat, the habitat condition assessment system 104 may perform feature extraction 232 by generating a set of features using the data 204. The habitat condition assessment system 104 may apply one or more of the trained models 234 to one or more subsets of the set of features to obtain one or more responses 236 to the one or more condition assessment criteria. An analysis layer 238 of the habitat condition assessment system 104 may analyze the one or more responses 236 and generate 240 a condition assessment for the habitat based on the one or more responses. Ecologists may also provide responses to the one or more condition assessment criteria based on on-site inspections of the geographic area. The responses from ecologists 246 may be used to modify, update, and/or override responses generated by the habitat condition assessment system 104.

The habitat condition assessment system 104 may generate a biodiversity metric 242, such as biodiversity units, for the habitat based on the condition assessment for the habitat. The habitat condition assessment system 104 may provide 249 the condition assessment for the habitat and the biodiversity metric, such as to the regulatory agency system 108.

Figure 3:
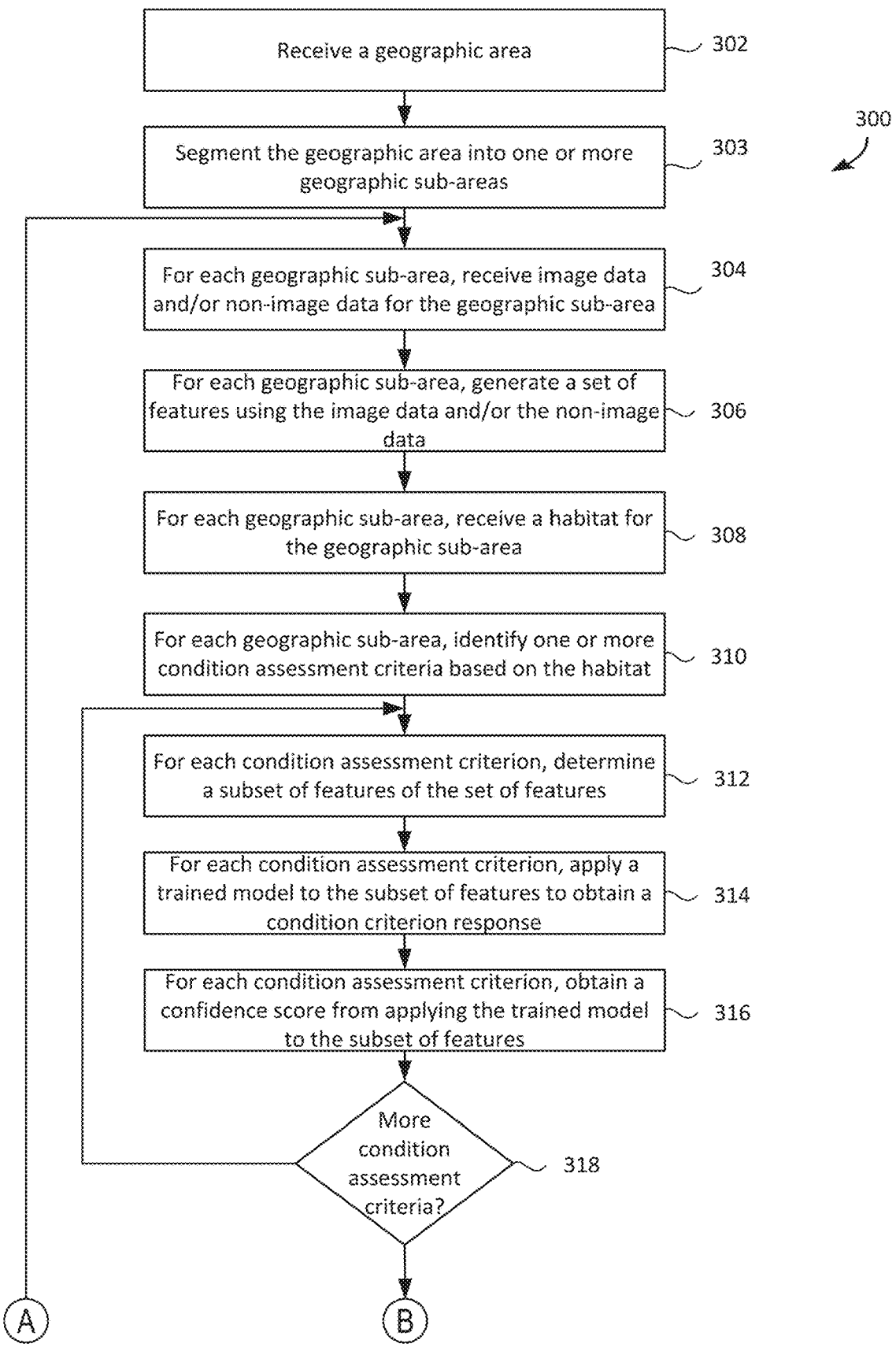
FIG. 3 is a flow diagram depicting a method for training models usable to generate condition assessments for habitats in some embodiments.
Figure 3:
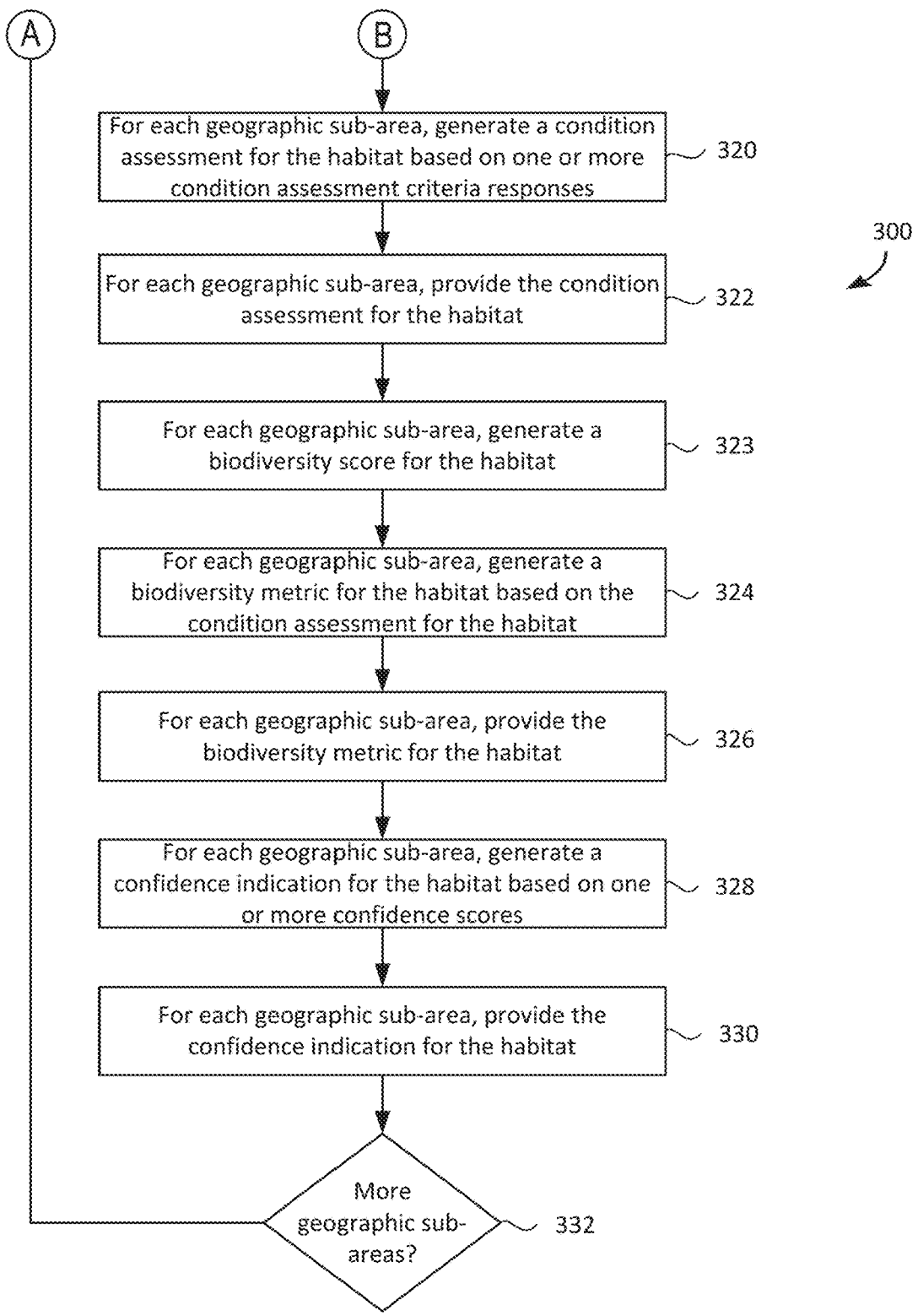

FIG. 3 is a flow diagram depicting a method 300 for generating and providing condition assessments for habitats in some embodiments. Various modules of the habitat condition assessment system 104 may perform the method 300. In some embodiments, various modules of the habitat condition assessment system 104 and various engines of the geospatial management engine 1602 perform the method 300. In some embodiments, various engines of the geospatial management engine 1602 perform the method 300.

The method 300 begins at step 302, where the habitat condition assessment system 104 (for example, the geographic area module 166) receives a geographic area. The geographic area may be an area of interest (AOI) defined by, for example, a shapefile. The geographic area may have already been segmented into one or more geographic sub-areas. If the geographic area has not yet been segmented into one or more geographic sub-areas, at step 303, the geospatial management engine 1602 may segment the geographic area into one or more geographic sub-areas as described herein. The geospatial management engine 1602 may then provide the one or more geographic sub-areas to the habitat condition assessment system 104. Each of the geographic sub-areas may also have an associated area expressed in units such as acres, hectares, square miles, square kilometers and the like.

Figure 5A:
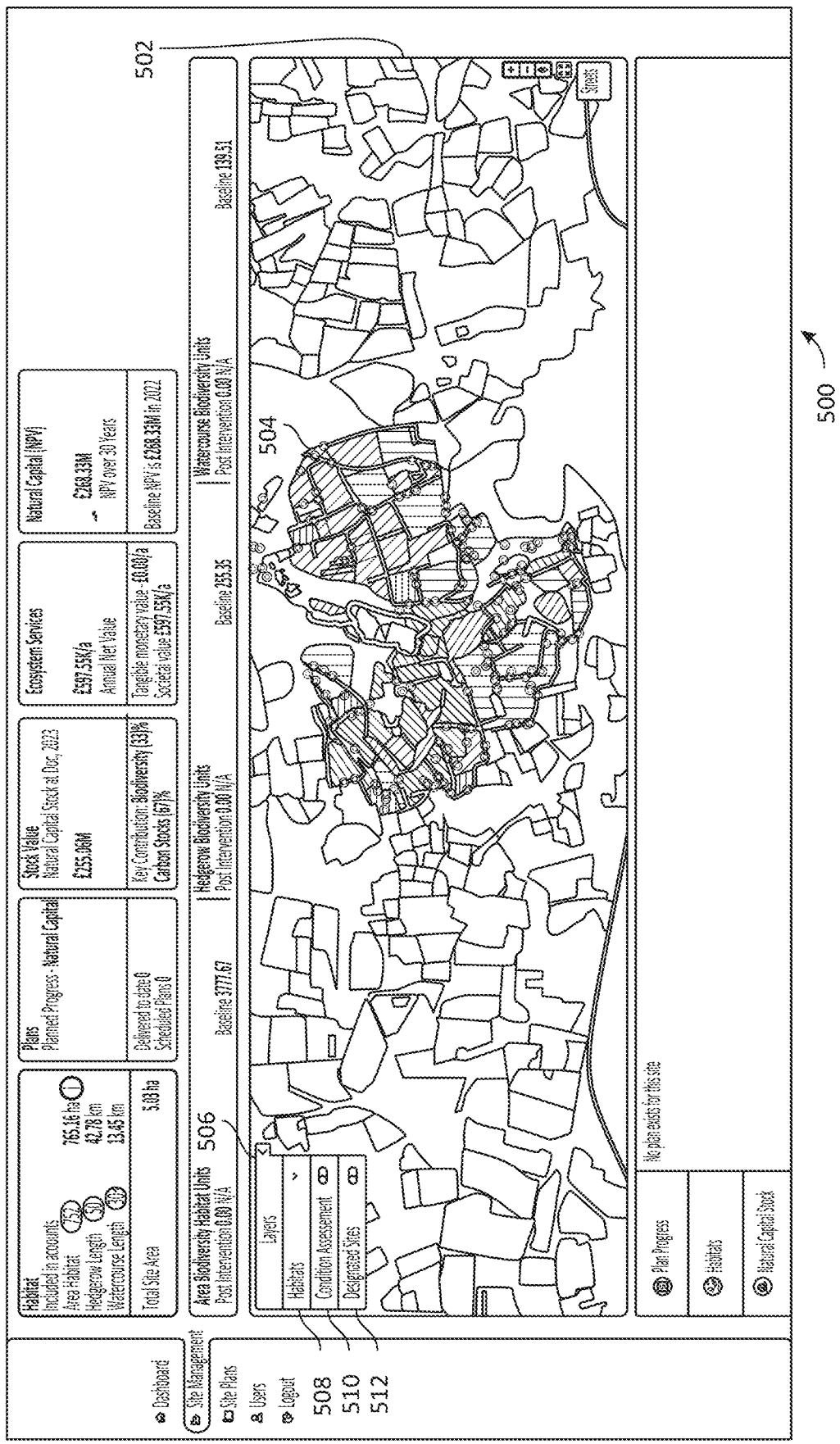
FIGS. 5A-C depict example user interfaces for displaying geographic areas, geographic sub-areas, habitats, and/or condition assessments for habitats in some embodiments.
Figure 5B:
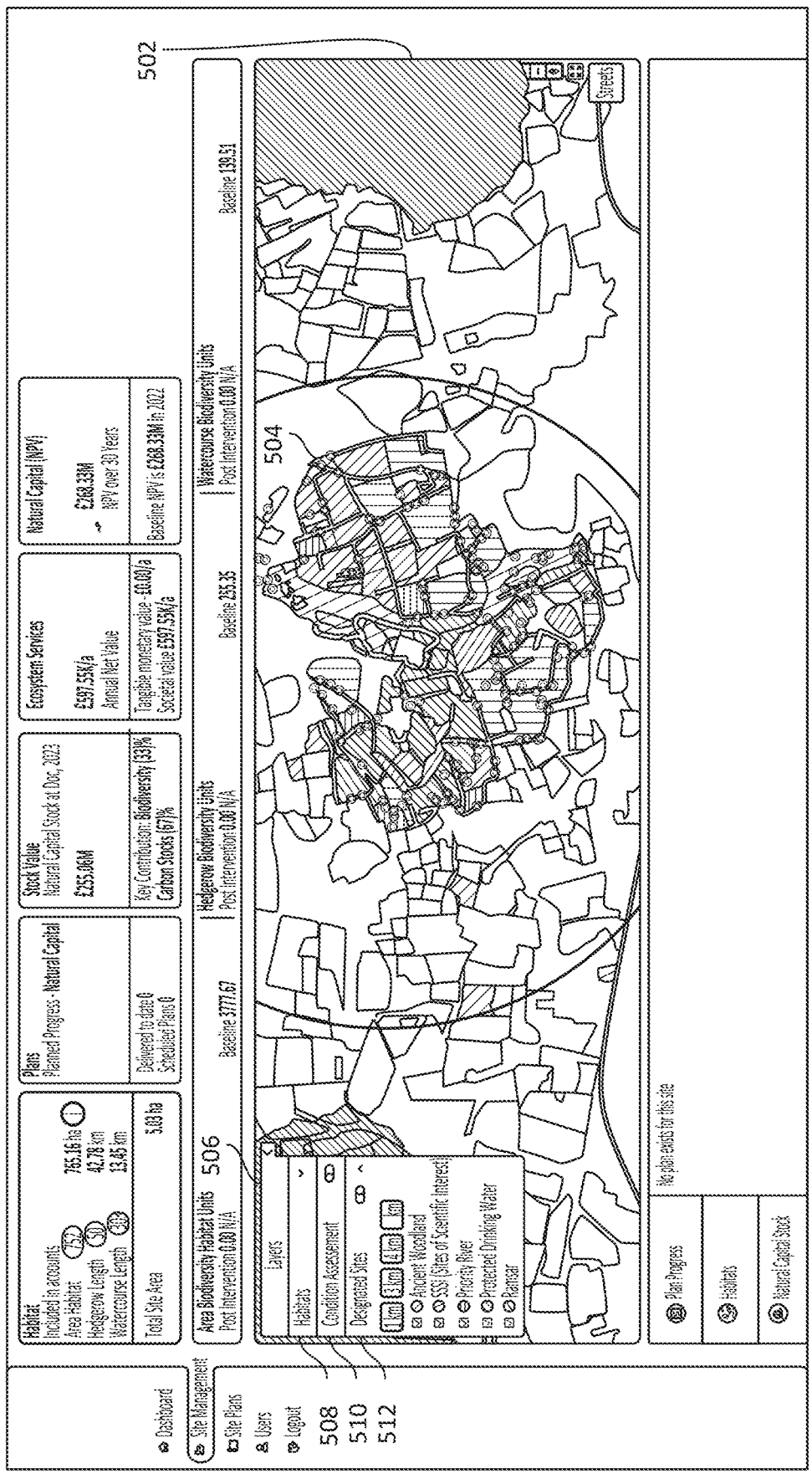

FIG. 5A depicts an example user interface 500 for displaying geographic areas, geographic sub-areas, and habitats in some embodiments. The habitat condition assessment system 104 (for example, the user interface module 170) may provide the user interface 500 and the other interfaces described herein. The user interface 500 includes a geographic region portion 502 in which a geographic area 504 is selected. The geographic area 504 includes multiple geographic sub-areas. The user interface 500 also includes a layers control panel 506. The layers control panel 506 includes a habitats portion 508 which allows a user to toggle on and off layers for different habitat types and a condition assessment toggle 510 which allows a user to toggle on and off layers for condition assessments for habitats. The layers control panel 506 further includes a designated sites toggle 512 which allows a user to toggle on and off layers for designated sites. FIG. 5B depicts the example user interface 500 with the designated sites toggle 512 toggled on, causing the geographic region portion 502 to display several layers for designated sites.

Returning to FIG. 3, the habitat condition assessment system 104 performs step 304 through step 332 for each geographic sub-area of the one or more geographic sub-areas. At step 304, the habitat condition assessment system 104 (for example, the data module 168) receives image data for the geographic sub-area. The image data may include at least one of optical image data, hyperspectral image data, and synthetic aperture radar (SAR) image data. The habitat condition assessment system 104 may select image data to avoid cloud cover, angle and excessive shadowing, dates with evidence of extensive precipitation before the image was taken, and dates that align with field surveys. The optical image data may be obtained from satellites, airplanes, drones, mobile devices, and/or any device and/or system capable of capturing optical images. Also at step 304, the habitat condition assessment system 104 (for example, the data module 168) may receive non-image data for the geographic sub-area. For example, the habitat condition assessment system 104 may receive one or more of digital terrain model data, digital surface model data, and canopy height model data for the geographic sub-area. Table 1 includes image data and non-image data that the habitat condition assessment system 104 may utilize.

TABLE 1

| Data Source | Spectral Bands/Polarization/Products | Spatial Resolution (m) |
| --- | --- | --- |
| Pleaides | Blue, Green, Red, Near-Infrared (NIR) | 0.5 |
| Drone-RGB | Blue, Green, Red | 0.5 |
| Sentinel-2 | Blue, Green, Red, Near-Infrared (NIR) Rededge1, Rededge2, Rededge3, Rededge4, SWIR-1, SWIR-2 | 0.5 |
| SAR data | HH- Polarization, HV-polarization, VV polarization, VH polarization | 6 or 10 |
| DEM-SRTM | Elevation, Aspect | 30 |
| Airborne LIDAR | digital surface model (DSM), digital terrain model (DTM) | 1 |

The SAR image data may be used to detect the amount or extent of moisture in land. In addition to wetness, SAR image data, as well as infrared, low-resolution RGBI, and/or hyperspectral image data, may be utilized to ascertain insights about a geographic sub-area such as phenology, photosynthesis performance, and biomass density. The habitat condition assessment system 104 may receive image data of a particular geographic area that was obtained multiple times over a period of time. The habitat condition assessment system 104 may detect the amount or extent of moisture in the land using the image data and use the detected amounts or extents of moisture as factors in determining the condition of the particular geographic area.

At step 306, the habitat condition assessment system 104 (for example, the feature module 154) generates a set of features using the image data and/or the non-image data. The habitat condition assessment system 104 may also use one or more of the digital terrain model data, the digital surface model data, and the canopy height model data to generate the set of features. FIG. 12A depicts example software code that the habitat condition assessment system 104 may utilize to generate a set of features using the image data and one or more of the digital terrain model data, the digital surface model data, and the canopy height model data.

Table 2 includes a set of features that the habitat condition assessment system 104 may generate using the image data and/or the non-image data (for example, the digital terrain model data, the digital surface model data, and the canopy height model data).

TABLE 2

| Feature Name | Feature Description |
| --- | --- |
| Green_mean | The green channel of the image is extracted. The intensity values of a given polygon region are extracted from the channel matrix. Mean is computed using sum of values/total number of values. |
| Hue_mean | RGB image is converted to HSV image, where H is the Hue, S is saturation and V is value. The Hue channel of the image is extracted. Intensity values of a given polygon region are extracted from the channel matrix. Mean is computed using sum of values/total number of values. |
| NDVI_mean - RGBI | NDVI channel from RGBI image using the formula NDVI = (I − R)/(I + R) is computed. NDVI intensity values of a given polygon region are extracted from the channel matrix. Mean is computed using sum of values/total number of values |
| TGDI mean | Canny channel is computed using the Canny edge detection algorithm. Brightness channel is computed using the mean across channels (R, G, B, I) TGDI channel calculated as - log(canny) *brightness TGDI intensity values of a given polygon region are extracted from the channel matrix. Mean is computed using sum of values/total number of values |
| NIR | Near-Infrared Radiation (NIR) The mean, median and standard deviation values are extracted for the given polygon |
| Enhanced Vegetation Index | EVI channel computed using $EVI = G * \left( \frac{NIR - R}{NIR + C1 * R - C2 * B + L} \right)$ In Landsat 4-7, $EVI = 2.5 * \left( \frac{Band4 - Band3}{Band4 + 6 * Band3 - 7.5 * Band1 + 1} \right)$ In Landsat 8-9, $EVI = 2.5 * \left( \frac{Band5 - Band4}{Band5 + 6 * Band4 - 7.5 * Band1 + 1} \right)$ EVI intensity values of a given polygon region are extracted from the channel matrix. Mean is computed using sum of values/total number of values |
| Chlorophyll Index Green (CIG) | $CIG = \frac{NIR}{Green} - 1$ The mean, median and standard deviation values are extracted for the given polygon |
| Plant Pigment Ratio (PGR) | $PGR = \frac{(green - blue)}{(green + blue)}$ The mean, median and standard deviation values are extracted for the given polygon |
| Visual Atmospheric Resistance Index (VARI) | $VARI = \frac{green - red}{green + red - blue}$ The mean, median and standard deviation values are extracted for the given polygon |
| Visual Atmospheric Resistance Index - Green (VARI-G) | $VARI\text{-}G = \frac{green - red}{green + red}$ The mean, median and standard deviation values are extracted for the given polygon |
| Soil Organic Carbon Index (SOCI) | $SOCI = \frac{blue}{red * green}$ The mean, median and standard deviation values are extracted for the given polygon |
| Soil Adjusted Vegetation Index (SAVI) | $SAVI = \frac{NIR - red}{nir + red + L} * (1 + L)$, where $L = 1.5$ The mean, median and standard deviation values are extracted for the given polygon |

TABLE 2-continued

| Feature Name | Feature Description |
|---|---|
| Chlorophyll Vegetation Index (CVI) | $CVI = \dfrac{NIR}{\dfrac{red}{green^2}}$ |
| | The mean, median and standard deviation values are extracted for the given polygon |
| Green Normalized Difference Vegetation Index (GNDVI) | $GNDVI = \dfrac{NIR - green}{NIR + green}$ |
| | The mean, median and standard deviation values are extracted for the given polygon |
| Green Cover Index (GCI) | $GCI = \dfrac{NIR}{green - 1}$ |
| | The mean, median and standard deviation values are extracted for the given polygon |
| Normalized Difference Snow Index (NDSI) | $NDSI = \dfrac{NIR - green}{NIR + green}$ |
| | The mean, median and standard deviation values are extracted for the given polygon |
| Advanced Vegetation Index (AVI) | $AVI = \dfrac{NIR * (1 - red) * (NIR - red)}{3}$ |
| | The mean, median and standard deviation values are extracted for the given polygon |
| Normalized Green (NG) | $NG = \dfrac{green}{NIR + red + green}$ |
| | The mean, median and standard deviation values are extracted for the given polygon |
| Blue Normalized Difference Vegetation Index (BNDVI) | $BNDVI = \dfrac{NIR - blue}{NIR + blue}$ |
| | The mean, median and standard deviation values are extracted for the given polygon |
| Green Index (GI) | $GI = \dfrac{green}{red}$ |
| | The mean, median and standard deviation values are extracted for the given polygon |
| Plant Biochemical Index (PBI) | $PBI = \dfrac{NIR}{green}$ |
| | The mean, median and standard deviation values are extracted for the given polygon |
| Gray-Level Co-occurrence Matric (GLCM) channels | For each of the channels (contrast, correlation, energy, homogeneity, entropy and variance), intensity values of a given polygon region are extracted from the channel matrix. Mean is computed using sum of values/total number of values. |
| height_mean | Height channel is extracted by performing DSM (Digital Surface Model channel) - DTM (Digital Terrain Model channel) Intensity values of a given polygon region are extracted from the channel matrix. Mean is computed using sum of values/total number of values |
| h_10_pctl | Height channel is extracted by performing DSM (Digital Surface Model channel) - DTM (Digital Terrain Model channel) Intensity values of a given polygon region are extracted from the channel matrix. h_10_pctl is computed $10^{th}$ percentile of the values |
| h_25_pctl | Height channel is extracted by performing DSM (Digital Surface Model channel) - DTM (Digital Terrain Model channel) Intensity values of a given polygon region are extracted from the channel matrix. h_25_pctl is computed $25^{th}$ percentile of the values |
| h_75_pctl | Height channel is extracted by performing DSM (Digital Surface Model channel) - DTM (Digital Terrain Model channel) |

TABLE 2-continued

| Feature Name | Feature Description |
| --- | --- |
| | Intensity values of a given polygon region are extracted from the channel matrix.<br>h_75_pctl is computed 75$^{th}$ percentile of the values |
| h_90_pctl | Height channel is extracted by performing DSM (Digital Surface Model channel) - DTM (Digital Terrain Model channel)<br>Intensity values of a given polygon region are extracted from the channel matrix.<br>h_90_pctl is computed 90$^{th}$ percentile of the values |
| h_99_pctl | Height channel is extracted by performing DSM (Digital Surface Model channel) - DTM (Digital Terrain Model channel)<br>Intensity values of a given polygon region are extracted from the channel matrix.<br>In this example, h_99_pctl is computed 99$^{th}$ percentile of the values |

The habitat condition assessment system 104 may generate features in addition to those in Table 1, and the habitat condition assessment system 104 may utilize data other than the image data (for example, non-image data such as the digital terrain model data, the digital surface model data, and the canopy height model data) to generate features.

At step 308, the habitat condition assessment system 104 (for example, the communication module 152) receives a habitat for the geographic sub-area. The geospatial management engine 1602 may determine the habitat for the geographic sub-area as discussed herein with reference to, for example, FIG. 19A. The geospatial management engine 1602 may provide the habitat to the habitat condition assessment system 104. In some embodiments, the habitat condition assessment system 104 determines the habitat for the geographic sub-area. Examples of habitats include coastal, coastal lagoons, coastal saltmarsh, ditches, grassland low distinctiveness, grassland medium/high/very high distinctiveness, heathland, hedgerow, individual trees, intertidal biogenic reefs, intertidal hard structures, intertidal seagrass, intertidal sediment, lakes, limestone pavement, line of trees, orchard, ponds, rocky shore, scrub, sparsely vegetated land, urban, wetland, woodland, and wood-pasture and parkland. It will be understood that the habitats for which conditions may be assessed are not limited to those described herein. The habitat condition assessment system 104 may generate condition assessments for habitats other than those described herein.

At step 310, the habitat condition assessment system 104 (for example, the condition assessment criteria module 156) identifies one or more condition assessment criteria based on the habitat. FIG. 8 depicts condition assessment criteria 800 for a grassland low distinctiveness habitat in some embodiments. The condition assessment criteria 800 includes seven different criteria that may be used by, for example, ecologists, to assess the condition of a grassland low distinctiveness habitat. Each criterion requires a response. In one example, the response is either "Yes" or "No."

Returning to FIG. 3, the habitat condition assessment system 104 performs step 312 through step 318 for each condition assessment criterion of the one or more condition assessment criteria. At step 312, the habitat condition assessment system 104 (for example, the feature module 154) determines a subset of features of the set of features for the condition assessment criterion. The habitat condition assessment system 104 may determine subsets of features for each condition assessment criterion by virtue of an analysis of the frequency distribution of each predictor feature variable. FIG. 13A and FIG. 13B depict a table 1300 and a table 1350, respectively, of example subsets of features that the habitat condition assessment system may determine for several criteria for two different habitats. The table 1300 is for a grassland low distinctiveness habitat and includes five different conditions for the grassland low distinctiveness habitat, the method used to generate responses for each condition, and the features used in each method. The table 1350 is for a grassland medium/high/very high distinctiveness habitat and also includes five different conditions for the grassland medium/high/very high distinctiveness habitat, the method used to generate responses for each condition, and the features used in each method.

It will be understood that the habitat condition assessment system 104 may utilize different subsets of features for other habitats, such as a heathland habitat, a hedgerow habitat, a wetland habitat, a woodland habitat, and other habitats. It will be further understood that the habitat condition assessment system 104 may utilize subsets of features for condition assessment criteria different from those described herein.

At step 314, the habitat condition assessment system 104 (for example, the response model prediction module 158) applies a trained model to the subset of features to obtain a response to the condition assessment criterion. The table 1300 and the table 1350 of FIG. 13A and FIG. 13B, respectively, depict that the habitat condition assessment system 104 may apply a generic artificial intelligence (AI) model to the subset of features for certain criteria, and may apply a unique model for other criteria. FIG. 12B depicts example software code that the habitat condition assessment system may utilize to apply the trained model, which may be a generic AI model, to the subset of features to obtain a response to the condition assessment criterion.

Returning to FIG. 3, at step 316, the habitat condition assessment system 104 (for example, the response model prediction module 158) obtains a confidence score from applying the trained model to the subset of features. The confidence score may be or be based on, for example, the accuracy score of the trained model. At step 318 the habitat condition assessment system 104 determines whether there are more condition assessment criteria. If so, the method 300 returns to step 312. If not, the method 300 continues to step 320.

At step 320, the habitat condition assessment system 104 (for example, the condition assessment criteria module 156) generates a condition assessment for the habitat based on the one or more responses to the one or more condition assessment criteria. Turning again to FIG. 8, the condition of the grassland low distinctiveness habitat depends upon the responses to the seven different criteria. If the habitat passes six (6) or seven (7) criteria including passing essential criterion A, then the habitat condition assessment system 104 assesses the condition of the habitat as "Good" with a score of three (3). If the habitat passes four (4) or five (5) criteria including passing essential criterion A, then the habitat condition assessment system 104 assesses the condition of the habitat as "Moderate" with a score of two (2). If the habitat passes three (3) or fewer criteria or the habitat passes four (4) to six (6) criteria (excluding criterion A), then the habitat condition assessment system 104 assesses the condition of the habitat as "Poor" with a score of one (1). The condition assessment scores are exemplary only and the habitat condition assessment system 104 may assess the condition of the habitat using values other than those described herein.

As another example, a woodland habitat may have multiple condition assessment criteria, each of which may have three possible answers. A first answer may be "Good" and be worth three (3) points. A second answer may be "Moderate" and be worth two (2) points. A third answer may be "Poor" and be worth one (1) point. The condition assessment for the woodland habitat may depend upon the total number of points for the condition assessment criteria. If the total number of points is greater than 32, the condition assessment is "Good", if the total number of points is greater than or equal to 26 and less than or equal to 33, the condition assessment is "Moderate", and if the total number of points is less than 26, the condition assessment is "Poor." It will be understood that the habitat condition assessment system 104 may assess the condition of a habitat using other methodologies.

Figure 5C:
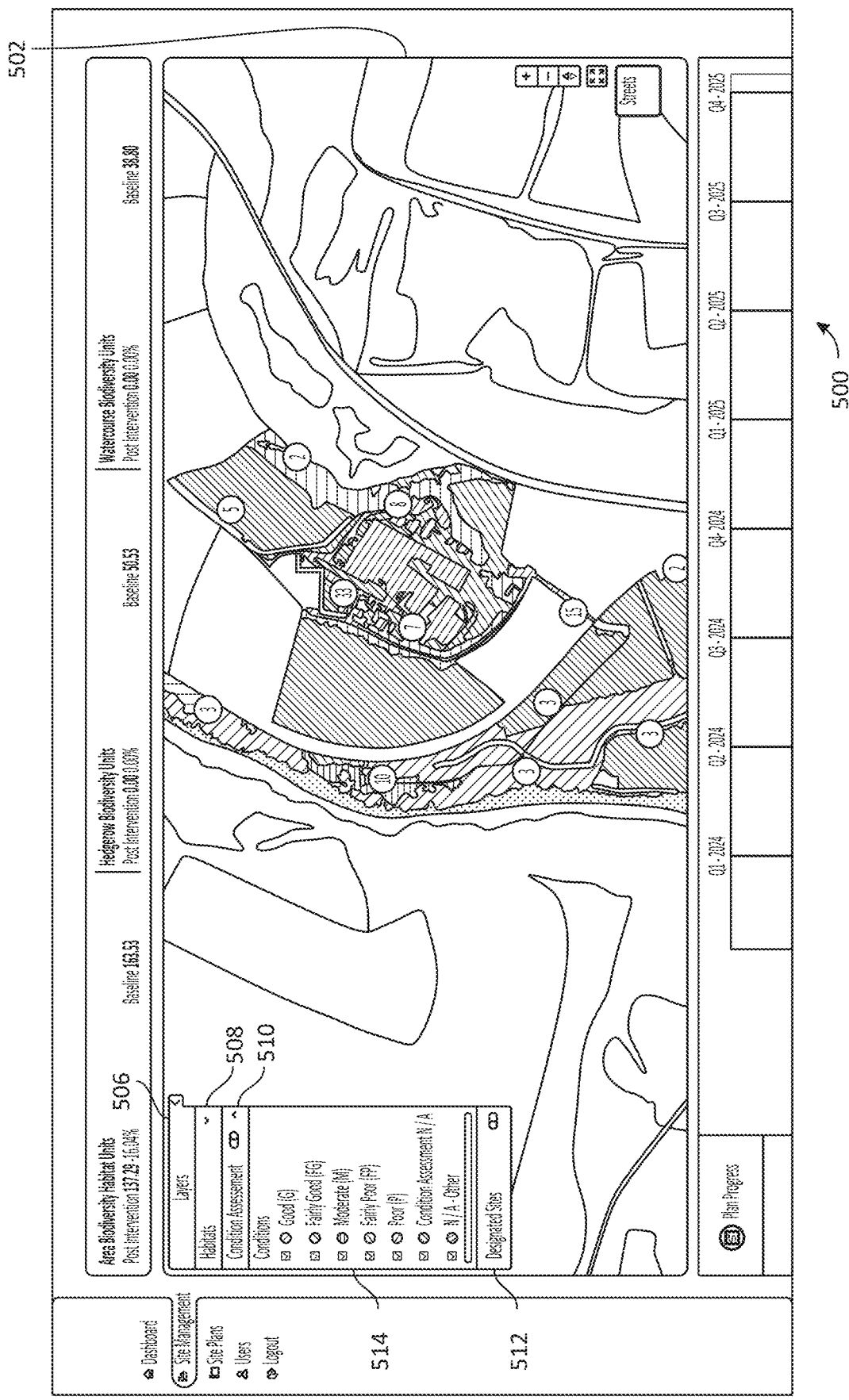

Returning to FIG. 3, at step 322, the habitat condition assessment system 104 (for example, the reporting module 164) provides the condition assessment for the habitat. FIG. 5C depicts the user interface 500 with the condition assessment toggle 510 toggled on. The layers control panel 506 includes a conditions portion 514 that allows a user to display or hide condition assessments of habitats. The habitat condition assessment system 104 may also provide the condition assessment for the habitat to, for example, the landowner or developer system 106 and/or the regulatory agency system 108.

An example biodiversity calculation formula may provide a biodiversity score indicating degree of biodiversity of an area. It will be appreciated that the biodiversity calculation may create a score based on any criteria of any area and may generate a result to indicate the biodiversity. In one example, the size of an area (e.g., size of habitat), distinctiveness of the area, condition of the area, and the strategic significance may be criteria to generate a biodiversity score (e.g., a number of biodiversity units). The following is an example of a biodiversity calculation:

$$\text{Size of habitat parcel} \times \text{Distinctiveness} \times \text{Condition} \times \text{Strategic significance} = \text{Biodiversity units}$$

For example:

$$10 \text{ (ha)} \times 6 \text{ (high)} \times 1 \text{ (poor)} \times 1.15 \text{ (high)} = 69 \text{ units}$$

Returning to FIG. 3, at step 323, the geospatial management engine 1602 generates a biodiversity score for the habitat and provides it to the habitat condition assessment system 104. The geospatial management engine 1602 may generate a biodiversity score for the habitat as described herein. At step 324, the habitat condition assessment system 104 (for example, the biodiversity metric module 162) generates a biodiversity metric for the habitat based on the condition assessment for the habitat and the biodiversity metric. For example, the habitat condition assessment system 104 may multiply the condition assessment by the biodiversity score to generate the biodiversity metric. As described herein, the condition assessment may have an associated value such as three (3) for a "Good" condition, two (2) for a "Moderate" condition, and one (1) for a "Poor" condition. The habitat condition assessment system 104 may multiply the associated value by the biodiversity score to generate the biodiversity metric. The habitat condition assessment system 104 may utilize other methods of generating a biodiversity metric, and accordingly, the disclosure is not to be limited to the examples described herein.

Figure 6:
FIG. 6 depicts an example user interface for displaying habitats, condition assessments for habitats, and/or biodiversity metrics for habitats in some embodiments.

At step 326 the habitat condition assessment system 104 (for example, the reporting module 164) provides the biodiversity metric for the habitat. FIG. 6 depicts the geographic region portion 502 of the user interface 500 displaying habitats and a popup 602 for a wet woodland habitat. The popup 602 includes a condition assessment of "Moderate" and a biodiversity metric, shown as biodiversity units, of 456.43 for the wet woodland habitat. The habitat condition assessment system 104 may also provide the biodiversity metric for the habitat to, for example, the landowner or developer system 106 and/or the regulatory agency system 108

Returning to FIG. 3, at step 328 the habitat condition assessment system 104 (for example, the confidence indication module 172) generates a confidence indication for the habitat based on one or more confidence scores for the one or more condition assessment criteria. At step 330 the habitat condition assessment system 104 (for example, the reporting module 164) provides the confidence indication for the habitat. The confidence indication may be used by, for example, ecologists, to determine which habitats to focus on in the course of performing a survey of a geographic area. At step 332 the habitat condition assessment system 104 determines whether there are more geographic sub-areas. If so, the method 300 returns to step 304.

Figure 4:
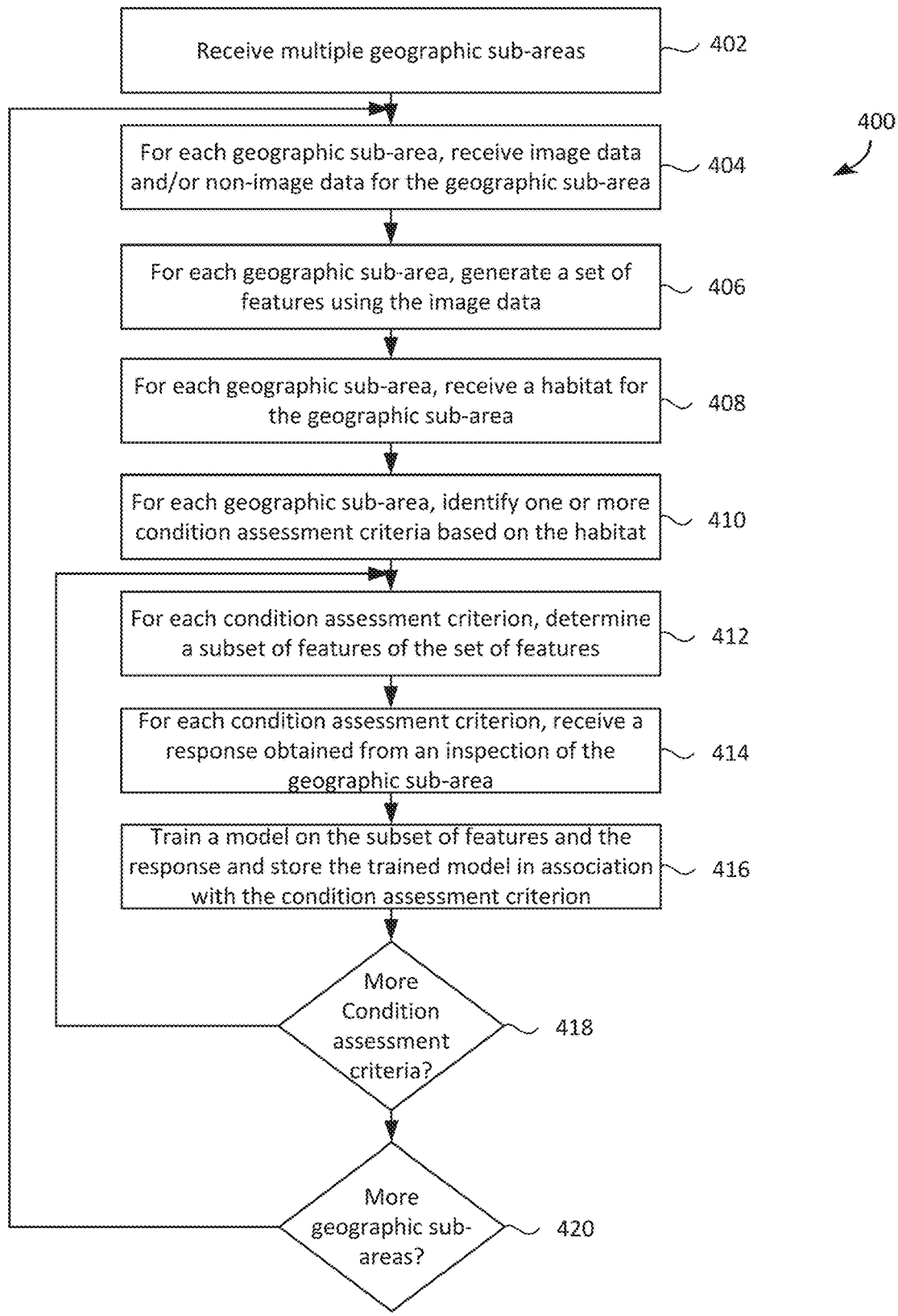
FIG. 4 is a flow diagram depicting a method for generating and providing condition assessments for habitats in some embodiments.

FIG. 4 is a flow diagram depicting a method 400 for training models that may be used to generate condition assessments for habitats in some embodiments. Various modules of the habitat condition assessment system 104 may perform the method 400. In some embodiments, various modules of the habitat condition assessment system 104 and various engines of the geospatial management engine 1602 perform the method 400. In some embodiments, various engines of the geospatial management engine 1602 perform the method 400.

The method 400 begins at step 402, where the habitat condition assessment system 104 (for example, the geographic area module 166) receives multiple geographic sub-areas. For example, the habitat condition assessment system 104 may receive a geographic area having multiple geographic sub-areas. The habitat condition assessment system 104 performs step 404 through step 416 for each geographic sub-area of the multiple geographic sub-areas. Step 404 through step 412 of the method 400 may be generally similar to step 304 through step 312 of the method 300.

At step 404, the habitat condition assessment system 104 (for example, the data module 168) receives image data and/or non-image data for the geographic sub-area. At step 406, the habitat condition assessment system 104 (for example, the feature module 154) generates a set of features using the image data and/or the non-image data. At step 408, the habitat condition assessment system 104 (for example, the communication module 152) receives a habitat for the geographic sub-area. At step 410, the habitat condition assessment system 104 (for example, the condition assessment criteria module 156) identifies one or more condition assessment criteria based on the habitat. The habitat condition assessment system 104 performs step 412 through step 418 for each condition assessment criterion of the one or more condition assessment criteria. At step 412, the habitat condition assessment system 104 (for example, the feature module 154) determines a subset of features of the set of features for the condition assessment criterion.

At step 414, the habitat condition assessment system 104 (for example, the condition assessment criteria module 156) receives a response to the condition assessment criterion obtained from an inspection of the geographic sub-area. For example, the response may be obtained from a mobile device 110 utilized by an ecologist performing a survey of the geographic sub-area. At step 416, the habitat condition assessment system 104 (for example, the response model training module 160) trains a model on the subset of features and the response. Also at step 416, the habitat condition assessment system 104 (for example, the response model training module 160) stores the trained model in association with the condition assessment criterion (for example, in the data storage 174). FIG. 12B depicts example software code that the habitat condition assessment system 104 may utilize to train a model.

Although portions of the accompanying description describe training sets of decision trees, will be appreciated that other machine learning and/or artificial intelligence models, such as convolutional neural networks, may be trained to generate responses to condition assessment criteria.

Returning to FIG. 4, at step 418 the habitat condition assessment system 104 determines whether there are more condition assessment criteria. If so, the method 400 returns to step 412. If not, the method 300 continues to step 420. At step 420 the habitat condition assessment system 104 determines whether there are more geographic sub-areas. If so, the method 400 returns to step 404.

One advantage of the method 400 is that the habitat condition assessment system 104 may retrain models using new ground truth data obtained from, for example, ecologists performing surveys of geographic areas. Accordingly, the models utilized by the habitat condition assessment system 104 may become increasingly accurate and thus increasingly dependable to ecologists performing surveys, as well as to other consumers of habitat condition assessments, such as landowners, developers, and regulatory agencies.

Figure 7A:
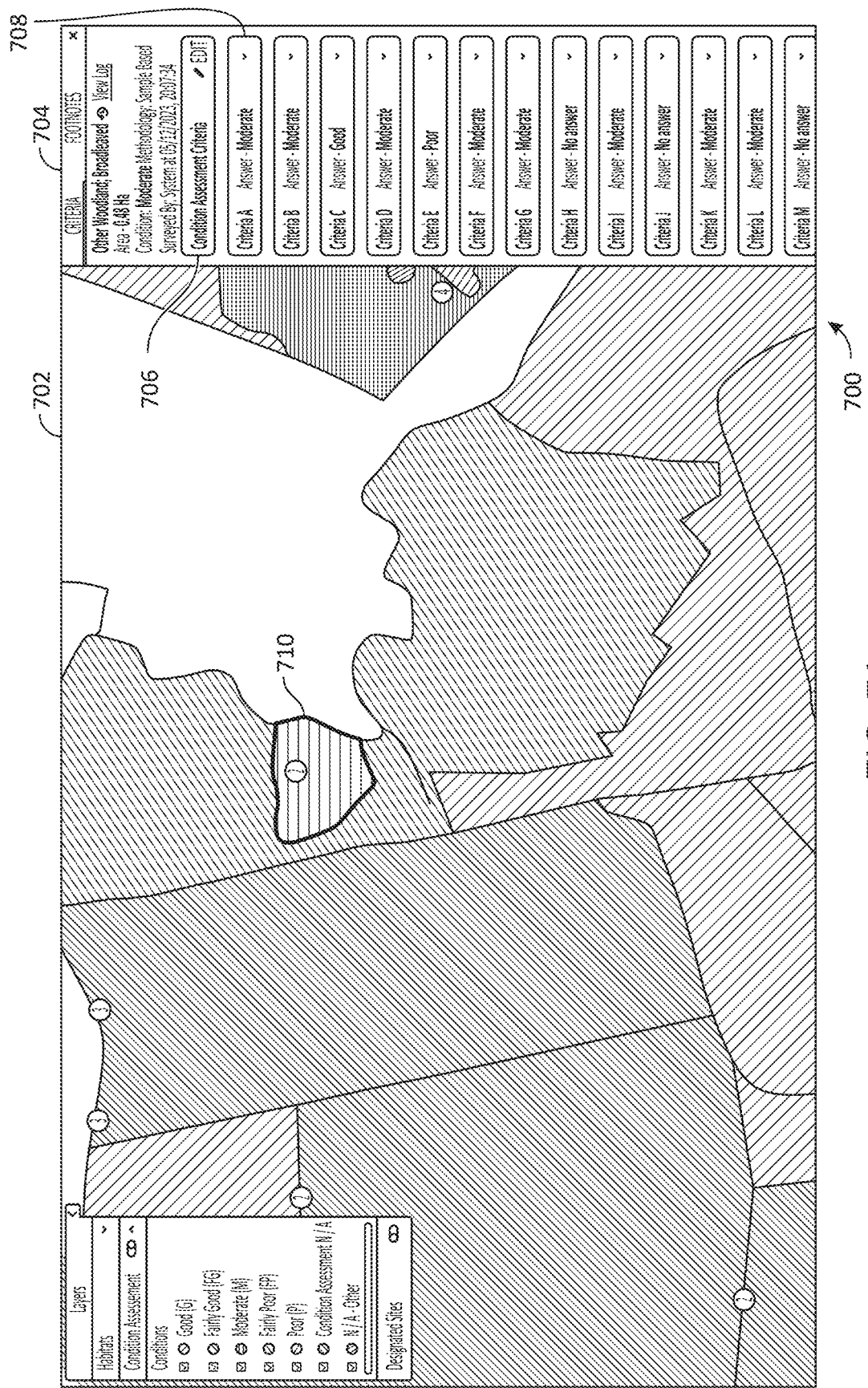
FIGS. 7A-C depict an example user interface for displaying condition assessments for habitats and/or viewing and editing condition assessment criteria in some embodiments.
Figure 7B:
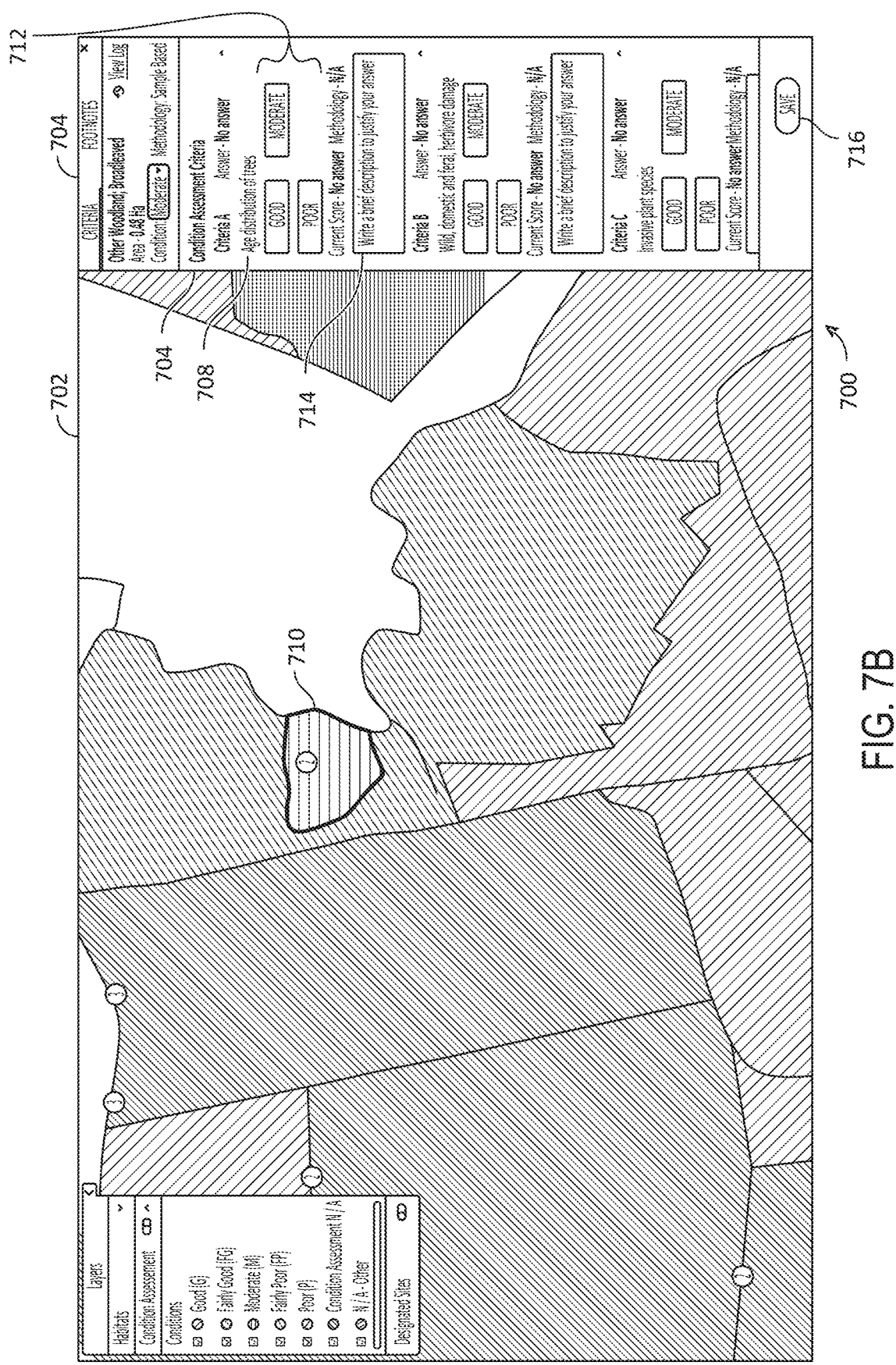
Figure 7C:
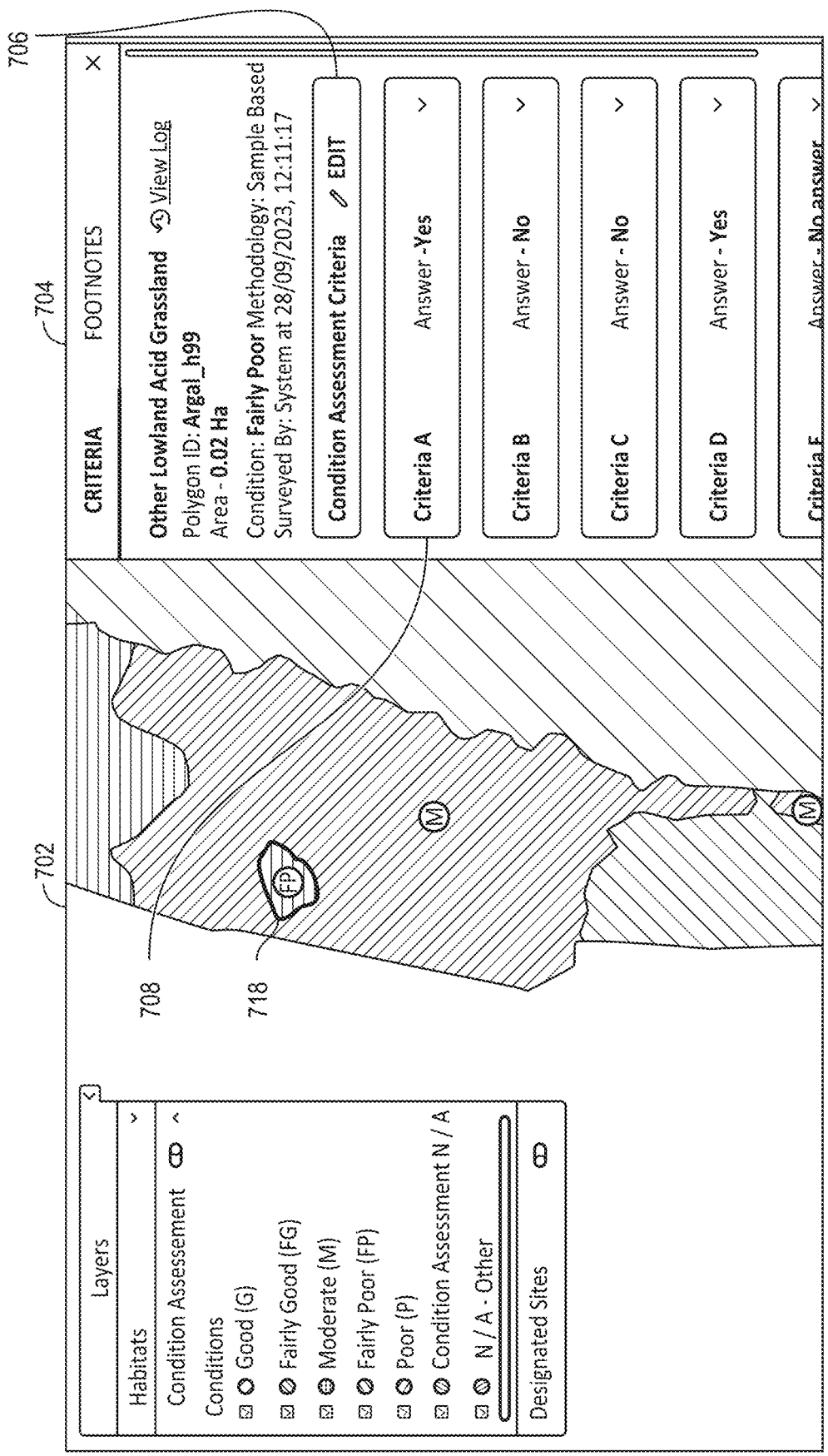

FIGS. 7A-C depict an example user interface 700 for displaying condition assessments for habitats and/or viewing and editing condition assessment criteria in some embodiments. The user interface 700 includes a geographic region portion 702 and a condition assessment criteria portion 704. In the geographic region portion 702 a geographic area 710 is selected. The geographic area 710, which has a habitat of "Other Woodland; Broadleaved," has a condition assessment of "Moderate" that was generated by the habitat condition assessment system 104. The condition assessment criteria portion 704 allows a user to edit the responses to the condition assessment criteria by selecting button 706. Each of the condition assessment criteria in the condition assessment criteria portion 704, such as condition assessment criterion 708, is shown as having no response. This is because the habitat condition assessment system 104 has not yet obtained a response from an inspection of the geographic area 710, such as from a site survey of the geographic area 710 performed by an ecologist. Once such an inspection has been performed, a user may select the button 706 and provide responses to the condition assessment criteria.

FIG. 7B depicts the user interface 700 after a user has selected the button 706. The condition assessment criteria portion 704 displays the condition assessment criteria along with the options for the responses to each condition assessment criterion along with a text field in which a description justifying a response may be provided. For example, for the condition assessment criterion 708—"Age distribution of trees"—the user may select either "Good," "Moderate," or "Poor" as a response 712. The user may also provide a description justifying the in the text field 714. The user may save their responses by selecting the button 716.

FIG. 7C depicts the user interface 700 showing a different geographic region than that shown in FIGS. 7A and 7B. In the geographic region portion 702, a geographic area 718 is selected. The geographic area 718, which has a habitat of "Other Lowland Acid Grassland," has a condition assessment of "Fairly Poor" that was generated by the habitat condition assessment system 104. A user may edit the condition assessment criteria, such as condition assessment criterion 708, but selecting button 706.

Figure 9:
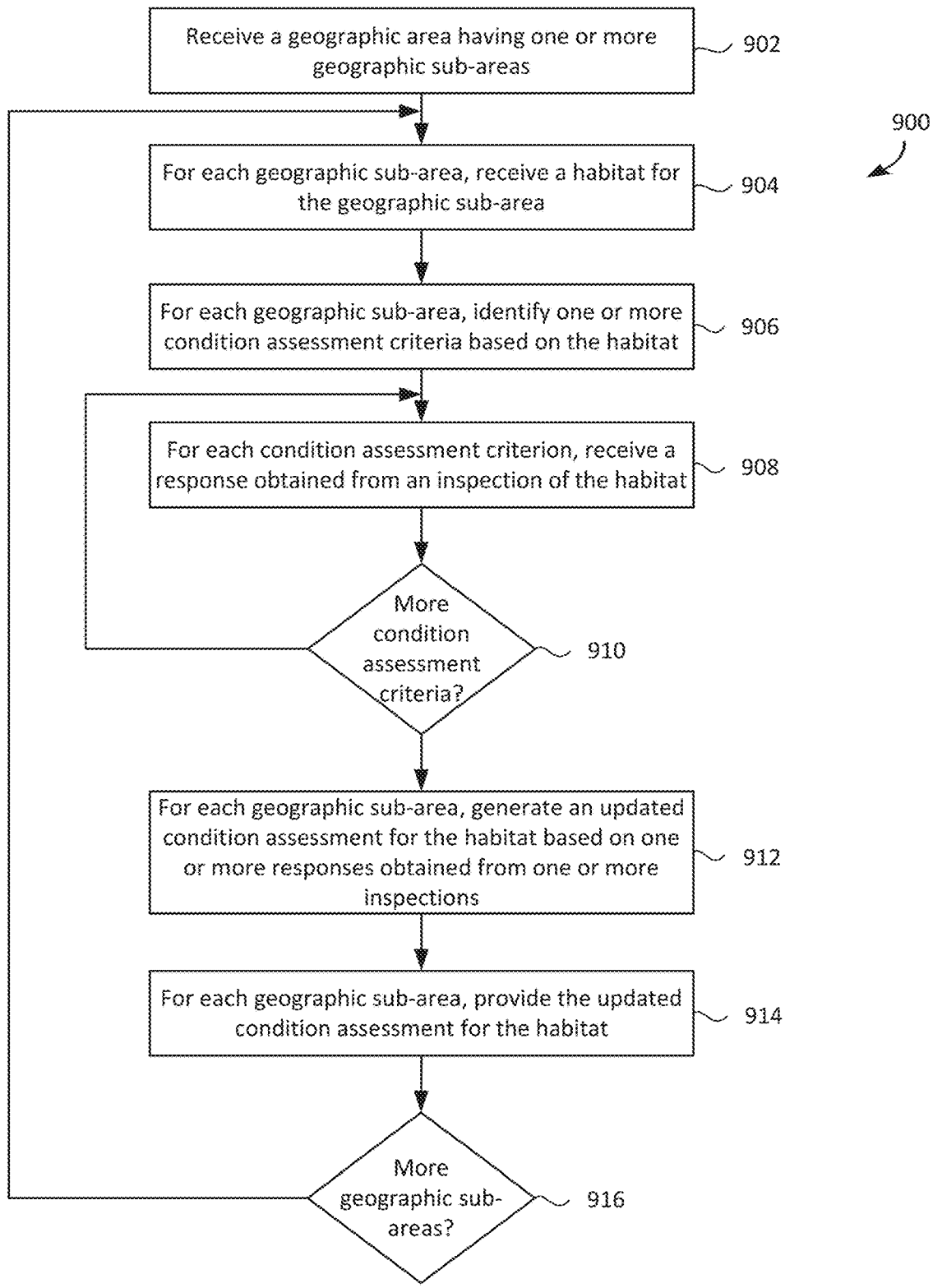
FIG. 9 is a flow diagram depicting a method for generating and providing updated condition assessments for habitats in some embodiments.
Figure 10D:
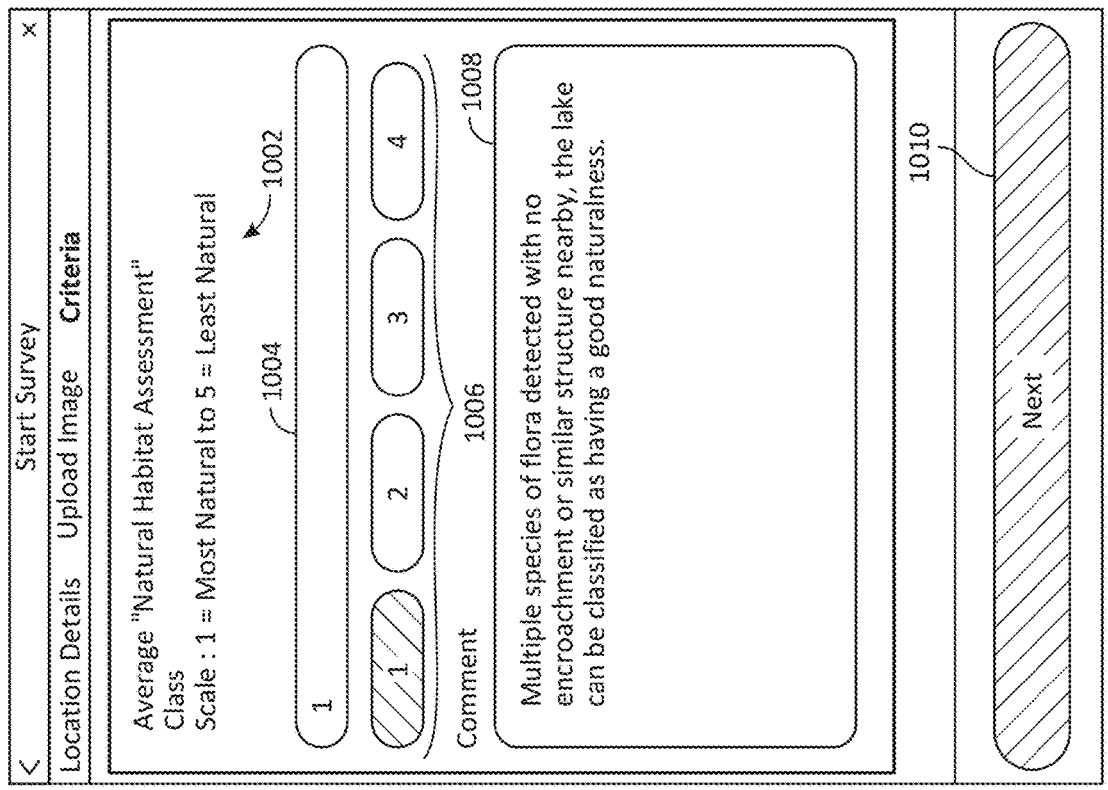
Figure 10C:
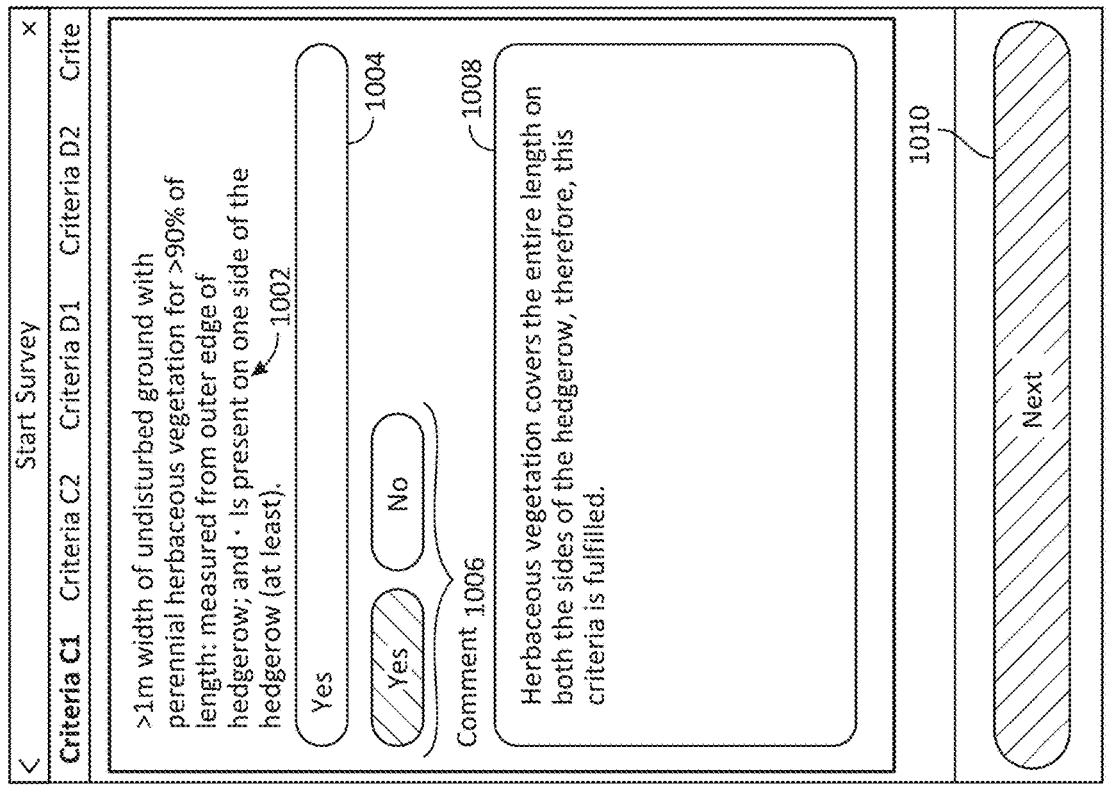

FIG. 9 is a flow diagram depicting a method 900 for generating and providing updated condition assessments for habitats in some embodiments. Various modules of the habitat condition assessment system 104 may perform the method 900. In some embodiments, various modules of the habitat condition assessment system 104 and various engines of the geospatial management engine 1602 perform the method 900. In some embodiments, various engines of the geospatial management engine 1602 perform the method 900.

The method 900 begins at step 902, where the habitat condition assessment system 104 (for example, the geographic area module 166) receives multiple geographic sub-areas. For example, the habitat condition assessment system 104 may receive a geographic area having multiple sub-areas. The habitat condition assessment system 104 performs step 904 through step 916 for each geographic sub-area of the multiple geographic sub-areas. At step 904, the habitat condition assessment system 104 (for example, the communication module 152) receives a habitat for the geographic sub-area. Step 904 may be generally similar to step 308 of the method 300. At step 906, the habitat condition assessment system 104 (for example, the condition assessment criteria module 156) identifies one or more condition assessment criteria based on the habitat. Step 906 may be generally similar to step 310 of the method 300.

The habitat condition assessment system 104 performs step 908 through step 910 for each condition assessment criterion of the one or more condition assessment criteria. At step 908, the habitat condition assessment system 104 (for example, the condition assessment criteria module 156) receives a response to the condition assessment criterion. The response may be obtained from an inspection of the geographic sub-area, such as a survey performed by an ecologist. At step 910 the habitat condition assessment system 104 determines whether there are more condition assessment criteria. If so, the method 900 returns to step 908. If not, the method 900 continues to step 912.

At step 912, the habitat condition assessment system 104 (for example, the condition assessment criteria module 156) generates an updated condition assessment for the habitat based on one or more responses to the one or more condition assessment criteria. At step 914 the habitat condition assessment system 104 (for example, the reporting module 164) provides the updated condition assessment for the habitat. Step 914 may be generally similar to step 322 of the method 300. At step 916 the habitat condition assessment system 104 determines whether there are more geographic sub-areas. If so, the method 900 returns to step 904.

FIGS. 10A-D depict an example user interface 1000 for receiving responses to condition assessment criteria in some embodiments. A surveyor or inspector, such as an ecologist, may utilize the user interface 1000 to provide responses to the condition assessment criteria for a habitat that the surveyor or inspector is surveying or inspecting. The mobile device 110 may provide the user interface 1000 as part of an application executing on the mobile device 110. The application may use the geographic location of the mobile device 110 to identify a geographic area, identify the habitat for the geographic area, and identify the condition assessment criteria based on the habitat.

The user interface 1000 allows a user to select a condition assessment criterion, the details of which are shown in text section 1002. The user may select a response to the condition assessment criterion from the responses 1006, and the user interface 1000 indicates the selected response 1004. The user interface 1000 includes a text field 1008 in which the user may provide comments regarding the response. The user may select the button 1010 to advance to the next condition assessment criterion. The application may also allow the user to upload one or more images of the geographic area that may be associated with the geographic area and/or with condition assessment criteria.

FIG. 11 depicts an example user interface 1100 for displaying condition assessments and biodiversity metrics for habitats in some embodiments. The user interface 1100 includes a table 1102 that has multiple rows, a row for each habitat. The table 1102 has multiple columns, including a habitat column 1104, a habitat condition assessment column 1106, a first biodiversity metric column 1108, and a second biodiversity metric column 1110. The first biodiversity metrics in the first biodiversity metric column 1108 are based on the condition assessments for the habitats in the habitat condition assessment column 1106. The second biodiversity metrics, which are in Great British pounds (GBP), in the second biodiversity metric column 1110 are also based on the condition assessments for the habitats in the habitat condition assessment column 1106.

One advantage of the habitat condition assessment system 104 is that it may provide ecologists with insights that may only be obtained from image data obtained from, for example, satellites. Another advantage is that the habitat condition assessment system 104 may help ecologists make determinations of which portions of a geographic area the ecologists should focus on during a site survey. Another advantage is that the habitat condition assessment system 104 may significantly shorten the amount of time required to survey a geographic area. Another advantage is that the habitat condition assessment system 104 may provide a history of how the condition of a particular geographic area changes over time. The habitat condition assessment system 104 may receive image data of the particular geographic area that was obtained multiple times over a period of time. The habitat condition assessment system 104 may then determine the condition of the habitat for the geographic area for each of the multiple times. The habitat condition assessment system 104 may then provide a history of how the condition of a particular geographic area has changed over time. If the particular geographic area is undergoing remediation, the history may be useful in determining if the remediation efforts are successful and to what extent. Other advantages will be apparent.

Figure 14:
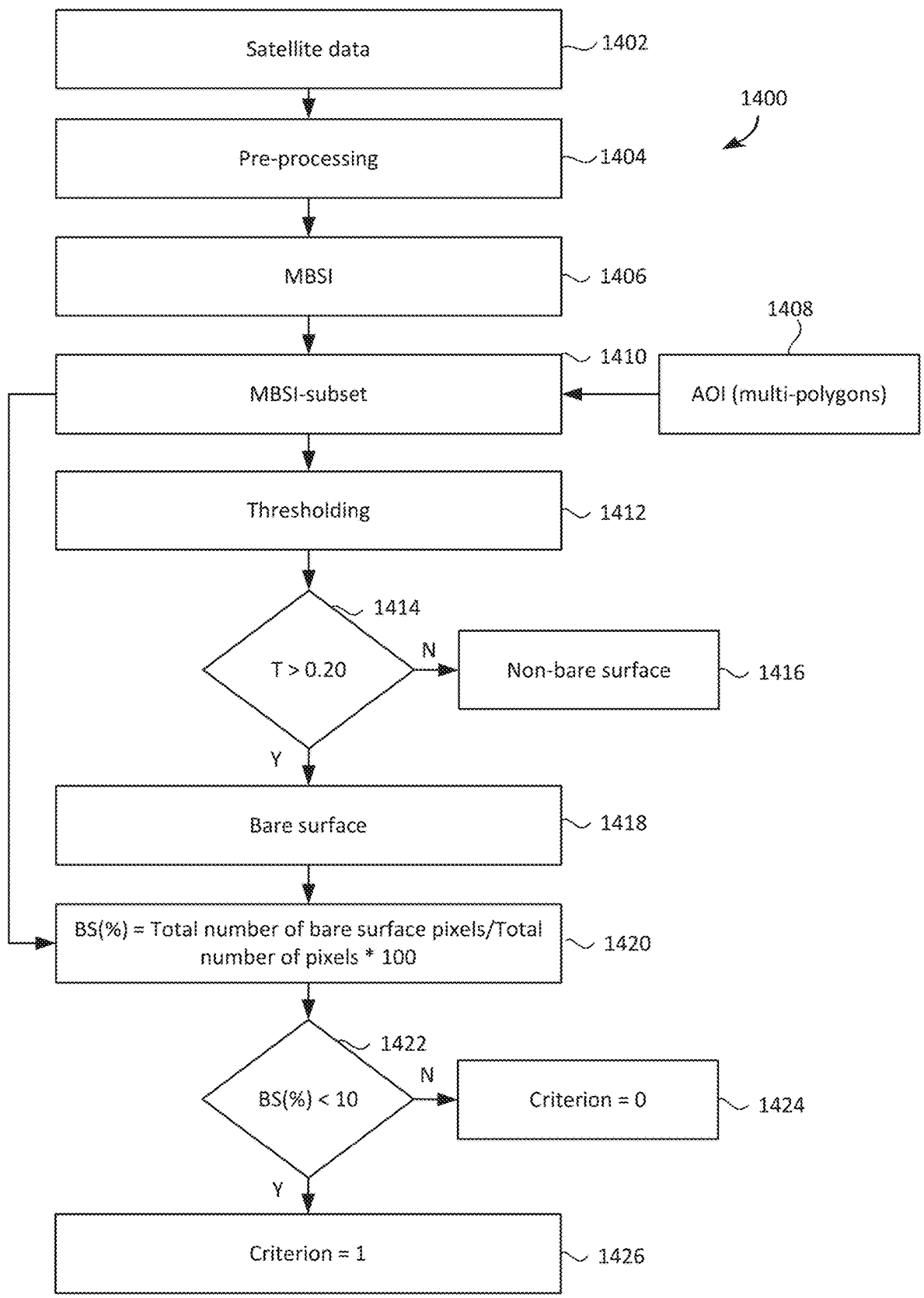
FIG. 14 is a flow diagram depicting a method for detecting bare surfaces of land in some embodiments.

Bare ground surfaces may be part of a criterion for condition assessment of a habitat. For example, as shown in FIG. 8, bare ground is part of the fifth criterion for the low distinctiveness grassland habitat. FIG. 14 is a flow diagram depicting a method 1400 for detecting bare surfaces of land in some embodiments. The method 1400 begins at step 1402 where the habitat condition assessment system 104 receives satellite imagery data for a geographic area. At step 1404 the habitat condition assessment system 104 performs pre-processing of the satellite imagery data. At step 1406 the habitat condition assessment system 104 generates modified bare surface index (mBSI) values for the pixels in the satellite imagery data. The habitat condition assessment system 104 utilizes the following equation to generate an mBSI value for a pixel:

$$mBSI = \frac{SWIR1 - SWIR2 - NIR}{SWIR1 + SWIR2 + NIR} + 0.5$$

At step 1408 the habitat condition assessment system 104 receives a geographic area of interest (AOI) that includes one or more polygons. At step 1410 the habitat condition assessment system 104 determines a subset of the mBSI values for the pixels of the one or more polygons. At step 1412 the habitat condition assessment system 104 performs thresholding of mBSI values for the pixels. In some embodiments, the habitat condition assessment system 104 utilizes a threshold of 0.20 for mBSI determining if a pixel is for a bare surface or for a non-bare surface. The habitat condition assessment system 104 may use other values as the threshold. At step 1414 if the habitat condition assessment system 104 determines the pixel mBSI is greater than 0.20 then the pixel is for a non-bare surface (step 1416). If the habitat condition assessment system 104 determines the pixel mBSI is not greater than 0.2 then the pixel is for a bare surface (step 1418). At step 1420 the habitat condition assessment system 104 determines the bare surface percentage (BS %) by dividing the total number of bare surface pixels for the mBSI subset by the total number of pixels in the mBSI subset and multiplying the result by 100. At step 1422 the habitat condition assessment system 104 determines if the bare surface percentage (BS %) for the geographic AOI is less than 10. If so, then the habitat condition assessment system 104 determines that the value of the corresponding criterion is one (1) at step 1426. If not, then the habitat condition assessment system 104 determines that the value of the corresponding criterion is zero (0) at step 1424.

Figure 15:
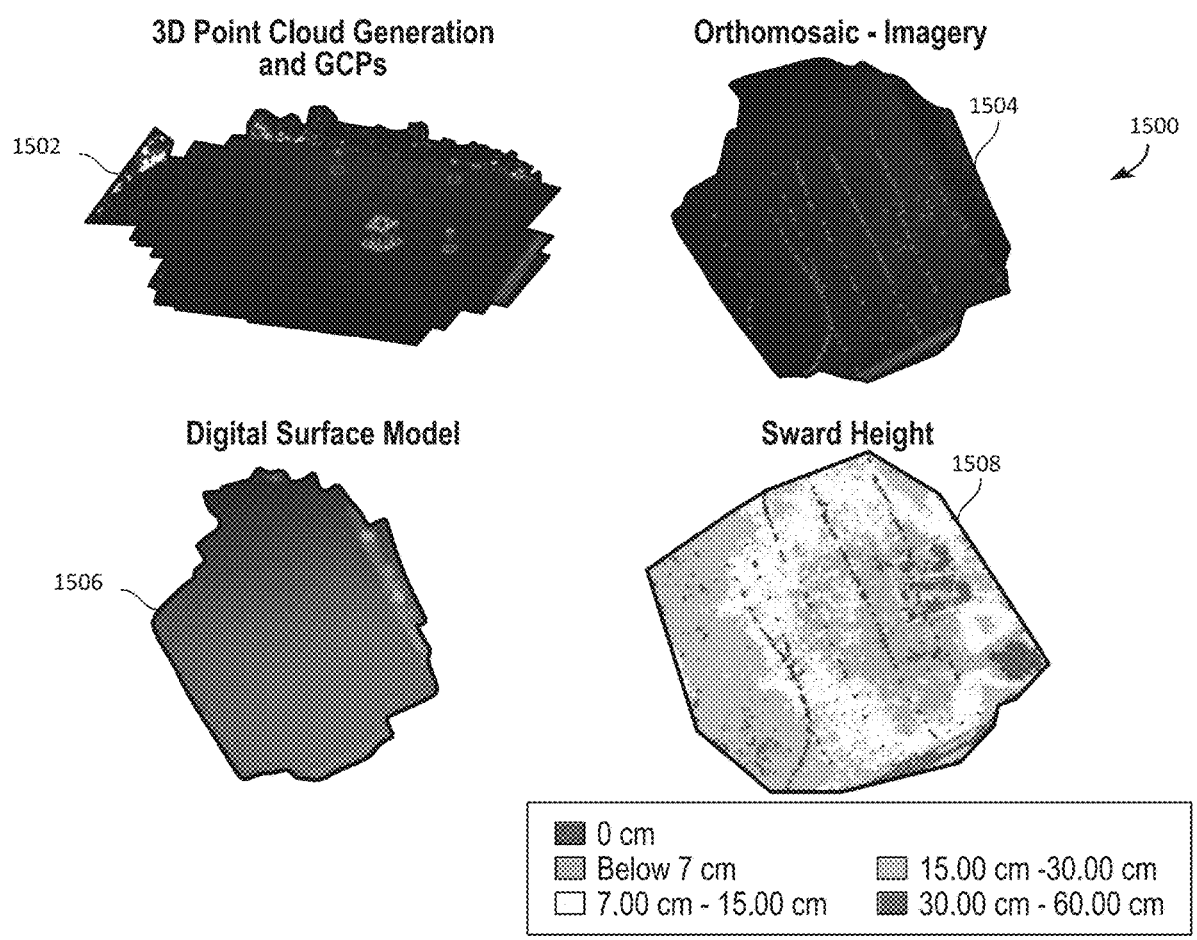
FIG. 15 depicts a process for estimating sward height in some embodiments.

Sward height may be part of a criterion for condition assessment of a habitat. For example, as shown in FIG. 8, sward height is part of the second criterion for the low distinctiveness grassland habitat. Estimating sward height may pose multiple challenges due, for example, the small dimensions of grasses. FIG. 15 depicts a process 1500 for estimating sward height in some embodiments that the habitat condition assessment system 104 may perform. The habitat condition assessment system 104 may obtain high-resolution imagery, such as very high-resolution drone imagery with a spatial resolution of 50 cm taken. The images may be from different angles to facilitate 3D point cloud generation. Ground Control Points (GCPs) and terrain height measured using differential Global Position System (dGPS). The habitat condition assessment system 104 may utilize the Scale Invariant Feature Transform (SIFT) feature matching algorithm to identify key points and match key points in other images. The habitat condition assessment system 104 may generate a sparse point cloud using matched features across images, where each point is associated with a x, y, and z position in a relative coordinate system. The habitat condition assessment system 104 may utilize georeferenced GCPs to convert the sparse point cloud into an absolute coordinate system, such as the British National Grid (BNG36) absolute coordinate reference system. The habitat condition assessment system 104 may utilize the georeferenced GCPs to adjust the image orientation relative to the object. A sparse point cloud may contain relatively few points compared to the extent of the area covered. To address this, the habitat condition assessment system 104 utilizes a multi-view stereo image matching workflow to reconstruct a dense point cloud 1502 of the scene from corresponding pixels between overlapping images, thereby creating more points which can be used to calculate properties such as surface roughness and sward height. The habitat condition assessment system 104 may utilize the GCPs to create an RGB ortho mosaic 1504 and a digital surface model 1506. The habitat condition assessment system 104 may also utilize the dGPS data is used to generate a digital terrain model (DTM) and the point cloud to generate a digital surface model (DSM). The habitat condition assessment system 104 may determine the sward height 1508 using the difference of the DSM and the DTM. In addition to or as an alternative to utilizing drone imagery, the habitat condition assessment system 104 may utilize satellite imagery, aircraft imagery, or other suitable imagery.

The habitat condition assessment system 104 may also utilize LiDAR data for height estimation and condition assessment. For example, the habitat condition assessment system 104 may utilize LiDAR data to estimate vegetation height for hedgerows habitats and to find open space in woodland habitats. The habitat condition assessment system 104 may model the vegetation height and estimate the percentage of hedgerows with height greater than 1.5 m within each polygon sample. The habitat condition assessment system 104 may then label polygons good where 60% or above height pixels are above 1.5 m as hedgerows. For woodland condition assessment, the habitat condition assessment system 104 may utilize LiDAR data in the following way: pixels with heights above 5 m are labeled as trees and pixels with heights below 5 m are labeled as canopy gaps. The habitat condition assessment system 104 may also determine the percentage of open pixels. Other uses of LiDAR data by the habitat condition assessment system 104 will be apparent and are within the scope of this disclosure.

The habitat condition assessment system 104 may also utilize SAR (Synthetic Aperture Radar) data from the Sentinel-1 platform that was acquired in ground range detected mode was processed. The habitat condition assessment system 104 may further calibrate radiometrically the SAR data. The habitat condition assessment system 104 may generate monthly mean SAR backscatter composite for both VH and VV polarization SAR backscatter. To analyze the backscatter of water bodies and other land classes, the habitat condition assessment system 104 may digitize permanent water bodies, concrete settlements, other types of settlements, and wetlands. Then, the habitat condition assessment system 104 may extract the time-series SAR backscatter for each of the polygons and plot the trend of mean variation across the temporal scale. The habitat condition assessment system 104 may then perform a comparative analysis between wetland and permanent water bodies to identify deviation of SAR signals for water and no water conditions. Based on the comparative analysis, the habitat condition assessment system 104 may utilize a statistical-based thresholding which includes mean and standard deviation of the entire time series. The habitat condition assessment system 104 may utilize the threshold to classify each monthly composite imagery into wet and no-wet regions. The habitat condition assessment system 104 may assess the wet/no-wet condition for each of the wetland polygons across the temporal scale. The habitat condition assessment system 104 may assign the land parcels that exhibit wet condition throughout the year a pass status. Other uses of SAR data by the habitat condition assessment system 104 will be apparent and are within the scope of this disclosure.

The habitat condition assessment system 104 may utilize image data and/or non-image data for other purposes. For example, the habitat condition assessment system 104 may utilize satellite data for species detection by classifying pixels for different species. The habitat condition assessment system 104 may utilize time-series satellite data for the classification. For example, the habitat condition assessment system 104 may use a classification model to classify images into binary species masks, such as for heather species, gorse species, and bracken species. The habitat condition assessment system 104 may then combine the masks to form a heather-gorse-bracken species map. Other uses of time-series satellite data by the habitat condition assessment system 104 will be apparent and are within the scope of this disclosure.

Figure 16:
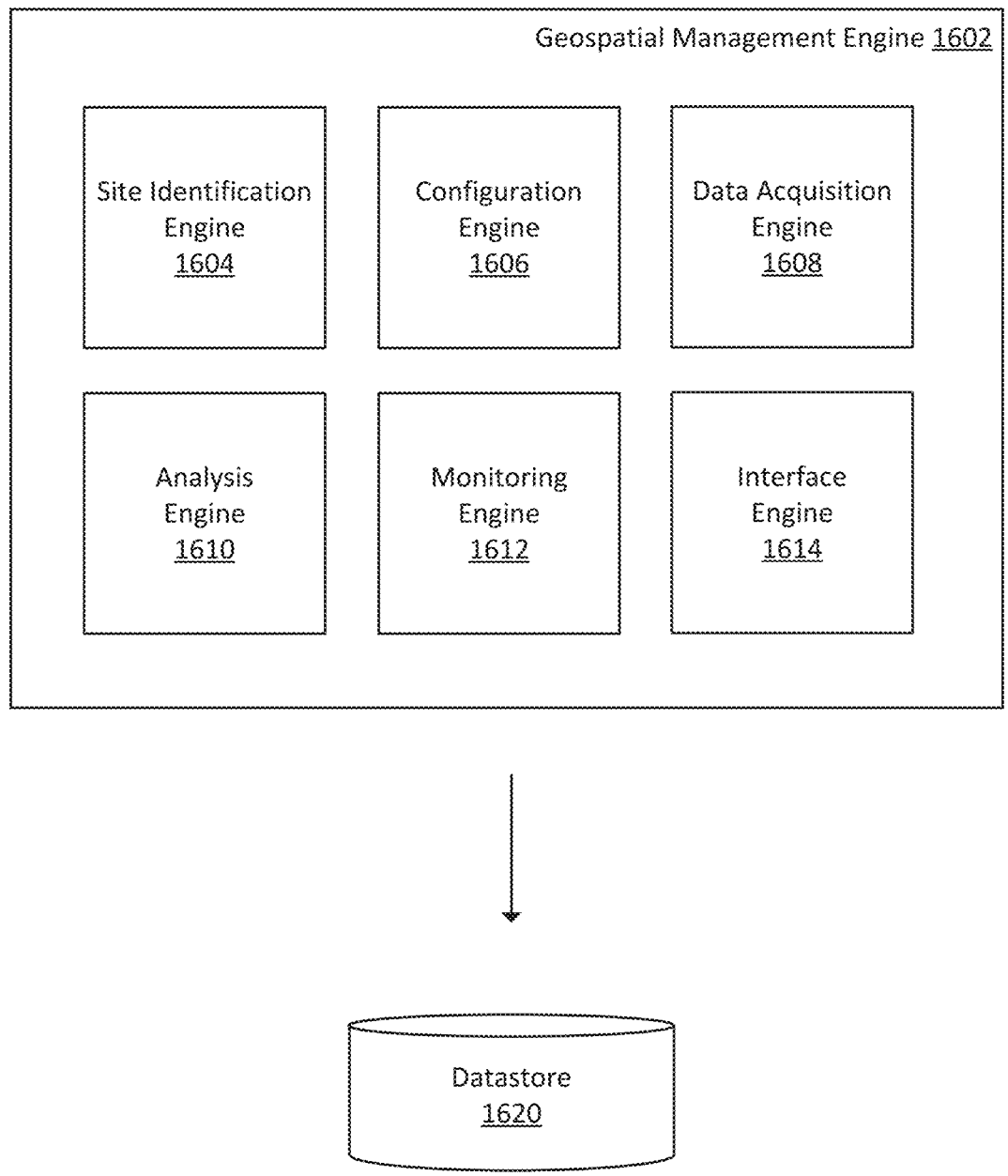
FIG. 16 depicts a block diagram of components of a geospatial management engine according to some embodiments.

FIG. 16 depicts a block diagram of components of a geospatial management engine 1602 according to some embodiments. The geospatial management engine 1602 may be implemented in a computer system that includes at least one processor, memory, and communication interface. The computer system can execute software, such as geospatial management software and/or habitat condition assessment software, that performs any number of functions described in relation to FIG. 16.

The geospatial management engine 1602 includes a site identification engine 1604, a configuration engine 1606, a data acquisition engine 1608, an analysis engine 1610, a monitoring engine 1612, and an interface engine 1614. The geospatial management engine 1602 can access a datastore 1620. The datastore 1620 may store various information for geographic regions, such as land surveys, maps, and images (e.g., aerial images, satellite images, or the like).

The site identification engine 1604 may be configured to obtain or receive geolocation information identifying a geographic location to be analyzed. In some embodiments, the geographic location may be identified based on a shapefile that describes physical boundaries of the geographic location, for example, based on a set of geographic coordinates. The shapefile may be provided by an entity that is requesting various analyses be performed for the geographic location. As an example, the shapefile may include a set of latitude and longitude coordinates that bound the geographic location. It will be appreciated that although latitude and longitude coordinates are discussed herein, the coordinates can be any type of coordinates and/or use any coordinate reference system. In some embodiments, the shapefile may provide additional attributes that describe the geographic location including, for example, area, geometry, and types of assets present at the geographic location (e.g., farm, power plant, manufacturing plant, or the like). Many variations are possible.

Other approaches for identifying the geographic location are contemplated. For example, in some embodiments, rather than providing a shapefile, the entity may be permitted to identify the geographic location in a graphical user interface (GUI). In such embodiments, the entity may interact with the GUI to draw boundaries of the geographic location in a digital map. The drawn boundaries may be used to determine geographic coordinates associated with the geographic location. Many variations are possible.

In general, the terms geographic location, geographic region, site, area of interest, parcel of land, lot, block, or tract of land are used interchangeably, and all refer to some physical land area to be processed using the techniques described herein.

The configuration engine 1606 may be configured to determine types of analyses (or assessments) to be conducted with respect to a geographic location. For example, in some embodiments, the configuration engine 1606 may provide options for selecting various types of analyses that may be performed in relation to the geographic location. The options may be provided in a graphical user interface (GUI). A user interacting with the GUI may select one or more analyses to be performed for the geographic location.

Embodiments described herein support many types of analyses (or assessments), which may be selected individually or as a combination. Some example types of analyses that may be selected include: an area determination analysis with a biodiversity analysis which may be performed in combination with: a carbon analysis, an air quality analysis, a flood risk analysis, a timber analysis, a food production analysis, a pollination analysis, a natural capital analysis, a monetary value analysis, a societal value analysis, a land use analysis, a land cover analysis, an object detection analysis, and a tree analysis. Many other types of analyses and variations thereof are contemplated to be added in combination with the biodiversity analysis.

The data acquisition engine 1608 may be configured to obtain information associated with a geographic location being analyzed. For example, based on information identifying the geographic location determined by the site identification engine 1604, the data acquisition engine 1608 may obtain images of the geographic location. For example, the images may be aerial images of the geographic location, satellite images of the geographic location, or digital surface model (DSM) images of the geographic location. The obtained images may be processed by the analysis engine 1610 to extract various insights. In some embodiments, the data acquisition engine 1608 may obtain non-image data of the geographic location and/or images of the geographic location for analysis.

The data acquisition engine 1608 may obtain other types of information that can be used to analyze the geographic location. For example, the data acquisition engine 1608 may obtain or access various surveys that were previously conducted for the geographic location. For example, the data acquisition engine 1608 may obtain land (or ground) surveys that were previously conducted for the geographic location. A land survey may identify geographic features, such as water bodies and boundaries, which may be referenced when analyzing and labeling the geographic location. In another example, the data acquisition engine 1608 may obtain or access ordinance surveys that were previously conducted for the geographic location. An ordinance survey may assess the geographic location for regulatory compliance. Such assessments may be referenced by the analysis engine 1610 when analyzing the geographic location.

The data acquisition engine 1608 may obtain map data that can be used to analyze the geographic location. In some embodiments, the data acquisition engine 1608 may obtain feature maps associated with the geographic location. For example, the data acquisition engine 1608 may obtain a map of a road network in the geographic location. As an example, the map may be used as reference when segmenting and labeling habitats in the geographic location.

In another example, the data acquisition engine 1608 may obtain a map of structures (e.g., houses, buildings, barns, sheds, or the like) in the geographic location. As an example, the map may be used as reference when classifying regions within the geographic location.

In yet another example, the data acquisition engine 1608 may obtain a map that provides normalized difference vegetation index (NDVI) measurements for the geographic location. As an example, the map may be used as reference for ground and habitat classifications. Many other types of maps may be retrieved and used as reference.

In some embodiments, the data acquisition engine 1608 may obtain land use maps associated with the geographic location. A land use map may identify various regions within the geographic location and their primary uses (e.g., agricultural, residential, industrial, mining, recreational, or the like). For example, a region used for crops may be categorized as agricultural while a region used for housing may be categorized as residential. As an example, a land use map may be provided in a graphical user interface as a visual overlay in an image of the geographic location. In another example, the land use map may be used as reference when determining carbon metrics for the geographic location.

In some embodiments, the data acquisition engine 1608 may obtain land cover maps associated with the geographic location. A land cover map may identify various regions in the geographic location and their corresponding habitats. As an example, the land cover map may be used as reference when segmenting and labeling habitats in an image of the geographic location.

The analysis engine 1610 may be configured to perform various analyses in relation to the geographic location. The analysis engine 1610 may perform such analyses based on images of the geographic location, data points (e.g., non-images) of the geographic location (e.g., provided by third parties, such as weather data, air quality data, and other data), and/or information describing the geographic location, as obtained by the data acquisition engine 1608. In various embodiments, the analysis engine 1610 may employ machine learning models to obtain various insights for the geographic location, for example, based on the images of the geographic location and/or the information describing the geographic location.

For example, the analysis engine 1610 may perform an area analysis to measure an area of the geographic location or a region within the geographic location. For example, the area of the geographic location may be measured based on a polygon shape that defines the boundaries of the geographic location. For example, the polygon shape may be drawn by a user in a graphical user interface (GUI) in relation to an aerial or satellite image of the geographic location (or in relation to data points associated with the geographic location such as coordinates or the like). In another example, the polygon shape may be determined automatically based on the location information determined by the site identification engine 1604.

According to some embodiments, the analysis engine 1610 may perform a biodiversity analysis to measure a level of biodiversity associated with the geographic location. For example, the analysis engine 1610 may determine biodiversity based on machine learning models trained to detect various objects (e.g., plants, animals, or the like) in images of the geographic location. The machine learning models may provide information, such as types of objects identified and corresponding populations or concentrations. Such information may be used to determine a level of biodiversity associated with the geographic location. Many variations and customizations are possible.

In some embodiments, the analysis engine 1610 may perform a carbon analysis to determine carbon-related metrics (e.g., carbon emissions, credits, offsets, stock, or the like). For example, the analysis engine 1610 may determine a carbon footprint for the geographic location based on an amount of vegetation detected by a machine learning model in images of the geographic location. Many variations and customizations are possible.

In some embodiments, the analysis engine 1610 may perform an air quality analysis to determine a level of air quality associated with the geographic location. For example, the analysis engine 1610 may determine air quality for the geographic location based on publicly available air quality data. The air quality may be measured over time to determine changes to air quality and pollution over time. Many variations and customizations are possible.

In some embodiments, the analysis engine 1610 may perform a flood analysis to determine a risk of flood occurring at the geographic location. For example, the analysis engine 1610 may determine flood risk for the geographic location based on publicly available flood maps. Many variations are possible. In some embodiments, the analysis engine 1610 may determine flood risk based on water levels detected by a machine learning model in images of the geographic location. Many variations and customizations are possible.

In some embodiments, the analysis engine 1610 may perform a timber analysis to determine an amount of timber growing at the geographic location. For example, the analysis engine 1610 may detect regions within the geographic location that correspond to timber based on a machine learning model that detects timber in images of the geographic location. The detected timber may be bounded by one or more polygons. An area measurement for the detected timber may be determined and used to estimate timber concentrations. In various embodiments, digital surface model (DSM) images of the geographic location may be evaluated to estimate tree counts, heights, and biomass. Many variations and customizations are possible.

In some embodiments, the analysis engine 1610 may perform a food production analysis to determine an amount of food that is being produced at the geographic location. For example, the analysis engine 1610 may detect regions associated with food production (e.g., agricultural regions) within the geographic location based on a machine learning model that classifies land types in images of the geographic location. The detected land may be bounded by one or more polygons. An area measurement for the detected land may be determined and used to estimate a level of food production associated with the geographic location. The estimated level of food production may also be determined based on existing survey and map data identifying the types of food being produced at the geographic location. Many variations and customizations are possible.

In some embodiments, the analysis engine 1610 may perform a pollination analysis to determine an amount of pollination associated with the geographic location. For example, the pollination analysis may provide a level of pollination associated with the geographic location as determined based on publicly available pollination maps and data. Many variations and customizations are possible.

In some embodiments, the analysis engine 1610 may perform a natural capital analysis to determine a natural capital value for the geographic location. The natural capital value may be determined based on renewable and non-renewable resources (e.g., plants, animals, air, water, soils, minerals) that are available within the geographic location. The resources available and their respective amounts may be determined based on a machine learning model that is trained to detect such resources in images of the geographic location. Many variations and customizations are possible.

In some embodiments, the analysis engine 1610 may perform a monetary value analysis to determine a monetary value for the geographic location. The monetary value may be determined according to various factors. For example, the monetary value may be determined based in part on sales data for nearby parcels of land. Various site metrics may also influence the monetary value. For example, a site associated with a high level of biodiversity and low level of carbon emissions may be assigned a higher monetary value while a site associated with a low level of biodiversity and high level of carbon emissions may be assigned a lower monetary value. Many variations and customizations are possible.

In some embodiments, the analysis engine 1610 may perform a societal value analysis to determine a societal value metric for the geographic location. The societal value metric may measure an amount of societal benefit that is provided by the geographic location. For example, the analysis engine 1610 may analyze images of the geographic location (and/or non-image data) based on machine learning models to detect regions allocated for food production or recreation. In this example, the societal value metric for the geographic location may be determined based on the detected regions and their relative areas. Many variations and customizations are possible.

In some embodiments, the analysis engine 1610 may perform a land use analysis to determine how the geographic location is being used. For instance, the land use analysis may indicate whether the geographic location is allocated for agricultural, residential, industrial, mining, and/or recreational use. The land use analysis may be determined by machine learning models that analyze images of the geographic location and segment regions by use. Further, the land use analysis determined based on the machine learning models may be validated based on existing land use data for the geographic location that serves as a reference. Any discrepancy between the land use analysis and the existing land use data may be flagged for human review. Many variations and customizations are possible.

In some embodiments, the analysis engine 1610 may perform a land cover analysis to determine various habitats represented in the geographic location. In such embodiments, a machine learning model trained to segment an image of the geographic location into habitats may be deployed to label (or classify) habitat regions within the geographic location. Further, the land cover analysis determined based on the machine learning model may be validated based on existing land cover data for the geographic location which serves as a reference. Any discrepancy between the land cover analysis and the existing land cover data may be flagged for human review. Many variations and customizations are possible.

In some embodiments, the analysis engine 1610 may perform an object detection analysis to determine various objects (e.g., humans, animals, or the like) present at the geographic location. For example, the analysis engine 1610 may apply machine learning models that are trained to detect objects in images of the geographic location. In this example, object-related information, such as object types and respective populations, may be determined based on outputs from the machine learning models. For example, a user may request a custom analysis that measures a population of an endangered species. In this example, the analysis engine 1610 may process images of the geographic location using a machine learning model that is trained to detect the endangered species. Many variations and customizations are possible.

In some embodiments, the analysis engine 1610 may perform a tree analysis for the geographic location. For example, the analysis engine 1610 may apply machine learning models that are trained to detect trees in images of the geographic location. In this example, tree-related information, such as tree counts and respective heights, may be determined based on outputs from the machine learning models. In various embodiments, digital surface model (DSM) images, which provide point-level elevation measurements, may be used to determine tree metrics. Many variations and customizations are possible.

In some embodiments, the analysis engine 1610 may perform super resolution techniques to enhance the resolution of images of the geographic location. For example, the analysis engine 1610 may determine higher resolution imagery of the geographic location based on lower resolution images of the geographic location. As an example, the analysis engine 1610 may apply machine learning models that are capable of upscaling lower resolution images of the geographic location. The enhanced images of the geographic location may be analyzed using any of the techniques described herein to gain further and more accurate insights. Many variations and customizations are possible.

In some embodiments, the analysis engine 1610 may perform simulations to determine potential changes to the geographic location that may result from planned land conversions. For example, the analysis engine 1610 may predict changes to site metrics, such as biodiversity and carbon stock, that may result from the addition or removal of certain land features (e.g., habitats, water bodies, new construction, or the like). The predictions may be determined based in part on the type of land conversion being contemplated and the relative size of the area that is subject to the land conversion. Many variations and customizations are possible.

In some embodiments, the analysis engine 1610 may perform a compliance analysis to determine whether the geographic location is in compliance with various legal or binding requirements (e.g., regulations, ordinances, conditions, or the like). For example, the geographic location may be subject to land allocation requirements that require a certain amount of land to be devoted to various habitats. In this example, images of the geographic location may be analyzed over time to determine whether the land allocation requirements are being satisfied and to what extent. For example, machine learning models may be applied to images of the geographic location to detect habitats and related changes over time. Many variations and customizations are possible.

The monitoring engine 1612 may be configured to monitor the geographic location for various purposes. For example, the monitoring engine 1612 may monitor the geographic location for changes to determine land conversion progress. In another example, the monitoring engine 1612 may monitor the geographic location for changes to ensure compliance requirements are being satisfied. In various embodiments, the monitoring engine 1612 may be configured to monitor the geographic location at various intervals (e.g., daily, monthly, annually, or the like). In such embodiments, at each time interval, the monitoring engine 1612 may obtain images of the geographic location and other information (e.g., surveys, maps, or the like). The obtained images and information may be analyzed by the analysis engine 1610, as described above. The results of the analysis may be stored and made accessible in interfaces provided by the interface engine 1614. The results may be used to track and visually plot relevant changes to the geographic location over time.

The interface engine 1614 may be configured to provide graphical user interfaces (GUIs) that may present (or display) information describing the geographic location, including results of any analyses that were performed in relation to the geographic location by the analysis engine 1610. In various embodiments, the interface engine 1614 may provide access to various dashboards, reports, and planning tools, as illustrated in the examples of FIGS. 17A-17I.

Figure 17A:
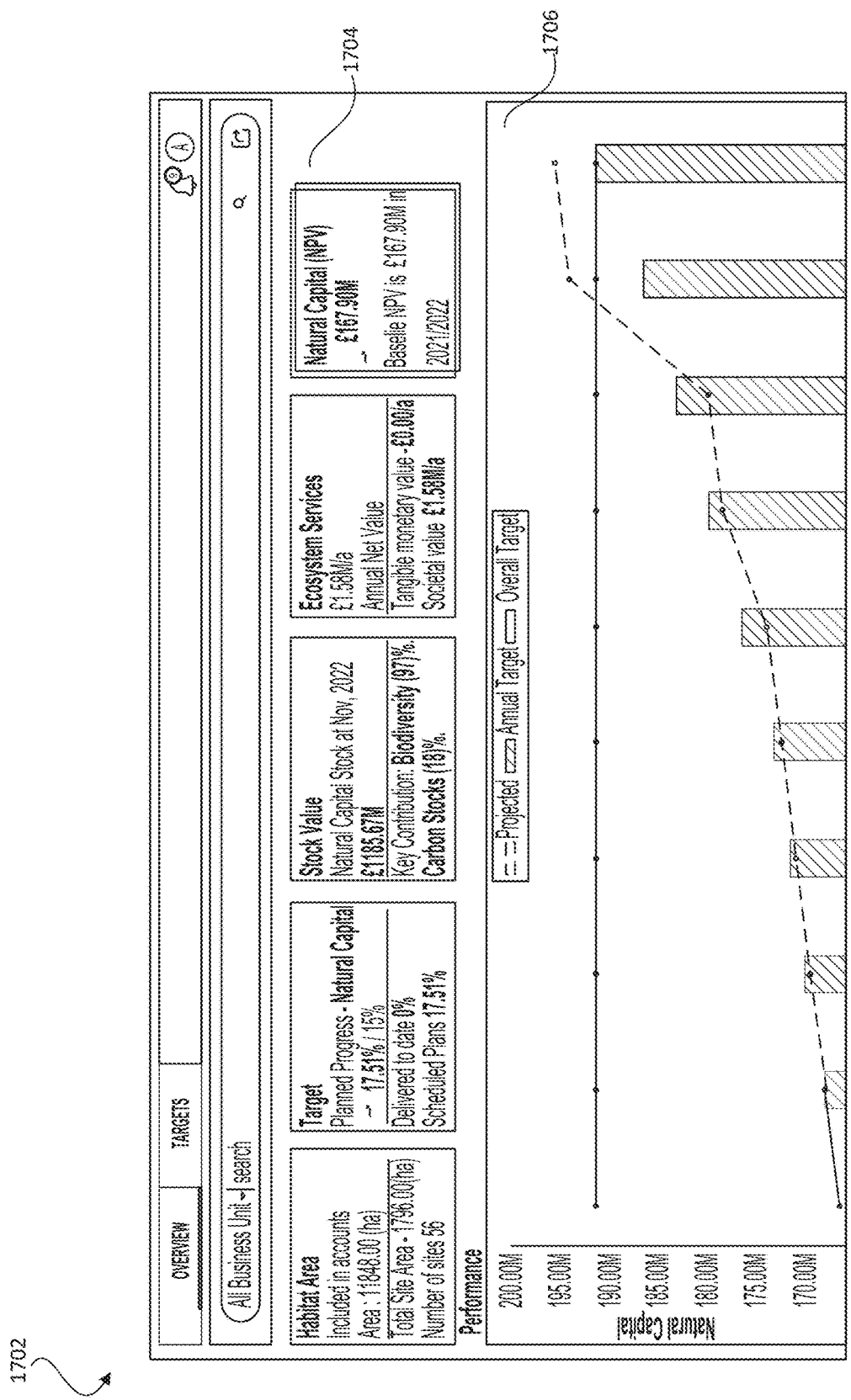

For example, FIG. 17A illustrates an example interface 1702 of a dashboard that may be provided by the interface engine 1614. The interface 1702 provides various information determined for the geographic location based on analyses performed by the analysis engine 1610. For example, the interface 1702 may provide site information 1704 relating to habitats associated with the geographic location, status on planned land conversions, natural capital value, ecosystem values (e.g., monetary value, societal value, or the like), and changes to natural capital value over time. The interface 1702 may also provide visualizations (e.g., graphs, plots, or the like) that show changes to various site metrics over time. In the example of FIG. 17A, the interface 1702 provides a visualization 1706 of changes to a natural capital value associated with the geographic location as determined based on the monitoring engine 1612 over a period of time.

FIG. 17B illustrates another example dashboard interface 1710 that provides access to various site metrics. The dashboard interface 1710 may provide access to various metrics 1712 (e.g., air quality, biodiversity, carbon, recreation, food production, natural capital, timber, or the like) for one or multiple geographic locations associated with an entity (e.g., a landowner). A drop-down menu may be used to select different metrics to be presented within the dashboard interface 1710. In the example of FIG. 17B, the dashboard interface 1710 provides biodiversity metrics for a number of sites associated with the entity.

For each site, the dashboard interface 1710 may provide detailed information, such as an area of the site, biodiversity, biodiversity per hectare, an opportunity score reflecting potential opportunities for improving biodiversity, and a change in biodiversity in relation to a baseline biodiversity value. In various embodiments, opportunity scoring helps with relative prioritization. For example, if there are 100 sites and there is only manpower to work on five sites, opportunity scores may assist (e.g., by ranking based on opportunity scores) to select the most preferable sites for the work. The dashboard interface 1710 of FIG. 17B may provide opportunity scores as integers of score or site rank values. In various embodiments, different clients may have different rules and policies to adjust the dashboard based on their configuration(s).

Many variations are possible. In various embodiments, a user interacting with the dashboard interface 1710 may select options 1714 to access more detailed site information.

Figure 17C:
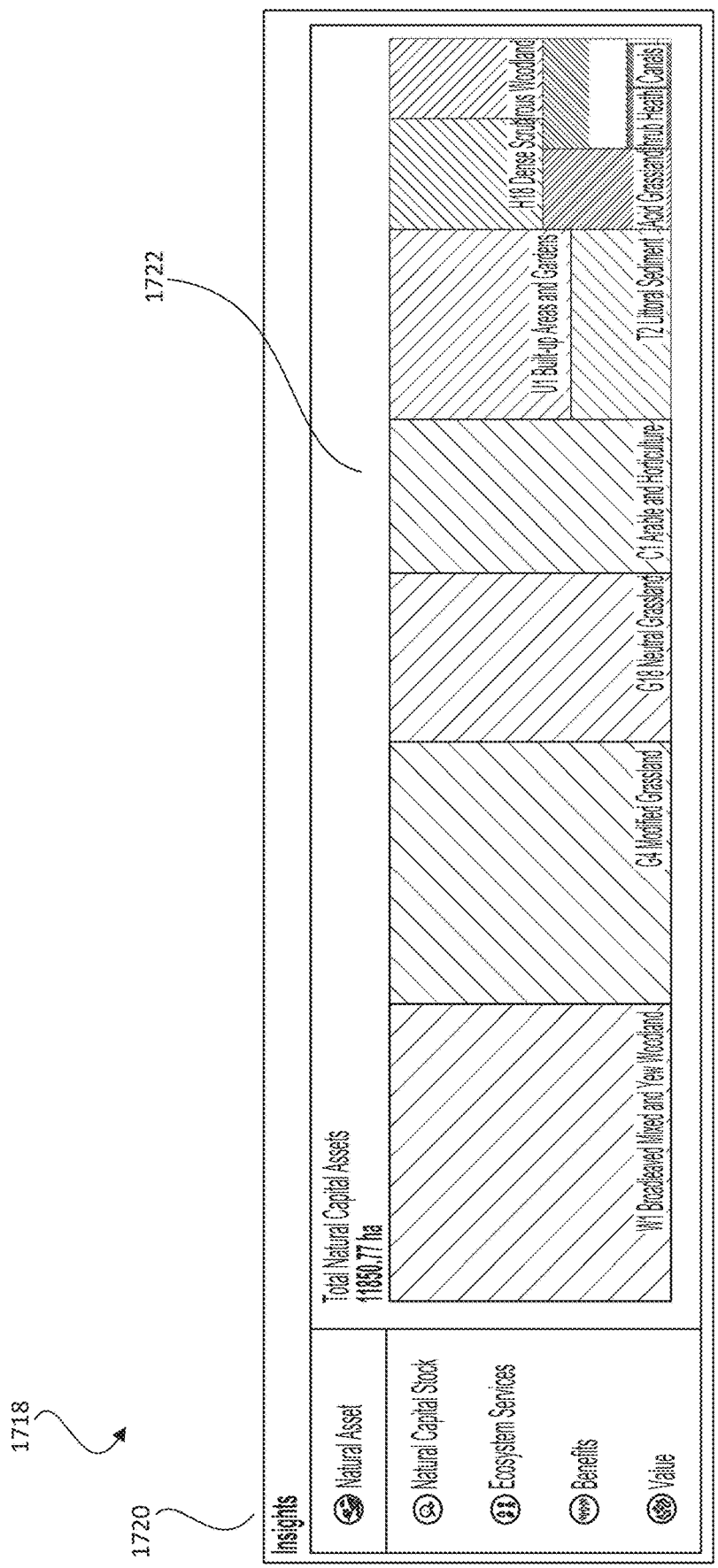

FIG. 17C illustrates another example dashboard interface 1718 that provides access to various insights that were determined based on analyses performed by the analysis engine 1610. For example, the dashboard interface 1718 may provide insights 1720 related to natural assets, natural capital stock, ecosystem services, benefits, and value. In the example of FIG. 17C, the dashboard interface 1718 provides a visual distribution 1722 of total natural capital assets (e.g., woodland, grassland, arable land, swampland, or the like) associated with a site. The visual distribution 1722 may identify individual natural capital assets associated with the site and a relative land area associated with each natural capital asset. The visual distribution 1722 may help visualize the different natural capital assets and their relative amounts. For instance, each natural capital asset associated with the site may be shown in a section of the visual distribution 1722 in a distinct color or pattern. The size of the section may reflect the land area associated with the natural capital asset. Many variations are possible.

Figure 17D:
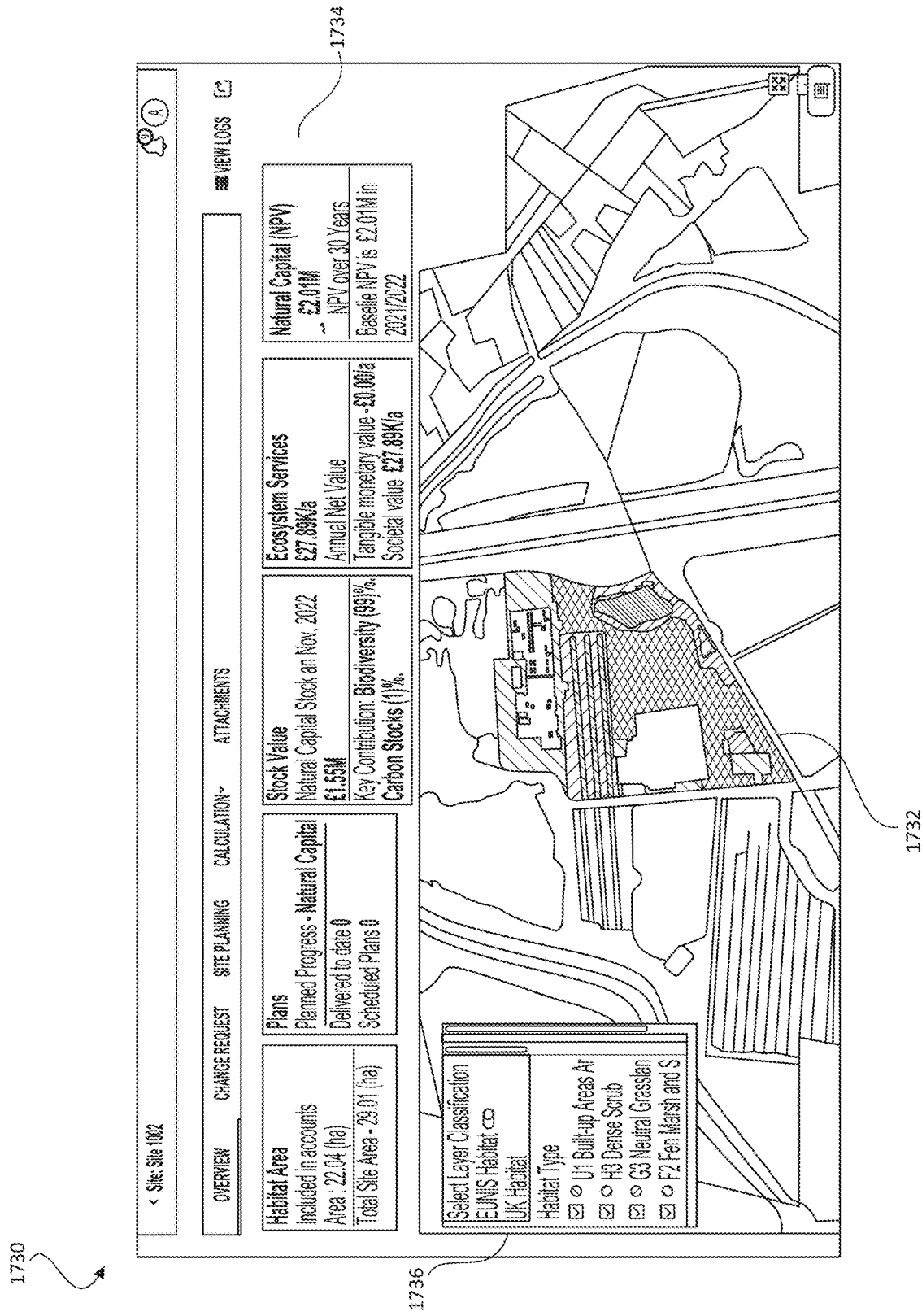

In various embodiments, the interface engine 1614 may be configured to provide GUIs that enable entities to manage their sites. For example, FIG. 17D illustrates an example site management interface 1730 for managing a given site. The site management interface 1730 may provide a map 1732 of the site. The map 1732 may visually segment regions in the site by habitat. For example, each region associated with a particular habitat may be presented in a distinct color or pattern. A user may interact with the site management interface 1730 to reposition the map 1732 or adjust a zoom level of the map 1732, for example.

The site management interface 1730 may also provide various metrics 1734 associated with the site or a selected habitat region. In the example of FIG. 17D, the site management interface 1730 provides metrics 1734, such as habitat area, status on site plans, natural capital value, ecosystem values (e.g., monetary value, societal value, or the like), and changes to natural capital value over time. Many variations are possible. In various embodiments, the site management interface 1730 provides options 1736 to select or remove certain habitat types from being shown in the map 1732. Further, the site management interface 1730 may also provide options that allow a user interacting with the site management interface 1730 to modify any of the habitats associated with the site. For example, the user may modify a habitat type associated with a region or modify boundaries of the region.

Figure 17E:
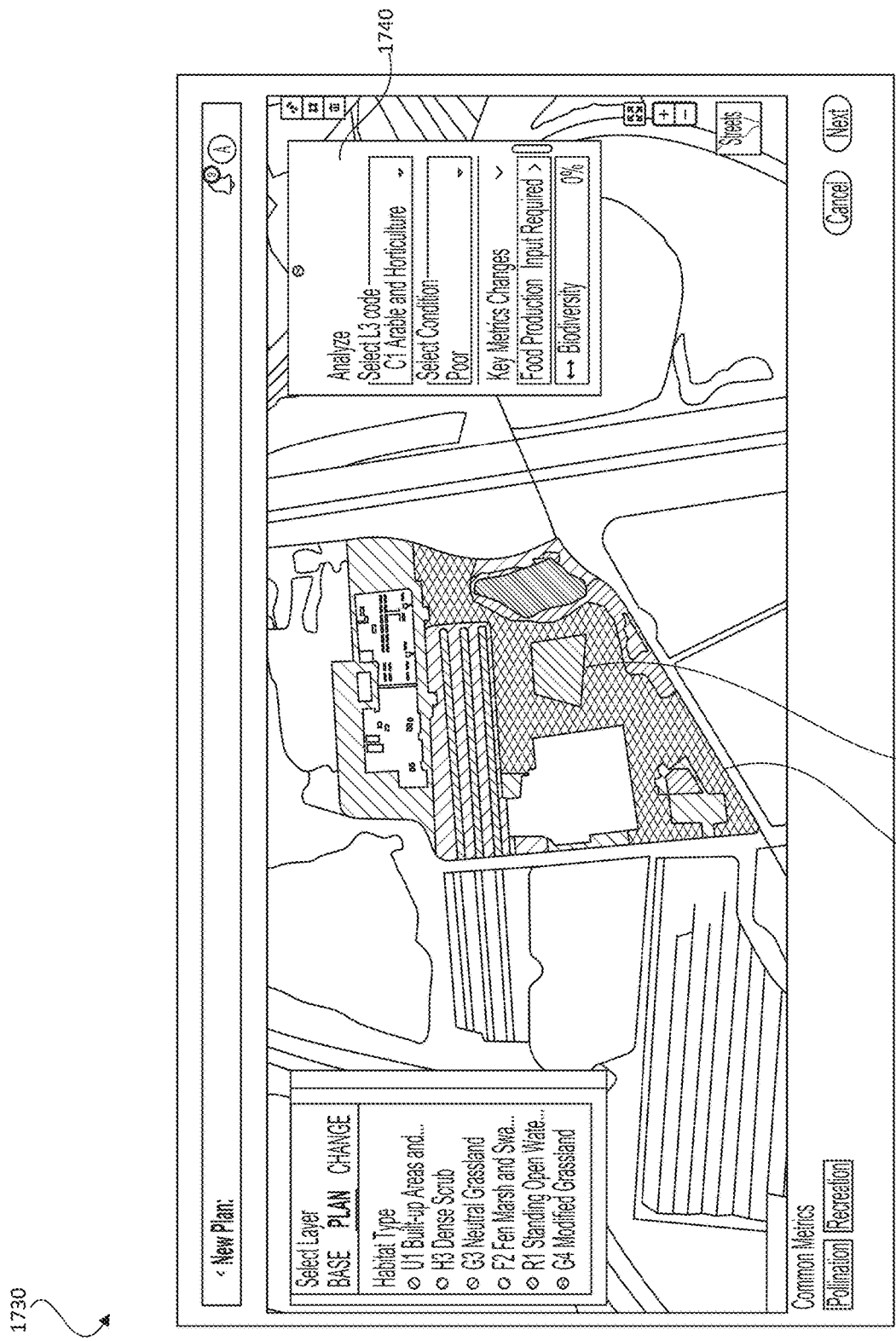

The site management interface 1730 may provide options that enable entities to plan changes (or conversions) to their sites. For example, FIG. 17E illustrates an example plan contemplated for the site. In this example, the plan involves a conversion of a region 1738 of the site to a different habitat. In various embodiments, the region 1738 designated for conversion may be identified by a user interacting with the site management interface 1730. For example, the user may interact with the site management interface 1730 to draw a polygon that defines boundaries of the region to be converted. Once the polygon is created, various attributes for the selected region 1738 may be specified in a menu 1740. For example, the user may specify a habitat to which the region will be converted and an intended condition (e.g., poor, moderate, or the like) for that region. The user may also specify changes to key metrics that are required as a result of the conversion.

Figure 17F:
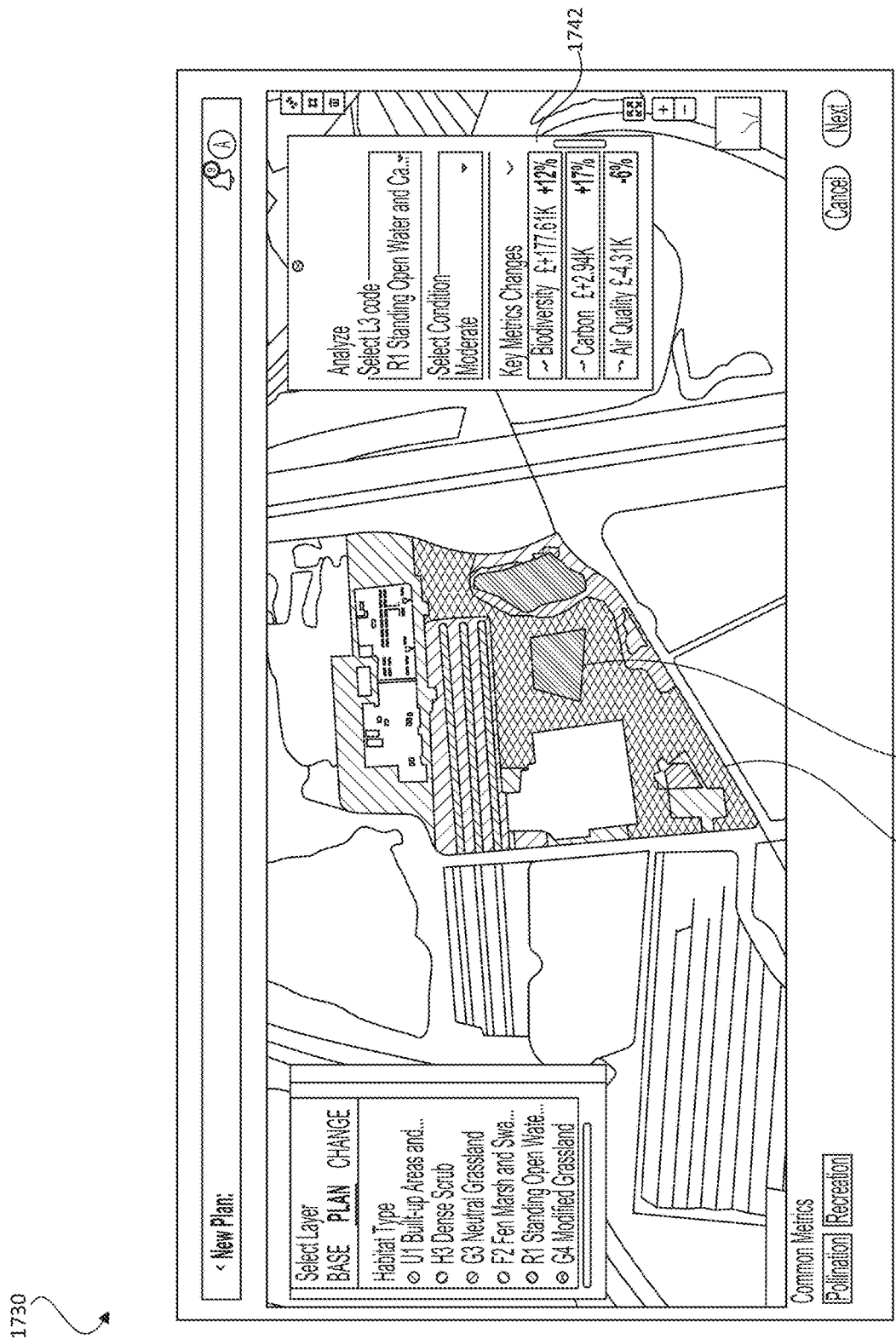

Based on the selected region and specified attributes, a simulation of the planned conversion may be performed by the analysis engine 1610 to determine changes to site metrics that may result. The changes may be determined based on the type of habitat planned for the region 1738 and a total area determined for the region 1738. For example, FIG. 17F illustrates expected changes 1742 to metrics that may result from the planned conversion. In this example, the changes 1742 indicate that, due to the planned conversion, site biodiversity is expected to increase by 12 percent, carbon stock is expected to increase by 17 percent, and air quality is expected to decrease by 6 percent. Such insights may help inform whether the planned conversion is feasible or desirable.

Figure 17G:
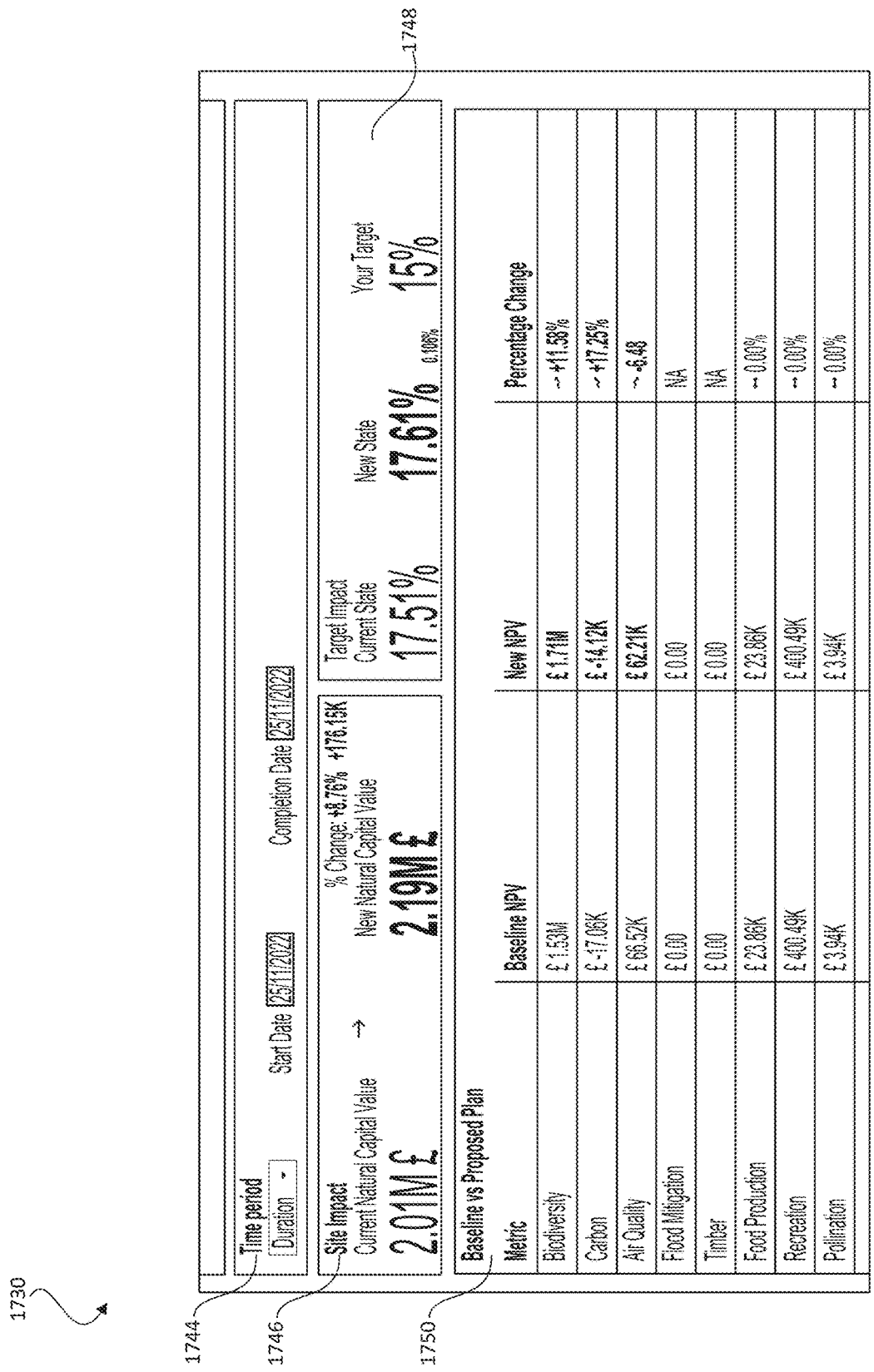

In various embodiments, additional details relating to the expected changes 1742 may be accessed within the site management interface 1730. For example, FIG. 17G illustrates a summary of expected changes due to the planned conversion over some period of time 1744. The site management interface 1730 may provide impact assessments, such as site impact 1746 in terms of changes to natural capital value. In another example, the site management interface 1730 may provide a target impact 1748 that measures changes to metrics due to the planned conversion. The site management interface 1730 may also provide a list of metrics 1750 associated with the site, and corresponding baseline net present values (NPVs), new NPVs resulting from the conversion, and percentage changes between baseline and new NPVs. Some examples of the types of metrics that may be accessible include biodiversity, carbon, air quality, flood mitigation, timber, food production, recreation, and pollination. Many variations are possible.

In various embodiments, the interface engine 1614 may be configured to provide a site planning interface 1752 that provides an overview of various sites 1754 undergoing land conversions, as illustrated in FIG. 17H. The site planning interface 1752 may provide aggregated site details 1756, such as area under planning (e.g., in hectares) as well as pre-intervention (or pre-conversion) and post-intervention (or post-conversion) metrics. In the example of FIG. 17H, the site planning interface 1752 provides a pre-intervention biodiversity value, a post-intervention biodiversity value, a change in biodiversity in terms of units and percentage, and a total financial cost associated with the change. Many variations are possible. For each site, the site planning interface 1752 may provide plan details 1758, such as plan name, creation date, approval date, start date, end date, budget, plan manager, site name, and plan status (e.g., draft, pending approval, approved, rejected, or the like). For example, the site planning interface 1752 may be accessed by a landowner seeking to manage multiple site conversions. In another example, the site planning interface 1752 may be accessed by a regulator (or auditor) to check on the status of a given site conversion and determine whether compliance requirements are being satisfied. In general, interfaces made available to third parties, such as regulators, may be provided with limited read-only functionality. Such reduced access may still allow the third parties to observe and monitor geographic locations, for example, for compliance purposes.

Figure 17I:
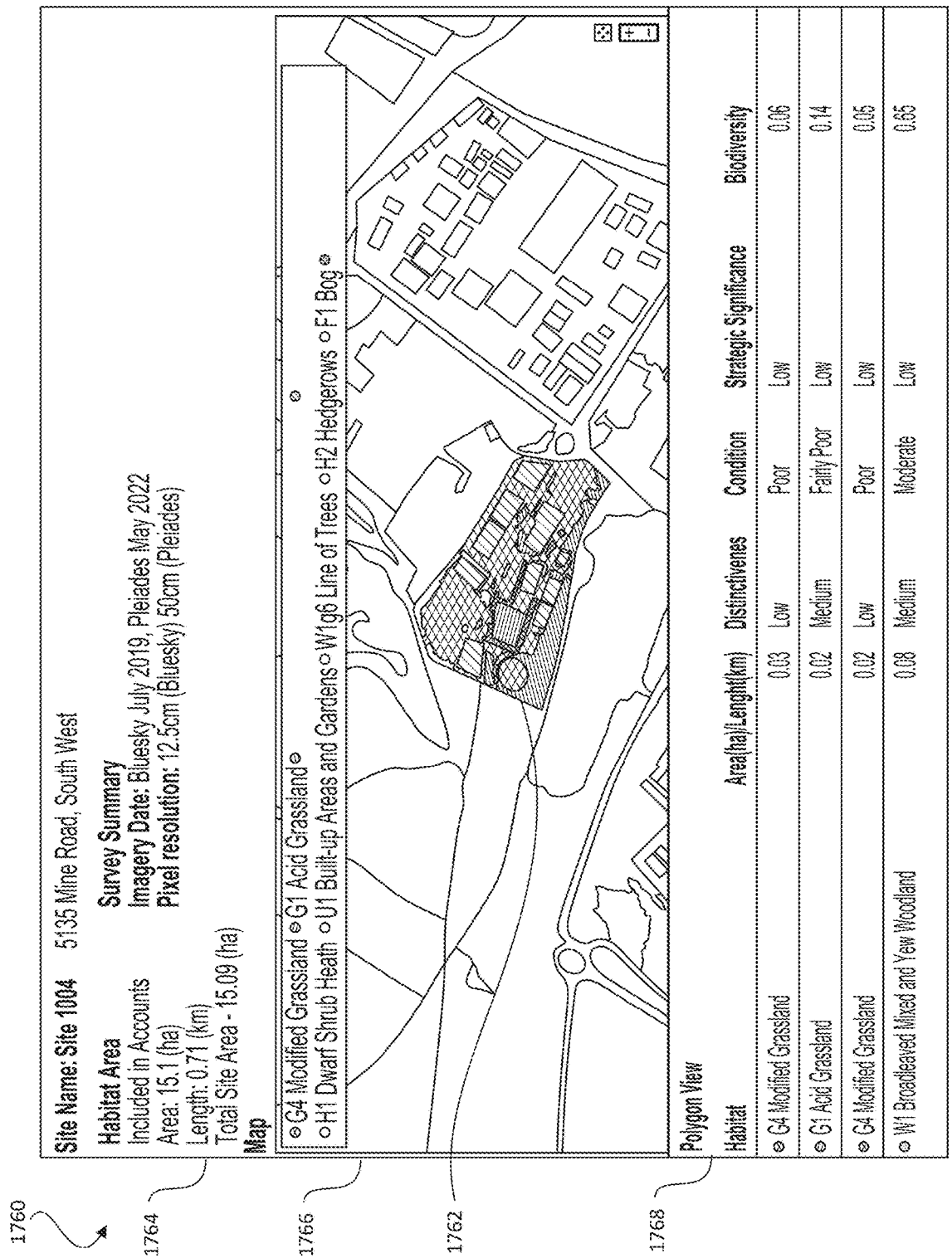

The interface engine 1614 may also be configured to provide access to site reports, as illustrated in the example of FIG. 17I. FIG. 17I illustrates an example report interface 1760 determined for a site 1762. For example, the report may be determined based on various analyses performed by the analysis engine 1610. The report interface 1760 may provide various site details 1764, such as habitat area. In some embodiments, the report interface 1760 may provide details about resources used to analyze the site 1762. For example, the report interface 1760 may identify site imagery (e.g., satellite images, aerial images, or the like) used to analyze the site including respective timestamps and pixel resolution associated with the imagery. In some embodiments, the report interface 1760 may identify resources that were used to validate results of various analyses, such as certain maps and surveys.

The report interface 1760 may also provide a map 1766 of the site 1762, including any habitats that were identified within the site. Each habitat may be represented in a distinct color or pattern. Further, the report interface 1760 may provide habitat details 1768 for each habitat identified in the site 1762. To facilitate review, the habitat details for a given habitat may be associated with the same distinct color or pattern used to distinguish the habitat in the map 1766. For example, habitat details 1768 provided for a given habitat may include habitat area, distinctiveness, condition, strategic significance, and biodiversity. Other types of details may be provided and, of course, many variations are possible.

Figure 18:
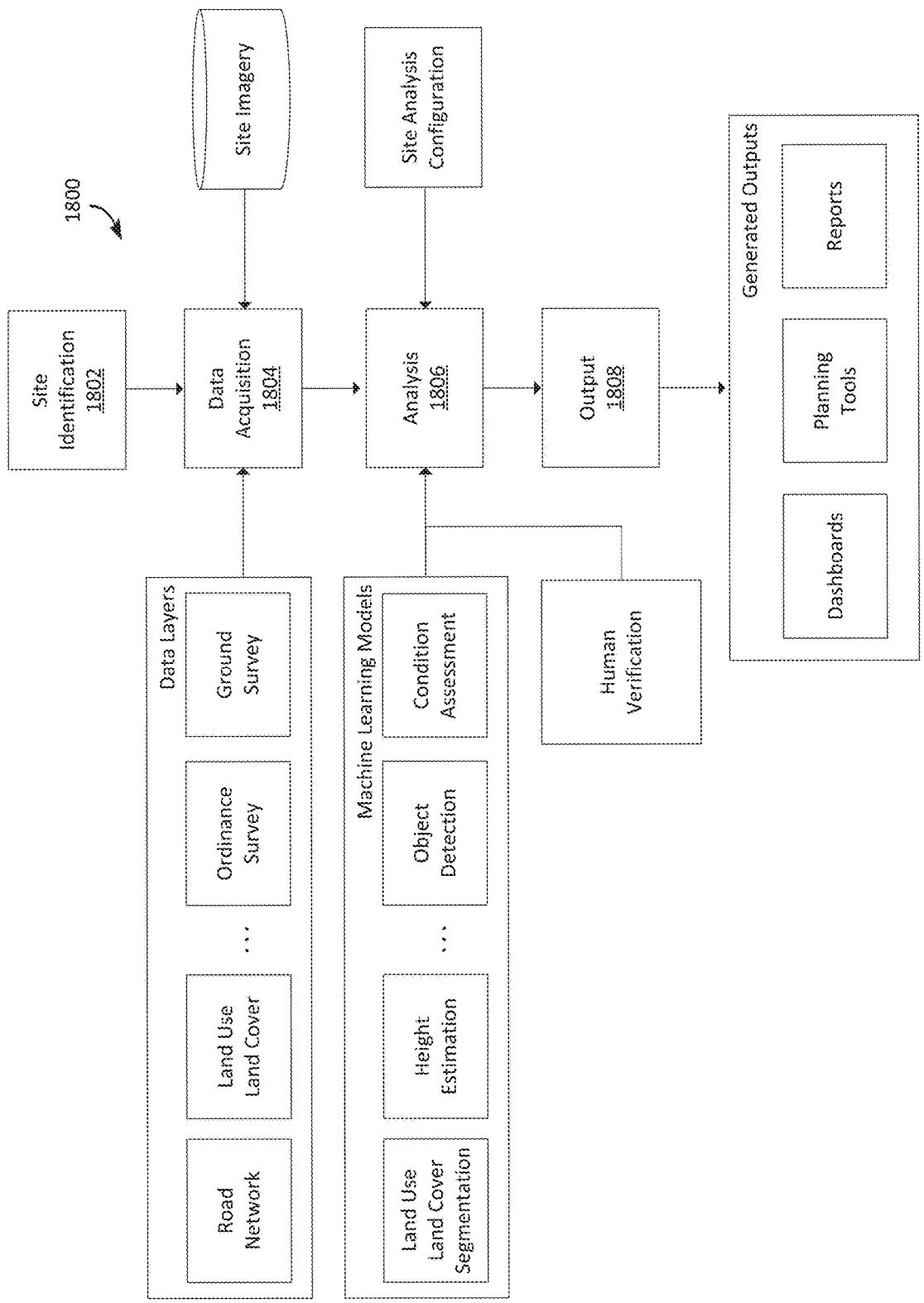
FIG. 18 illustrates an example process for analyzing land according to some embodiments.

FIG. 18 illustrates an example process 1800 for analyzing a site. In step 1802, information identifying the site may be obtained or received, as described above in relation to the site identification engine 1604 of FIG. 11.

In step 1804, information associated with the site may be obtained, as described above in relation to the data acquisition engine 1608. The obtained data may include images (e.g., optical images, digital surface model images, or the like) and/or data points of the site that may be analyzed for various insights. The obtained data may also include data layers, such as road network maps, structure maps, land use data, land cover data, ordinance surveys, and ground surveys, for example.

In step 1806, various analyses may be performed for the identified site, as described above in relation to the analysis engine 1610. The analyses may be performed according to a site analysis configuration specified for the site, as described above in relation to the configuration engine 1606. The site may be analyzed based on machine learning models which may process site images to provide various insights in conjunction with the obtained data layers. In various embodiments, a human-in-the-loop may be deployed to evaluate outputs from machine learning models, such as habitat labels, for completeness and accuracy.

In step 1808, outputs from the analyses performed for the identified site may be provided, as described above in relation to the interface engine 1614. For example, the outputs may be provided for presentation in various graphical user interfaces (GUIs) that provide access to dashboards, planning tools, and reports. In some embodiments, the interface engine 1614 may allow a user to utilize tools for manual editing and/or drawing.

In various embodiments, the geospatial management engine 1602 may optionally collect the information for the analysis (e.g., information acquired by the data acquisition engine 1608 and analysis performed by the analysis engine 1610) and store the information in the datastore 1620. The interface engine 1614 may optionally provide that information, records, and/or reports to allow users to document materials received, analysis performed, configurations and the like. This information may assist in future training, confirmation of the process, validation of the approach, and/or compliance with regulations or audits. In some embodiments, the geospatial management engine 1602 may optionally allow users to upload information, documents (e.g., a contract for the plan), or the like. The uploaded information may optionally assist with centralizing information associated with the plan for ease of review and organization.

Figure 19A:
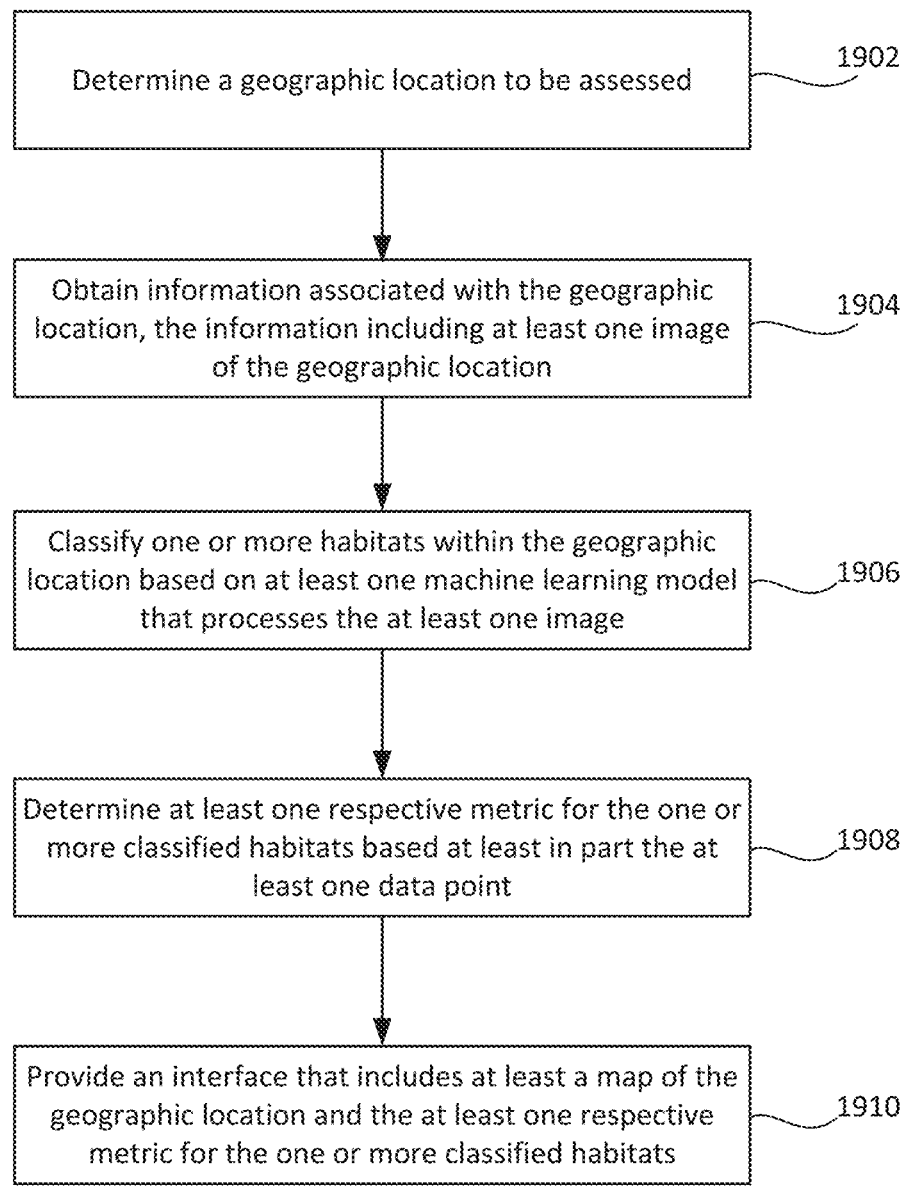
FIG. 19A illustrates an example process for determining habitats in a geographic location according to some embodiments.

FIG. 19A illustrates an example process for determining habitats in a geographic location according to some embodiments. In step 1902, a geographic location to be assessed is determined. In step 1904, information associated with the geographic location is obtained. The information may include at least one data point of the geographic location. The data point may be an image of the geographic location or non-image data associated with the geographic location. In step 1906, one or more habitats within the geographic location are classified based on at least one machine learning model. The machine learning model may process the at least one data point of the geographic location to determine the habitats. In step 1908, at least one respective metric for the one or more classified habitats is determined based at least in part on the at least one data point of the geographic location. The data point may be an image or non-image (or part of an image and/or non-image). In step 1910, an interface that includes at least a map of the geographic location and the at least one respective metric for the one or more classified habitats is provided. The one or more classified habitats may be visually segmented within the map in the interface by habitat type. Many variations are possible, as described herein.

Figure 19B:
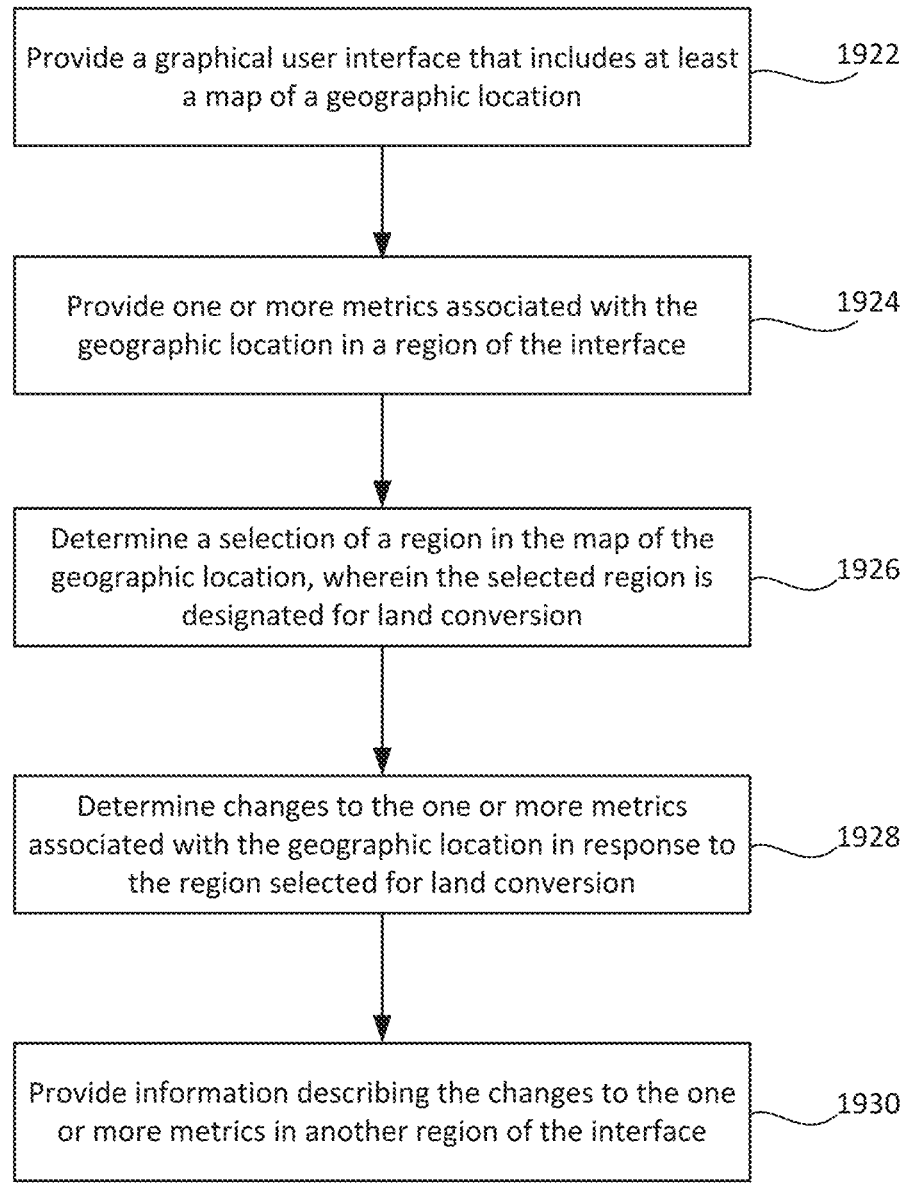
FIG. 19B illustrates an example process for planning a land conversion in a geographic location according to some embodiments.

FIG. 19B illustrates an example process for planning a land conversion in a geographic location according to some embodiments. In step 1922, a graphical user interface that includes at least a map of a geographic location is provided. In step 1924, one or more metrics associated with the geographic location are provided in a region of the interface. At least one metric is determined based on a data point (e.g., image) of the geographic location that is processed by a machine learning model. In step 1926, a selection of a region in the map of the geographic location is determined. The selected region may be designated for land conversion. In step 1928, changes to the one or more metrics associated with the geographic location are determined in response to the region selected for land conversion. In step 1930, information describing the changes to the one or more metrics is provided in another region of the interface. Many variations are possible, as described herein.

The solutions provide many advantages over conventional approaches. For instance, the solutions help entities (e.g., landowners, regulators, or the like) accurately and efficiently evaluate any parcel of land without having to devote significant resources to manually conduct assessments. For instance, a landowner may use the solutions to segment habitat regions within a parcel of land based on generally available resources, such as satellite images, which may be analyzed based on machine learning models to detect and label habitats. Over time, the solution may continually be applied to observe changes to the parcel of land, its habitats and the condition of those habitats.

As another advantage, the approaches allow entities to simulate potential land conversion projects for a parcel of land and observe the effects of such projects. For example, the simulation may provide predicted metrics, such as biodiversity and carbon emissions, that may result upon completion of the land conversion projects. The predicted metrics may help determine the feasibility and practicality of a given project.

In yet another advantage, the approaches allow entities to efficiently monitor parcels of land for various requirements. For example, a parcel of land may be subject to certain land-based rules or regulations. In this example, the solutions may be applied to monitor the parcel of land and its related metrics to demonstrate compliance. One such compliance may be to monitor the improvement or change in habitat condition against planned targets.

Figure 20:
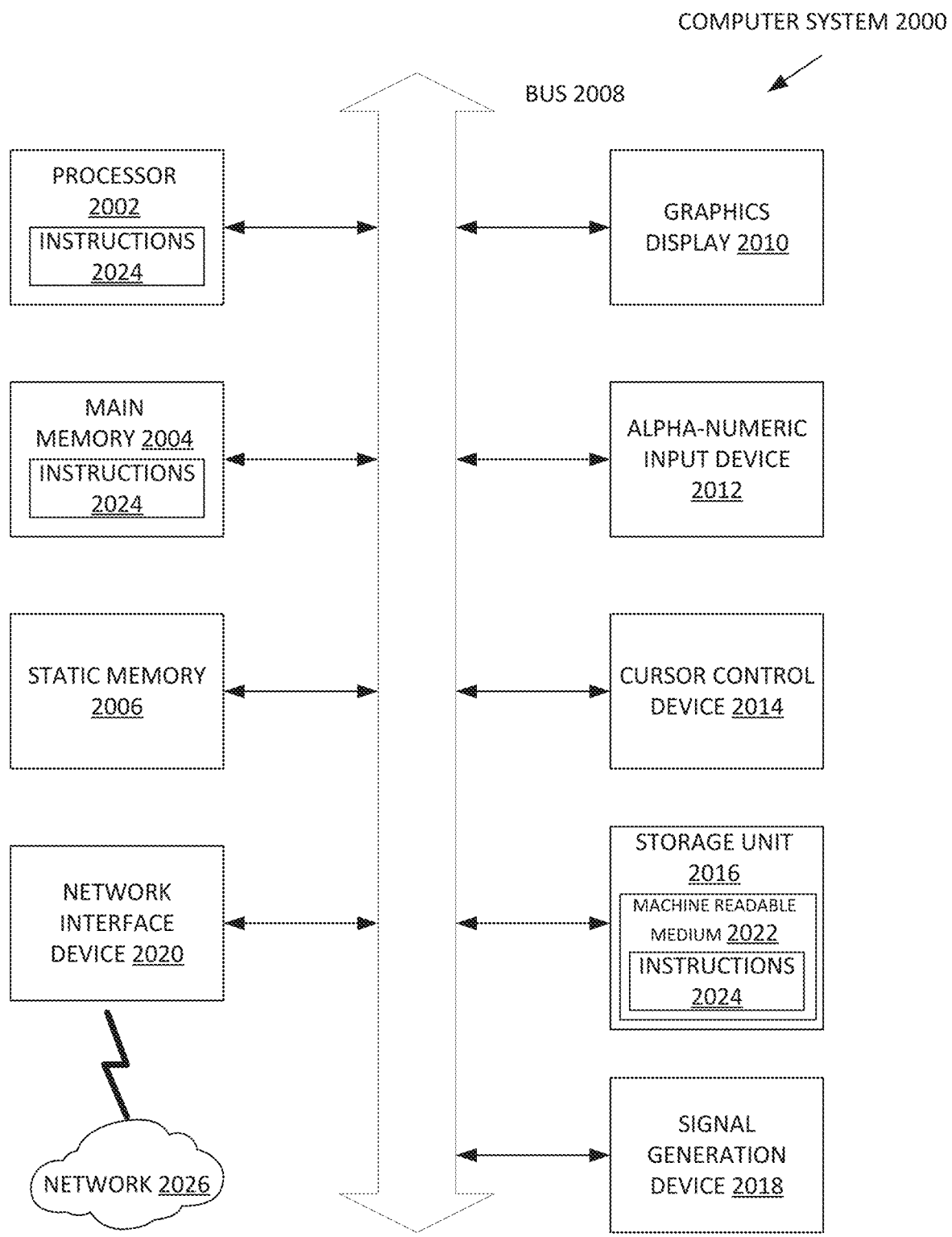
FIG. 20 is a block diagram illustrating a computing device in one example.

FIG. 20 is a block diagram illustrating a digital device in one example. The digital device may read instructions (e.g., executable instructions) from a machine-readable medium and execute those instructions (e.g., the executable instructions) by one or more processors to perform the machine processing tasks discussed herein, such as the engine operations discussed above. Specifically, FIG. 20 shows a diagrammatic representation of a machine in the example form of a computer system 2000 within which instructions 2024 (e.g., executable instructions such as software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2024 (sequential or otherwise) that specify actions to be taken by that machine. Further, while only a single machine is illustrated, the term "machine" shall also be taken to include any collection of machines that individually or jointly execute instructions 2024 to perform any one or more of the methodologies discussed herein.

The example computer system 2000 includes a processor 2002 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 2004, and a static memory 2006, which are configured to communicate with each other via a bus 2008. The computer system 2000 may further include a graphics display unit 2010 (e.g., a plasma display panel (PDP), a liquid crystal display (LCD), a projector, or a cathode ray tube (CRT)). The computer system 2000 may also include alphanumeric input device 2012 (e.g., a keyboard), a cursor control device 2014 (e.g., a mouse, a trackball, a joystick, a motion sensor, or other pointing instrument), a data store 2016, a signal generation device 2018 (e.g., a speaker), and a network interface device 2020, which also is configured to communicate via the bus 2008.

The data store 2016 includes a machine-readable medium 2022 on which is stored instructions 2024 (e.g., software) embodying any one or more of the methodologies or functions described herein. The instructions 2024 (e.g., software) may also reside, completely or at least partially, within the main memory 2004 or within the processor 2002 (e.g., within a processor's cache memory) during execution thereof by the computer system 2000, the main memory 2004 and the processor 2002 also constituting machine-readable media. The instructions 2024 (e.g., software) may be transmitted or received over a network 2026 via network interface device 2020.

While machine-readable medium 2022 is shown in an example embodiment to be a single medium, the term "machine-readable medium" should be taken to include a single medium or multiple media (e.g., a centralized or distributed database, or associated caches and servers) able to store instructions (e.g., instructions 2024). The term "machine-readable medium" shall also be taken to include any medium, such as a non-transitory computer-readable medium, that is capable of storing instructions (e.g., instructions 2024) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "engine" refers to computational logic for providing the specified functionality. An engine can be implemented in hardware, firmware, and/or software. Where the engines described herein are implemented as software, the engine can be implemented as a standalone program, but can also be implemented through other means, for example as part of a larger program, as any number of separate programs, or as one or more statically or dynamically linked libraries. It will be understood that the named engines described herein represent one embodiment, and other embodiments may include other engines. In addition, other embodiments may lack engines described herein and/or distribute the described functionality among the engines in a different manner. Additionally, the functionalities attributed to more than one engine can be incorporated into a single engine. In an embodiment where the engines as implemented by software, they are stored on a computer readable persistent storage device (e.g., hard disk), loaded into the memory, and executed by one or more processors as described above in connection with FIG. 20. Alternatively, hardware or software engines may be stored elsewhere within a computing system.

As referenced herein, a computer or computing system includes hardware elements used for the operations described here regardless of specific reference in FIG. 20 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure.

It will be appreciated that aspects of one or more embodiments may be embodied as a system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a solid state drive (SSD), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program or data for use by or in connection with an instruction execution system, apparatus, or device.

A transitory computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, Python, or the like and conventional procedural programming languages, such as the "C" programming language or similar programming languages. The computer program code may execute entirely on any of the systems described herein or on any combination of the systems described herein.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While specific examples are described above for illustrative purposes, various equivalent modifications are possible. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented concurrently or in parallel or may be performed at different times. Further any specific numbers noted herein are only examples: alternative implementations may employ differing values or ranges.

Throughout this specification, plural instances may implement components, operations, or structures described as a single instance. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. Furthermore, any specific numbers noted herein are only examples: alternative implementations may employ differing values or ranges.

Components may be described or illustrated as contained within or connected with other components. Such descriptions or illustrations are examples only, and other configurations may achieve the same or similar functionality. Components may be described or illustrated as "coupled," "couplable," "operably coupled," "communicably coupled" and the like to other components. Such description or illustration should be understood as indicating that such components may cooperate or interact with each other, and may be in direct or indirect physical, electrical, or communicative contact with each other.

Components may be described or illustrated as "configured to," "adapted to," "operative to," "configurable to," "adaptable to," "operable to," and the like. Such description or illustration should be understood to encompass components both in an active state and in an inactive or standby state unless required otherwise by context.

The use of "or" in this disclosure is not intended to be understood as an exclusive "or." Rather, "or" is to be understood as including "and/or." For example, the phrase "providing products or services" is intended to be understood as having several meanings: "providing products," "providing services," and "providing products and services."

It may be apparent that various modifications may be made, and other embodiments may be used without departing from the broader scope of the discussion herein.

Therefore, these and other variations upon the example embodiments are intended to be covered by the disclosure herein.

The invention claimed is:

1. A non-transitory computer-readable medium comprising executable instructions, the executable instructions being executable by one or more processors to perform a method, the method comprising:

receiving a geographic area, the geographic area having one or more geographic sub-areas; and
for each geographic sub-area of the one or more geographic sub-areas:
receiving image data for the geographic sub-area;
generating a set of features using the image data;
receiving a habitat for the geographic sub-area;
identifying one or more condition assessment criteria based on the habitat;
for each condition assessment criterion of the one or more condition assessment criteria:
determining a subset of features of the set of features; and
applying a trained model to the subset of features to obtain a response to the condition assessment criterion;
generating a condition assessment for the habitat based on one or more responses to the one or more condition assessment criteria; and
providing the condition assessment for the habitat.

2. The non-transitory computer-readable medium of claim 1, the method further comprising for each geographic sub-area of the one or more geographic sub-areas:
generating a biodiversity metric for the habitat based on the condition assessment for the habitat; and
providing the biodiversity metric for the habitat.

3. The non-transitory computer-readable medium of claim 1 wherein the trained model includes a set of decision trees trained using a random forest classifier.

4. The non-transitory computer-readable medium of claim 1 wherein the one or more geographic sub-areas are one or more first geographic sub-areas, the image data is first image data, the set of features is a first set of features, the habitat is a first habitat, the one or more condition assessment criteria are one or more first condition assessment criteria, the response is a first response, and the method further comprising:
receiving multiple second geographic sub-areas; and
for each second geographic sub-area of the multiple second geographic sub-areas:
receiving second image data for the second geographic sub-area;
generating a second set of features using the second image data;
receiving a second habitat for the second geographic sub-area;
identifying one or more second condition assessment criteria based on the second habitat; and
for each second condition assessment criterion of the one or more second condition assessment criteria:
determining a second subset of features of the second set of features;
receiving a second response to the second condition assessment criterion, the second response obtained from an inspection of the second geographic sub-area;
training a model on the second subset of features and the second response; and
storing the trained model in association with the second condition assessment criterion.

5. The non-transitory computer-readable medium of claim 1 wherein the image data includes at least one of optical image data, hyperspectral image data, and synthetic aperture radar image data.

6. The non-transitory computer-readable medium of claim 1 wherein the image data includes satellite image data.

7. The non-transitory computer-readable medium of claim 1 wherein the response is a first response, and the method further comprising for each geographic sub-area of the one or more geographic sub-areas:
for each condition assessment criterion of the one or more condition assessment criteria, receiving a second response to the condition assessment criterion, the second response obtained from an inspection of the geographic sub-area;
generating an updated condition assessment for the habitat based on one or more second responses to the one or more condition assessment criteria; and
providing the updated condition assessment for the habitat.

8. The non-transitory computer-readable medium of claim 1, the method further comprising for each geographic sub-area of the one or more geographic sub-areas:
for each condition assessment criterion of the one or more condition assessment criteria, obtaining a confidence score from applying the trained model to the subset of features;
generating a confidence indication for the habitat based on one or more confidence scores for the one or more condition assessment criteria; and
providing the confidence indication for the habitat.

9. The non-transitory computer-readable medium of claim 1, the method further comprising for each geographic sub-area of the one or more geographic sub-areas, receiving one or more of digital terrain model data, digital surface model data, and canopy height model data for the geographic sub-area,
wherein generating the set of features using the image data includes generating the set of features using the image data and one or more of the digital terrain model data, the digital surface model data, and the canopy height model data.

10. A method comprising:
receiving a geographic area;
receiving image data for the geographic area;
generating a set of features using the image data;
receiving a habitat for the geographic area;
identifying a set of condition assessment criteria based on the habitat;
for each condition assessment criterion in the set of condition assessment criteria:
determining a subset of features of the set of features; and
applying a trained model to the subset of features to obtain a response to the condition assessment criterion;
generating a condition assessment for the habitat based on the response to each condition assessment criterion in the set of condition assessment criteria; and
providing the condition assessment for the habitat.

11. The method of claim 10, further comprising:
generating a biodiversity metric for the habitat based on the condition assessment for the habitat; and
providing the biodiversity metric for the habitat.

12. The method of claim 10 wherein the trained model includes a set of decision trees trained using a random forest classifier.

13. The method of claim 10 wherein the geographic area is a first geographic area, the image data is first image data, the set of features is a first set of features, the habitat is a first habitat, the set of condition assessment criteria is a first set of condition assessment criteria, the response is a first response, and the method further comprising:

receiving multiple second geographic areas; and
for each second geographic area of the multiple second geographic areas:
  receiving second image data for the second geographic area;
  generating a second set of features using the second image data;
  receiving a second habitat for the second geographic area;
  identifying a second set of condition assessment criteria based on the second habitat; and
  for each second condition assessment criterion of the second set of condition assessment criteria:
    determining a second subset of features of the second set of features;
    receiving a second response to the second condition assessment criterion, the second response obtained from an inspection of the second geographic area;
    training a model on the second subset of features and the second response; and
    storing the trained model in association with the second condition assessment criterion.

14. The method of claim 10 wherein the image data includes at least one of optical image data, hyperspectral image data, and synthetic aperture radar image data.

15. The method of claim 10 wherein the image data includes satellite image data.

16. The method of claim 10 wherein the response is a first response, and the method further comprising:
  for each condition assessment criterion of the set of condition assessment criteria, receiving a second response to the condition assessment criterion, the second response obtained from an inspection of the geographic area;
  generating an updated condition assessment for the habitat based on the second response to each condition assessment criterion of the set of condition assessment criteria; and
  providing the updated condition assessment for the habitat.

17. The method of claim 10, the method further comprising:
  for each condition assessment criterion of the set of condition assessment criteria, obtaining a confidence score from applying the trained model to the subset of features;
  generating a confidence indication for the habitat based on the confidence score for each condition assessment criterion of the set of condition assessment criteria; and
  providing the confidence indication for the habitat.

18. The method of claim 10, the method further comprising receiving one or more of digital terrain model data, digital surface model data, and canopy height model data for the geographic area,
  wherein generating the set of features using the image data includes generating the set of features using the image data and one or more of the digital terrain model data, the digital surface model data, and the canopy height model data.

19. A system comprising at least one processor and memory containing executable instructions, the executable instructions being executable by the at least one processor to:
  receive a geographic area;
  receive image data for the geographic area;
  generate a set of features using the image data;
  receive a habitat for the geographic area;
  determine one or more condition assessment criteria based on the habitat;
  apply one or more trained models to one or more subsets of the set of features to obtain one or more responses to the one or more condition assessment criteria;
  generate a condition assessment for the habitat based on the one or more responses; and
  provide the condition assessment for the habitat.

20. The system of claim 19, the executable instructions being further executable by the at least one processor to:
  generate a biodiversity metric for the habitat based on the condition assessment for the habitat; and
  provide the biodiversity metric for the habitat.

* * * * *